US008680446B2

(12) United States Patent
Nobue et al.

(10) Patent No.: US 8,680,446 B2
(45) Date of Patent: Mar. 25, 2014

(54) MICROWAVE HEATING APPARATUS

(75) Inventors: Tomotaka Nobue, Kyoto (JP); Kenji Yasui, Shiga (JP); Yoshiharu Oomori, Shiga (JP); Makoto Mihara, Nara (JP)

(73) Assignee: Panasonic Corporation, Osaka (JP)

( * ) Notice: Subject to any disclaimer, the term of this patent is extended or adjusted under 35 U.S.C. 154(b) by 547 days.

(21) Appl. No.: 12/999,861

(22) PCT Filed: Jan. 28, 2009

(86) PCT No.: PCT/JP2009/000326
§ 371 (c)(1),
(2), (4) Date: Dec. 17, 2010

(87) PCT Pub. No.: WO2009/157110
PCT Pub. Date: Dec. 30, 2009

(65) Prior Publication Data
US 2011/0108548 A1    May 12, 2011

(30) Foreign Application Priority Data

| Jun. 25, 2008 | (JP) | 2008-165579 |
| Sep. 17, 2008 | (JP) | 2008-237396 |
| Sep. 22, 2008 | (JP) | 2008-242162 |
| Sep. 22, 2008 | (JP) | 2008-242163 |

(51) Int. Cl.
*H05B 6/64* (2006.01)
*H05B 6/68* (2006.01)

(52) U.S. Cl.
USPC ......................... 219/702; 219/746

(58) Field of Classification Search
CPC ...... H05B 6/6402; H05B 6/686; H05B 6/705; H05B 6/72; H05B 2206/044; H05B 6/6435; H05B 6/868; H05B 6/6408; H05B 6/6491; H05B 6/6494; Y02B 40/143; Y02B 40/146; A47J 37/0694

USPC ......... 219/702, 756, 751, 746, 678–682, 686, 219/701, 730, 754, 757, 759, 763, 732; 126/21 A, 21 R, 19 R, 299 D; 426/107, 426/234, 395

See application file for complete search history.

(56) References Cited

U.S. PATENT DOCUMENTS 4,140,888 A * 2/1979 Baron et al. ................ 219/751
2005/0115950 A1 6/2005 Cho et al.
(Continued)

FOREIGN PATENT DOCUMENTS

| CN | 2829277 | 10/2006 |
| GB | 2 252 890 | 8/1992 |

(Continued)

OTHER PUBLICATIONS

International Search Report issued Apr. 14, 2009 in International (PCT) Application No. PCT/JP2009/000326.

(Continued)

*Primary Examiner* — Quang Van
(74) *Attorney, Agent, or Firm* — Wenderoth, Lind & Ponack, L.L.P.

(57) ABSTRACT

A microwave heating apparatus includes a microwave generation part 10 using a semiconductor element, and first and second heating chambers 100a, 100b to each of which a microwave generated in the microwave generation part is fed. A reflected microwave returned from at least one of the first and second heating chambers 100a, 100b to the microwave generation part is transmitted to the other heating chamber by a circulation type non-reciprocal circuit 118, so that generated power of the microwave generation part is substantially completely consumed upon heating of an article to be heated.

15 Claims, 23 Drawing Sheets

(56) References Cited

U.S. PATENT DOCUMENTS

| | | | |
|---|---|---|---|
| 2007/0108193 A1 | 5/2007 | Cho et al. | |
| 2009/0169688 A1* | 7/2009 | Ehmann | 426/107 |
| 2010/0176121 A1 | 7/2010 | Nobue et al. | |
| 2010/0176123 A1* | 7/2010 | Mihara et al. | 219/746 |

FOREIGN PATENT DOCUMENTS

| | | |
|---|---|---|
| JP | 47-9032 | 3/1972 |
| JP | 48-6335 | 2/1973 |
| JP | 56-96486 | 8/1981 |
| JP | 59-99693 | 6/1984 |
| JP | 60-19190 | 2/1985 |
| JP | 60-143592 | 7/1985 |
| JP | 4-506754 | 11/1992 |
| RU | 2 287 915 | 11/2006 |
| RU | 2291596 | 1/2007 |
| WO | 91/15971 | 10/1991 |
| WO | 2008/018466 | 2/2008 |

OTHER PUBLICATIONS

International Preliminary Report on Patentability issued Feb. 17, 2011 in International (PCT) Application No. PCT/JP2009/000326.
Russian Decision on Grant (with English translation) issued Sep. 11, 2012 in corresponding Russian Patent Application No. 2011102571.

* cited by examiner

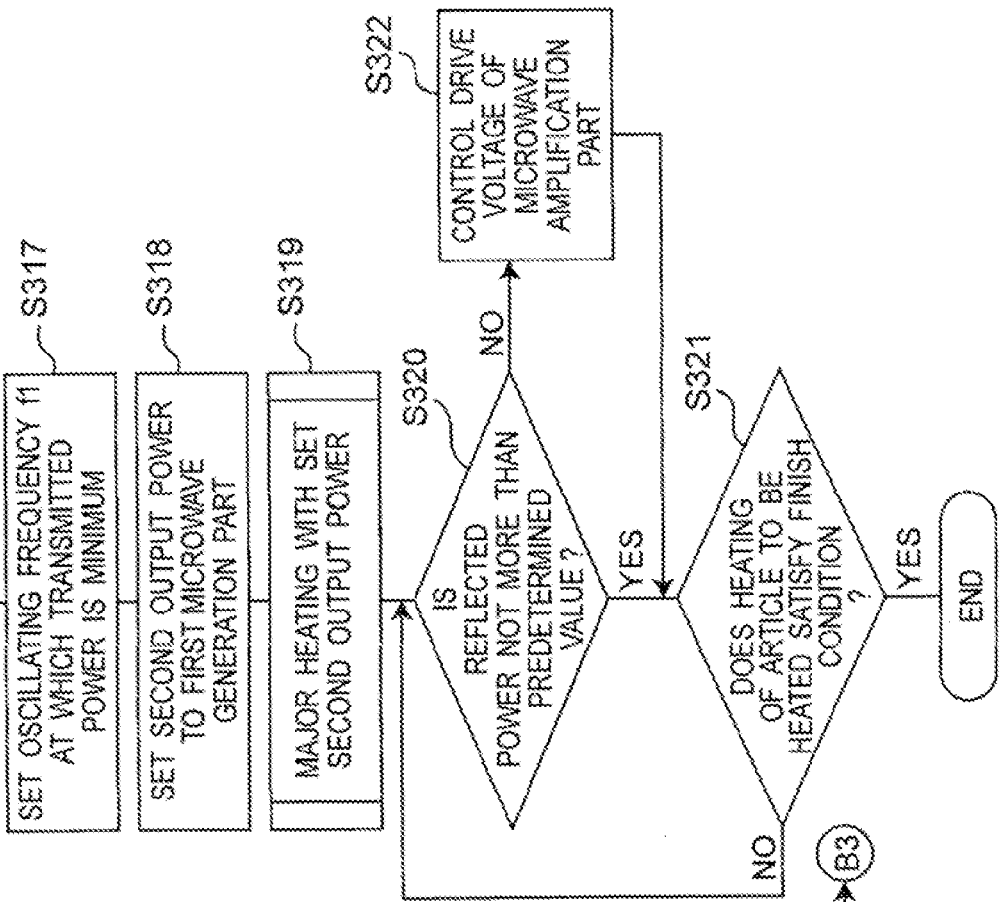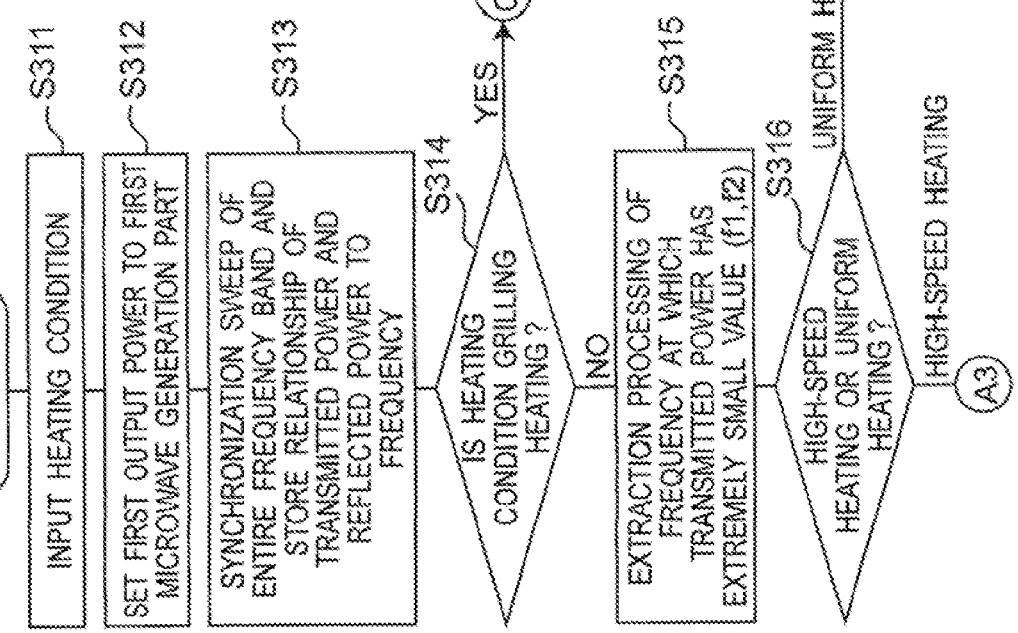
Fig. 13

MICROWAVE HEATING APPARATUS

TECHNICAL FIELD

The present invention relates to a microwave heating apparatus provided with a microwave generation part that is configured by using a semiconductor element.

BACKGROUND ART

A conventional microwave heating apparatus provided with a microwave generation part is configured by using a vacuum tube called as a magnetron for the microwave generation part in general as represented by a microwave oven.

A semiconductor element has lower thermal durability in comparison to the magnetron, and thus there is a fear that the element is destructed when exposed to high heat. In case that the microwave generation part formed with using the semiconductor element is developed to the microwave heating apparatus, a circulator forming a circulation type non-reciprocal circuit is used so that high-frequency power amplified in the microwave generation part is supplied to a heating chamber and the high-frequency power is not returned to the microwave generation part. This circulator is formed so as to consume reflected power returned from the heating chamber at a terminal resistance. For example, refer to Japanese Unexamined Patent Publication No. S59-099693.

Also, for example, Japanese Unexamined Utility Model Publication No. S60-019190 discloses an apparatus in which reflected power returned from a heating chamber is consumed by a dummy resistance plate provided on an outer wall surface in an upper part of the heating chamber, and is utilized for retaining heat in the heating chamber.

Further, in order to achieve improvement in heat receiving efficiency, there is an apparatus in which reflected power returned from a heating chamber accommodating an article to be heated to a microwave generation part is detected, and in accordance with a detection value of the reflected power, an oscillating frequency at which the reflected power is minimum is tracked. For example, refer to Japanese Unexamined Patent Publication No. S56-096486.

CITATION LIST

Patent Literatures

PLT 1: Japanese Unexamined Patent Publication No. S59-099693
PLT 2: Japanese Unexamined Utility Model Publication No. S60-019190
PLT 3: Japanese Unexamined Patent Publication No. S56-096486

SUMMARY OF INVENTION

Technical Problem

Although with a configuration and control of the conventional microwave generation part with using the semiconductor element, the semiconductor element can be prevented from thermal destruction by reflected microwave power returned from the heating chamber to the microwave generation part, a percentage of the power generated by the microwave generation part is consumed as other than heating energy for the article to be heated. Therefore, there is a problem in view of saving energy.

The present invention is to solve the problem in the conventional microwave heating apparatus, and an object thereof is to provide a microwave heating apparatus excellent in an energy-saving performance capable of ideally 100% consuming microwave power outputted by a microwave generation part as heating energy for an article to be heated.

Solution to Problem

In order to solve the problem in the conventional microwave heating apparatus, a microwave heating apparatus of a first aspect according to the present invention includes: a microwave generation part for generating a microwave; and first and second heating chambers to each of which the microwave generated by the microwave generation part is fed, wherein the microwave returned from at least one of the first and second heating chambers to the microwave generation part is transmitted to the other heating chamber. With the microwave heating apparatus of the first aspect formed in such a way, the microwave supplied to the first heating chamber or the second heating chamber is absorbed by a microwave lossy material (such as an accommodated article to be heated) placed in the heating chamber, and a reflected microwave unabsorbed and returned to the microwave generation part is transmitted to the other heating chamber. Thereby, in the microwave heating apparatus of the first aspect, the microwave is absorbed by the microwave lossy material (such as the accommodated article to be heated) placed in the heating chamber. In such a way, microwave power supplied from the microwave generation part is absorbed by the microwave lossy materials in both the first heating chamber and the second heating chamber. Thus, the microwave power supplied from the microwave generation part can be substantially completely consumed, so that the heating apparatus excellent in an energy-saving performance can be provided.

In a microwave heating apparatus of a second aspect according to the present invention, in the first aspect, further comprising feeding parts for respectively supplying the microwave generated by the microwave generation part to the first and second heating chambers, the first heating chamber is configured to accommodate an article to be heated, the second chamber contains a microwave absorber, and the microwave absorber is arranged on an outer surface of the first heating chamber in at least one of wall surfaces forming the first heating chamber. With the microwave heating apparatus of the second aspect formed in such a way, the reflected microwave returned from the first heating chamber to the microwave generation part is transmitted to the second heating chamber, so that the microwave supplied to the first heating chamber is absorbed by the microwave lossy material (particularly, the accommodated article to be heated) placed in the first heating chamber, and the reflected microwave unabsorbed and returned to the microwave generation part is transmitted to the second heating chamber. As a result, the microwave transmitted to the second heating chamber is absorbed by the microwave absorber serving as the microwave lossy material placed in the second heating chamber. The microwave power supplied from the microwave generation part is absorbed by the microwave lossy materials in both the first heating chamber and the second heating chamber. Thus, the microwave power supplied from the microwave generation part can be substantially completely consumed, so that the heating apparatus excellent in the energy-saving performance can be provided.

A microwave heating apparatus of a third aspect according to the present invention further includes in the second aspect: a circulation type non-reciprocal circuit for transmitting the microwave returned from the first heating chamber to the microwave generation part to the second heating chamber; a power detection part for detecting microwave power to be transmitted to the second heating chamber; and a control part for controlling the microwave generation part, wherein the control part controls an oscillating frequency of the microwave generation part in accordance with signals of the power detection part, and executes a microwave heating mode of heating the article to be heated with mainly using the microwave, a radiation conduction heating mode of heating the article to be heated with mainly using generated heat of the microwave absorber, and a composite heating mode of heating the article to be heated by combining the microwave heating mode and the radiation conduction heating mode. With the microwave heating apparatus of the third aspect formed in such a way, part of the microwave supplied to the first heating chamber is absorbed by the article to be heated, and the microwave unabsorbed and reflected from the first heating chamber to the microwave generation part is transmitted to the second heating chamber via the circulation type non-reciprocal circuit, and is absorbed by the microwave absorber. This microwave absorber generates heat by absorbing the microwave, transfers the heat into the first heating chamber in which the article to be heated is mounted, and heats the article to be heated. As a result, with the microwave heating apparatus of the third aspect, the microwave power supplied from the microwave generation part can be substantially completely consumed by the article to be heated and the microwave absorber. Thus, an output of the microwave generation part is substantially 100% consumed upon heating of the article to be heated, so that the heating apparatus excellent in the energy-saving performance can be provided. The microwave heating apparatus of the third aspect is provided with the power detection part for detecting a power amount to be transmitted to the second heating chamber, and the control part for controlling the oscillating frequency of the microwave oscillation part in accordance with the detection signals from the power detection part. Thereby, with the microwave heating apparatus of the third aspect, a ratio of absorption of the microwave supplied into the first heating chamber by the article to be heated can be changed by changing the oscillating frequency. Thus, the microwave heating mode of heating the article to be heated with mainly using the microwave, the radiation conduction heating mode of heating the article to be heated with mainly utilizing the generated heat of the microwave absorber of the second heating chamber, and further, the composite heating mode of heating the article to be heated by combining the above modes can be selected in according with a type of the article to be heated, so that proper heating can be executed.

In a microwave heating apparatus of a forth aspect according to the present invention, in any one of the first to third aspects, the microwave generation part has a microwave oscillation part formed with using a semiconductor element, and a microwave amplification part for amplifying a microwave generated by the microwave oscillation part. With the microwave heating apparatus of the fourth aspect formed in such a way, variable setting of the frequency corresponding to an absorption degree to the article to be heated is performed in the microwave oscillation part having a low power level, and an output of the microwave at a desired oscillating frequency is amplified in the microwave amplification part, so that large microwave power can be supplied to the heating chamber. Therefore, with the microwave heating apparatus of the fourth aspect, the microwave supplied into the first heating chamber can be easily changed to have an energy absorption degree in accordance with an amount, a type, and the like of the accommodated article to be heated.

In a microwave heating apparatus of a fifth aspect according to the present invention, in any one of the first to third aspects, the microwave generation part has a microwave oscillation part formed with using a semiconductor element, a division part for dividing an output of the microwave oscillation part into a plurality of outputs, and microwave amplification parts for respectively amplifying the outputs of the division part, and microwave outputs of the microwave amplification parts are supplied from a plurality of points to the first heating chamber. With the microwave heating apparatus of the fifth aspect formed in such a way, the microwaves can be scattered over the entire article to be heated by supplying the microwaves from the plurality of points into the first heating chamber. With the microwave heating apparatus of the fifth aspect, although part of the microwaves supplied from a plurality of supply parts to the first heating chamber is absorbed by the article to be heated, there are still the reflected microwaves unabsorbed by the article to be heated in accordance with the type, the amount, and the like of the article to be heated and respectively returned to the plurality of supply parts. Thus, the reflected microwaves are respectively transmitted to a plurality of supply parts of the second heating chamber via the circulation type non-reciprocal circuits (circulators) and are absorbed by the microwave absorber. With the microwave heating apparatus of the fifth aspect, since the microwaves are also supplied from a plurality of points into the second heating chamber, the microwaves can be scattered over the entire microwave absorber, so that the entire microwave absorber can efficiently generate the heat. The generated heat of the microwave absorber generating the heat in such a way is transferred to the first heating chamber in which the article to be heated is mounted, so that the heating of the article to be heated can be facilitated. As a result, by substantially completely consuming output power of the microwave generation part by the article to be heated and the microwave absorber, the output of the microwave generation part is substantially 100% consumed upon the heating of the article to be heated, so that the heating apparatus excellent in the energy-saving performance can be provided.

In a microwave heating apparatus of a sixth aspect according to the present invention, in the fifth aspect, further comprising a phase changing part for delaying a phase of at least one of the outputs of the division part. With the microwave heating apparatus of the sixth aspect formed in such a way, by changing the phase of the microwave supplied from the plurality of supply parts into the first heating chamber, the heating of the article to be heated accommodated in the first heating chamber is facilitated with desired heating distribution by a change in microwave distribution in the space in the heating chamber due to the supplied change in phase difference.

In a microwave heating apparatus of a seventh aspect according to the present invention, the microwave generation part has a plurality of microwave oscillation parts formed with using semiconductor elements, and microwave amplification parts for respectively amplifying outputs of the microwave oscillation parts, and microwave outputs of the microwave amplification parts are respectively supplied from different positions in the first heating chamber. With the microwave heating apparatus of the seventh aspect formed in such a way, by supplying the microwaves of different frequencies from the different positions to the first heating chamber, the heating of the article to be heated can be further efficiently facilitated in accordance with the amount, the type, and the like of the accommodated article to be heated.

In a microwave heating apparatus of an eighth aspect according to the present invention, in any one of the first to third aspects, the microwave generation part has a plurality of microwave oscillation parts formed with using semiconductor elements, and microwave amplification parts for respectively amplifying outputs of the microwave oscillation parts, and an output of at least one of the microwave amplification parts is supplied to the second heating chamber. With the microwave heating apparatus of the eighth aspect formed in such a way, the microwaves supplied to the second heating chamber are made to be independent, so that heat generation of the microwave absorber can be independently controlled. According to a control method in the microwave heating apparatus of the eighth aspect, a degree of flexibility in heating control of the article to be heated can be increased particularly in the composite heating mode.

In a microwave heating apparatus of a ninth aspect according to the present invention, in the eighth aspect, the second heating chamber is supplied with the microwave having predetermined frequency. With the microwave heating apparatus of the ninth aspect formed in such a way, the microwaves of the frequencies with which the microwave absorber can absorb maximum energy are supplied to the second heating chamber in which the microwave absorber is arranged, so that a heat generation speed of the microwave absorber is maximized. Thus, grilling heating of the article to be heated can be executed at a high speed.

In a microwave heating apparatus of a tenth aspect according to the present invention, in the third aspect, the control part changes the frequency of the microwave generation part at a predetermined frequency interval over an entire bandwidth (variable range) of the frequency following start of heating the article to be heated, and stores the detection signals of the power detection part with respect to the frequencies. With the microwave heating apparatus of the tenth aspect formed in such a way, a ratio between a microwave energy amount supplied to the first heating chamber and consumed by the article to be heated and a microwave energy amount supplied to the second heating chamber and consumed by the article to be heated or the microwave absorber can be selected taking the oscillating frequency as a parameter, so that the article to be heated can be effectively heated in accordance with a required heating condition. With the microwave heating apparatus of the tenth aspect, the microwave distribution in the space in the heating chamber is changed by changing the frequency, so that uniform heating of the article to be heated and the microwave absorber can be facilitated.

In a microwave heating apparatus of an eleventh aspect according to the present invention, in the third or tenth aspect, when executing the microwave heating mode, the control part selects a frequency at which a sum of the detection signals of the power detection part is a minimum value, and operates the microwave generation part at the selected frequency. With the microwave heating apparatus of the eleventh aspect formed in such a way, the microwave energy amount supplied to the first heating chamber and consumed by the article to be heated is maximized, so that high-speed heating of the article to the heated can be facilitated.

In a microwave heating apparatus of a twelfth aspect according to the present invention, in the third or tenth aspect, when executing the microwave heating mode, the control part selects a plurality of frequencies at which a sum of the detection signals of the power detection part is an extremely small value, and controls the microwave generation part to successively generate the plurality of selected frequencies. With the microwave heating apparatus of the twelfth aspect formed in such a way, the microwave energy amount supplied to the first heating chamber and consumed by the article to be heated is maximized and the microwave distribution in the space in the first heating chamber is changed, so that the uniform heating of the article to be heated can be facilitated.

In a microwave heating apparatus of a thirteenth aspect according to the present invention, in the third or tenth aspect, when executing the radiation conduction heating mode, the control part selects a frequency at which a sum of the detection signals of the power detection part is a maximum value, and operates the microwave generation part at the selected frequency. With the microwave heating apparatus of the thirteenth aspect formed in such a way, the microwave energy amount supplied from the first heating chamber and consumed by the article to be heated is minimized and the microwave energy amount supplied to the second heating chamber and consumed by the microwave absorber is maximized, so that the grilling heating of the article to the heated can be efficiently executed.

In a microwave heating apparatus of a fourteenth aspect according to the present invention, in the third or tenth aspect, when executing the radiation conduction heating mode, the control part selects a frequency at which a sum of the detection signals of the power detection part is a maximum value, and controls the microwave generation part to sweep a frequency in a predetermined bandwidth centering on the selected frequency. With the microwave heating apparatus of the fourteenth aspect formed in such a way, the microwave energy amount supplied to the first heating chamber and consumed by the article to be heated is minimized and the microwave distribution in the space in the second heating chamber is changed, so that the entire region of the microwave absorber is uniformly heated. Thus, the grilling heating of the article to be heated having a large bottom area can be effectively executed.

In a microwave heating apparatus of a fifteenth aspect according to the present invention, in the third or sixth aspect, the microwave generation part is provided with the phase changing part, and the control part controls the oscillating frequency of the microwave oscillation part in accordance with on the detection signals of the power detection part obtained under a condition that phases of the microwaves supplied to the first heating chamber are substantially identical. With the microwave heating apparatus of the fifteenth aspect formed in such a way, a ratio between a plurality of microwave energy amounts supplied from a plurality of points to the first heating chamber and consumed by the article to be heated and a plurality of microwave energy amounts supplied from a plurality of points to the second heating chamber and consumed by the microwave absorber can be calculated with high reproducibility taking the oscillating frequency as the parameter. Therefore, with the microwave heating apparatus of the fifteenth aspect, an optimal frequency in accordance with a required heating condition can be selected, so that the article to be heated can be effectively heated.

In a microwave heating apparatus of a sixteenth aspect according to the present invention, in the third or sixth aspect, the microwave generation part provided with the phase changing part, and the control part selects a frequency at which a sum of the detection signals of the power detection part is a minimum value or a maximum value, and controls the phase changing part when the microwave generation part is operated at the selected frequency, so as to change phases of microwaves supplied from a plurality of points to the first heating chamber. With the microwave heating apparatus of the sixteenth aspect formed in such a way, the microwave distribution in the space in the heating chamber can be changed at the same frequency during the heating of the article to be heated, so that the uniform heating or concentrated local heating of the article to be heated and the microwave absorber can be facilitated.

In a microwave heating apparatus of a seventeenth aspect according to the present invention, in the third aspect, the power detection part has a reflected power detection part for detecting the microwave power returned from the second heating chamber, and the control part controls drive voltage of the microwave generation part so that the detection signals are not more than a predetermined level, in accordance with a sum of detection signals of the reflected power detection part. With the microwave heating apparatus of the seventeenth aspect formed in such a way, the semiconductor element of the microwave generation part can be surely protected from thermal destruction by reflected microwave power that is unabsorbed in the heating chamber and is returned to the microwave generation part.

Advantageous Effects of Invention

With the microwave heating apparatus of the present invention, the microwave supplied to the heating chamber can be substantially 100% consumed in the heating chamber, so that the heating apparatus excellent in an energy-saving performance can be provided.

BRIEF DESCRIPTION OF DRAWINGS

FIG. 13 is a flowchart showing control actions in the microwave heating apparatus of the third embodiment.

DESCRIPTION OF EMBODIMENTS

Preferred embodiments of the present invention will be described in detail with reference to the attached drawings. It should be noted that although a microwave oven will be described as a microwave heating apparatus in the following embodiments, the microwave oven is only an example. Thus, the microwave heating apparatus of the present invention is not limited to the microwave oven but may be another microwave heating apparatus such as a heating apparatus utilizing dielectric heating, a disposer, or a semiconductor manufacturing apparatus. The present invention is not limited to specific configurations in the following embodiments but includes configurations in accordance with the same technological thought.

(First Embodiment)

Figure 1:
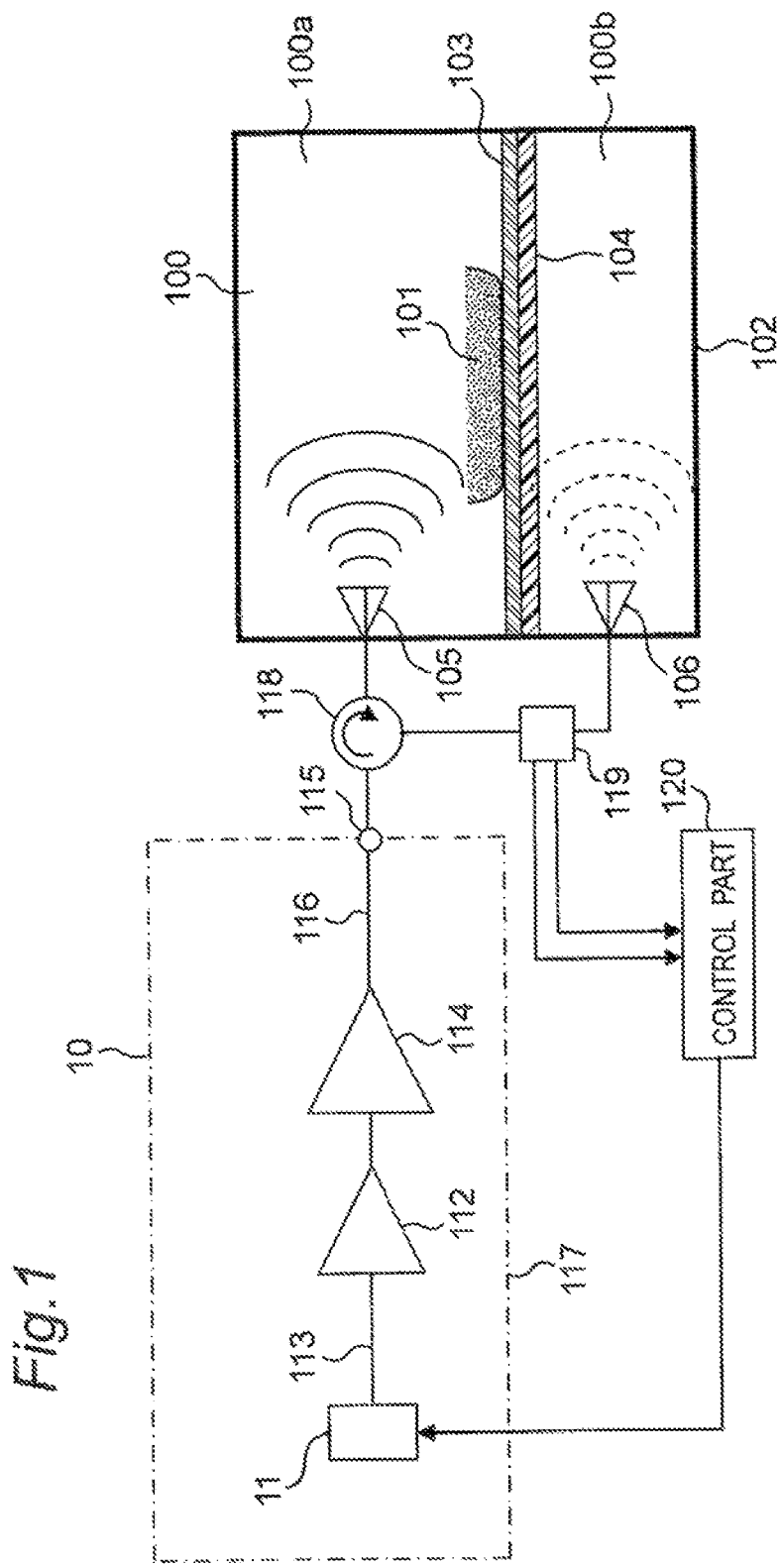
FIG. 1 is a block diagram showing a configuration of a microwave heating apparatus of a first embodiment according to the present invention.

FIG. 1 is a block diagram showing a configuration of a microwave heating apparatus of a first embodiment according to the present invention.

As shown in FIG. 1, in the microwave heating apparatus of the first embodiment, a microwave generation part 10 is provided with a microwave oscillation part 11 for generating a microwave, a plurality of steps of microwave amplification parts 112, 114 for amplifying an output of the microwave oscillation part 11, a microwave transmission passage 113 for guiding the output of the microwave oscillation part 11 to the former microwave amplification part 112, and a microwave transmission passage 116 for guiding an output of the main microwave amplification part 114 at a latter stage to an output part 115 of the microwave generation part 10. The microwave oscillation part 11 and the microwave amplification parts 112, 114 are formed with using semiconductor elements. As described above, in the microwave generation part 10, the microwave from the microwave oscillation part 11 is amplified in the former microwave amplification part 112, and further, an output of the former microwave amplification part 112 is amplified in the main microwave amplification part 114 and outputted from the output part 115.

The microwave generation part 10 is formed on a dielectric substrate 117 made of a low-dielectric loss material. The former microwave amplification part 112 and the main microwave amplification part 114 are formed by circuits having conductive patterns formed on one surface of the dielectric substrate 117. In order to preferably operate the semiconductor elements serving as amplifying elements of the microwave amplification parts 112, 114, matching circuits are respectively provided on the input sides and the output sides of the semiconductor elements.

In the microwave transmission passages 113, 116, transmission circuits having characteristic impedance of 50Ω are formed by the conductive patterns provided on the one surface of the dielectric substrate 117.

The microwave oscillation part 11 of the microwave generation part 10 has a frequency variable function of generating frequencies of 2,400 MHz to 2,500 MHz.

As shown in FIG. 1, the microwave heating apparatus of the first embodiment is provided with a heating chamber 100 accommodating an article to be heated 101, the heating chamber 100 into which the microwave outputted from the microwave generation part 10 is supplied. In the heating chamber 100, a door for bringing the article to be heated 101 in and out (not shown) is provided in one wall surface forming the heating chamber 100. In the heating chamber 100, wall surfaces other than the wall surface in which the door is provided are formed by closure plates made of metal materials so that the microwave supplied into the heating chamber 100 is enclosed inside the heating chamber 100. A partition part 103 arranged and spaced apart from a heating chamber bottom wall surface 102 by a predetermined distance so as to partition the space in the heating chamber 100, the partition part on which the article to be heated 101 is mounted, is provided inside the heating chamber 100. Therefore, the space in the heating chamber 100 is divided by the partition part 103 into a first heating chamber 100a for accommodating the article to be heated 101 in an upper space of the partition part 103, and a second heating chamber 100b serving as a lower space of the partition part 103. This partition part 103 is made of a metal material. On a surface (a back surface) of the partition part 103 on the opposite side of a mount surface for the article to be heated, that is, on a surface facing the second heating chamber 100b, a microwave absorber layer 104 serving as a microwave absorber which contains a microwave absorbent material is provided and closely attached.

There are provided, in the heating chamber 100, a first feeding part 105 for supplying the microwave into the first heating chamber 100a accommodating the article to be heated 101, and a second feeding part 106 for supplying the microwave into the second heating chamber 100b with one wall surface formed by the microwave absorber layer 104.

A base material of the microwave absorber layer 104 covering the back surface of the partition part 103 is the microwave absorbent material formed by mixing a ferrite material mainly composed of manganese oxide and ferric oxide by 40 to 80% by weight, and a silicon material serving as a heat resistant resin. The microwave absorber layer is attached to the surface facing the second heating chamber (a joint surface) as the back surface of the partition part 103 to which heat resistant coating is provided. Powder of 1 to 10 μm is used as the ferrite material.

It should be noted that in composition of the ferrite material, magnesium oxide, zinc oxide, and the like may be used in addition to the above components. Instead of the ferrite material, a carbon material or a SiC material may be used.

In the microwave heating apparatus of the first embodiment, an example that the mount surface for the article to be heated of the partition part 103 is formed by a flat plate material is shown. However, the mount surface for the article to be heated of the partition part 103 may be formed into a convexo-concave shape, and a joint surface of the microwave absorber layer 104 may be formed into a convexo-concave shape. In such a way, by forming the microwave absorber layer 104 into the convexo-concave shape, a surface area of the microwave absorber layer 104 is increased, so that an absorbing performance of the microwave supplied to the second heating chamber 100b can be improved. Another member formed into a convexo-concave shape may be joined to the back surface of the partition part 103 formed in a flat plate shape, so that the microwave absorber layer 104 is formed on the convexo-concave surface of the other member. This configuration has the same effects.

As shown in FIG. 1, an output from the microwave generation part 10 is transmitted to the first feeding part 105 via a circulator 118 forming a circulation type non-reciprocal circuit, and is supplied into the first heating chamber 100a. A reflected microwave returned from the first heating chamber 100a to the circulator 118 via the first feeding part 105 is transmitted to the second feeding part 106 by the circulator 118. In such a way, the circulator 118 is formed so as to transmit to the second feeding part 106 the reflected microwave returned from the first feeding part 105 to the circulator 118.

A power detection part 119 is arranged in a transmission passage between the circulator 118 and the second feeding part 106. The power detection part 119 detects a power amount of the microwave transmitted from the circulator 118 to the second feeding part 106 and a power amount of the reflected microwave returned from the second heating chamber 100b to the circulator 118 via the second feeding part 106, respectively.

In the microwave heating apparatus of the first embodiment, a control part 120 for controlling actions of the microwave generation part 10 is provided. The control part 120 receives signals detected by the power detection part 119, performs various processing, and then performs variable control on an oscillating frequency of the microwave oscillation part 11.

The power detection part 119 is formed by a directional coupler having a coupling degree of about 40 dB, and detects the power amounts of about 1/10,000 of a transmitted and reflected microwave power. The power signals indicating the power amounts detected in the power detection part 119 are respectively rectified by a wave detection diode (not shown) and are smoothed by a capacitor (not shown), and output signals thereof are inputted to the control part 120.

Next, actions of the microwave heating apparatus of the first embodiment according to the present invention formed as above will be described with reference to FIGS. 2 to 5.

Figure 2:
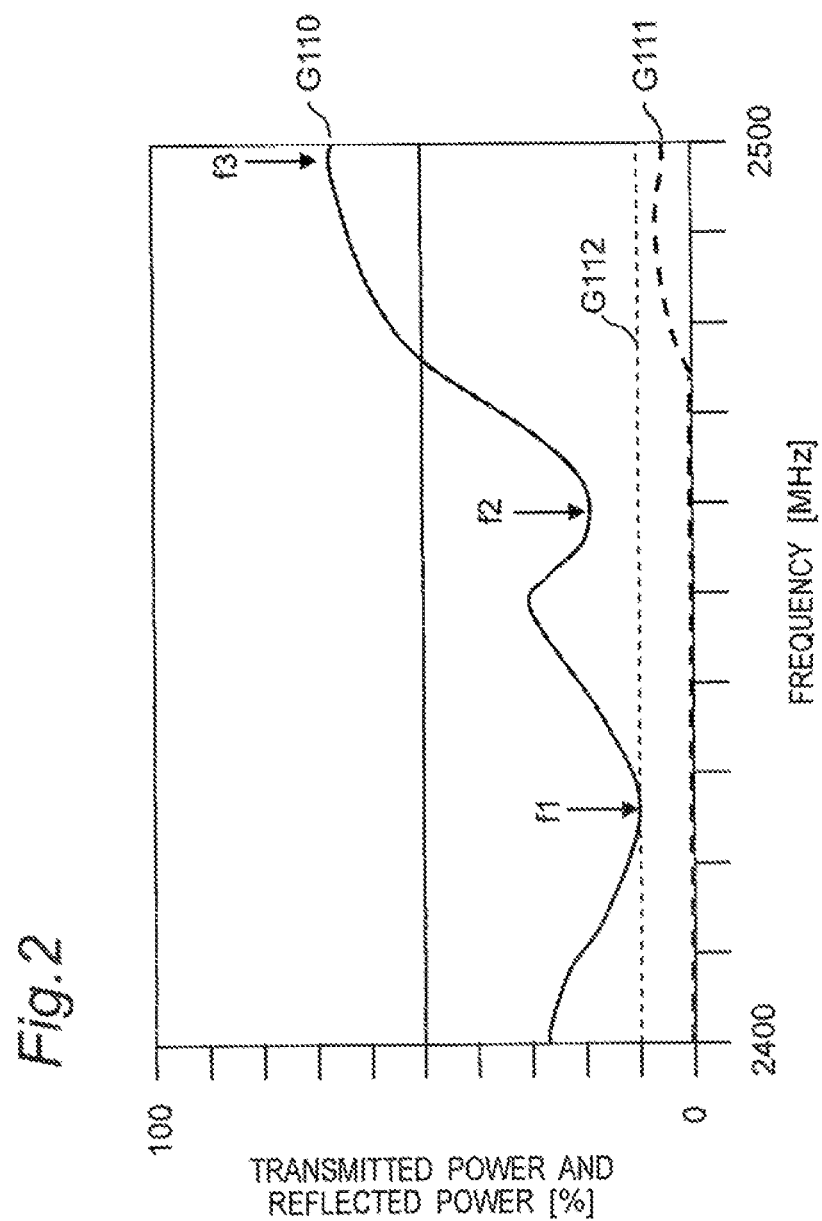
FIG. 2 is a characteristic diagram showing one example of detection signals of a power detection part in the microwave heating apparatus of the first embodiment.

FIG. 2 is a characteristic diagram showing one example of the detection signals of the power detection part 119 in the microwave heating apparatus of the first embodiment. In FIG. 2, the horizontal axis of the graph indicates the frequencies (MHz), and the vertical axis indicates ratios (%) of the power (the transmitted power) detected by the power detection part 119 to be transmitted to the second feeding part, and the power (the reflected power) to be returned from the second feeding part 106 to the circulator 118, relative to the output of the microwave generation part 10. A characteristic curve G110 indicates the ratio of the transmitted power, and a characteristic curve G111 indicates the ratio of the reflected power.

The characteristic curve G110 indicating the transmitted power has frequencies f1, f2 at which transmission power values are extremely small, and a frequency f3 at which the transmission power value is maximum. The characteristic curve G111 indicative of the reflected power indicates that there is a frequency band where the power reflected to the second feeding part 106 is generated. The reflected power is generated by an absorption ability of the microwave absorber layer 104 and a characteristic change in accordance with an impedance change of the microwave absorber layer 104 due to absorption of the microwave and heat generation.

It should be noted that in the graph of FIG. 2, a straight line G112 shown by a broken line indicates that the ratio of the reflected power is 10%. When this 10% level is exceeded, the control part 120 controls to switch the oscillating frequency of the microwave oscillation part 11 to a different frequency, and/or controls to reduce drive voltage of each of the microwave amplification parts 112, 114 so as to decrease the output of the microwave generation part 10.

Hereinafter, a detailed control example of the microwave heating apparatus of the first embodiment according to the present invention will be described with using flowcharts of FIGS. 3 to 5.

Figure 3:
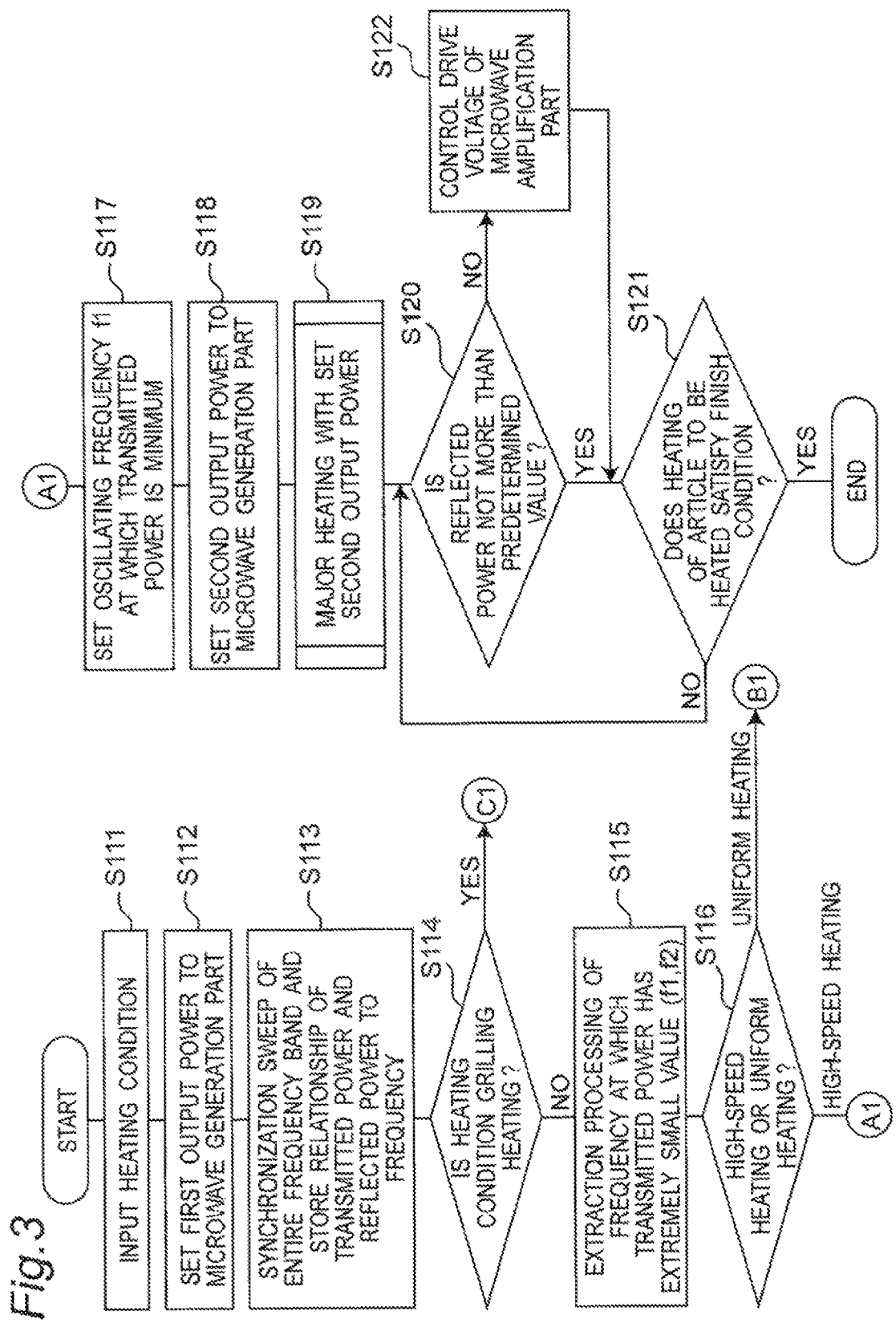
FIG. 3 is a flowchart showing control actions in the microwave heating apparatus of the first embodiment.

The article to be heated 101 is accommodated in the heating chamber 100 and is mounted on the partition part 103, a heating condition is set by an operation part (not shown), and a heating start key is pressed, so that a heating start signal is generated (Step S111 in FIG. 3). The control part 120 to which the heating start signal is inputted generates a control output signal so as to set the microwave generation part 10 to first output power such as power of less than 100 W, and start the actions (Step S112). At this time, the control part 120 supplies predetermined drive power voltage to the former microwave amplification part 112 and the main microwave amplification part 114. The control part 120 also outputs the control signal for setting an initial oscillating frequency of the microwave oscillation part 11 to for example 2,400 MHz, and starts an oscillation action of the microwave oscillation part 11. In such a way, in an initial stage, the microwave generation part 10 outputs the microwave power of less than 100 W at for example 2,400 MHz as the first output power.

Next, in Step S113, the oscillating frequency of the microwave oscillation part 11 is raised from 2,400 MHz in the initial stage at a 1 MHz pitch (for example 1 MHz per 10 milliseconds), and is changed to 2,500 MHz at an upper limit of a frequency variable range. In this frequency variable action, the transmitted power and the reflected power obtained from the power detection part 119 are respectively stored, and the flow proceeds to Step S114.

In Step S114, a control content is selected in accordance with the heating condition for the article to be heated 101. In a case where the heating condition is grilling heating of the article to be heated 101, the flow proceeds to Step S134 shown in FIG. 5. In a case where the heating condition is other than the grilling heating, the flow proceeds to Step S115. The case where the heating condition is other than the grilling heating indicates such a case where the article to be heated 101 is heated or defrosted with mainly utilizing the microwave.

In Step S115, the frequencies at which the transmitted power obtained from the power detection part 119 has an extremely small value in the frequency characteristic curve (such as the frequencies f1, f2 in FIG. 2) are extracted, and the flow proceeds to Step S116. In Step S116, the following control routine is selected in accordance with the heating condition of any one of high-speed heating and uniform heating of the article to be heated 101. In a case where the heating condition is the high-speed heating, the flow proceeds to Step S117. In a case of the uniform heating, the flow proceeds to Step S123 shown in FIG. 4. The high-speed heating and the uniform heating are in a microwave heating mode.

Firstly, the case where the heating condition is the high-speed heating with using the microwave as one of the microwave heating modes will be described.

In a case where the high-speed heating is selected as the heating condition, a frequency at which the transmitted power has a minimum value (such as the frequency f1 in FIG. 2) is set as the oscillating frequency in Step S117, and the flow proceeds to Step S118.

In Step S118, the drive voltage of the former microwave amplification part 112 is controlled so that the microwave generation part 10 generates second output power serving as a rated output. It should be noted that the control part 120 may control both the drive voltage of the former microwave amplification part 112 and the drive voltage of the main microwave amplification part 114 in accordance with a specification of the microwave heating apparatus of the present invention, or may control only the drive voltage of the main microwave amplification part 114. In the following description of the respective embodiments, the above control action of the control part 120 is described to control (set) the drive voltage of the former microwave amplification part 112 and/or the drive voltage of the main microwave amplification part 114.

Next, a major heating action is started with the second output power set in Step S118 (Step S119). In the major heating action, the flow proceeds to Step S120, and it is determined whether or not the reflected power detected by the power detection part 119 is not more than a predetermined value (a value with which the ratio of the reflected power corresponds to 10% of the output of the microwave generation part 10). In a case where the reflected power does not exceed the predetermined value, the flow proceeds to Step S121. In a case where the reflected power exceeds the predetermined value, the flow proceeds to Step S122. In Step S122, the drive voltage of the former microwave amplification part 112 and/or the drive voltage of the main microwave amplification part 114 is controlled to be reduced so that the reflected power is adjusted to be not more than the predetermined value, and the flow proceeds to Step S121.

In Step S121, heating progress of the article to be heated 101 is determined. With regard to this heating progress, when heating processing time is set as the heating condition, it is determined whether or not the heating processing time has passed. When the heating processing time has not yet passed, the flow is returned to Step S120. When the heating processing time has passed, the heating action is finished.

When means for detecting physical information of the article to be heated 101 such as a surface temperature, a size, an amount, or the like relating to the article to be heated 101 is provided in the microwave heating apparatus of the first embodiment, it may be determined whether or not the heating is finished in accordance with a detection signal of the detection means of the physical information. For example in a case where temperature detection means is used as the detection means of the physical information, it is determined whether or not a temperature has reached a desired degree (such as 75° C.). In a case where the temperature has not yet reached the desired degree, the flow is returned to Step S120. In a case where the temperature has reached the desired degree, the heating action is finished. In a case where means for detecting the size, the amount, or the like relating to the article to be heated 101 is provided, heating action time preliminarily determined relative to a range of the size or the amount may be extracted in accordance with a processing method such as a cooking method, and finish of the heating action may be determined in accordance with whether or not the heating action time has passed.

As described above, by controlling the microwave oscillation part 11 to generate the frequency at which the transmitted power detected by the power detection part 119 has the minimum value, a microwave energy amount supplied from the first feeding part 105 into the first heating chamber 100*a* and consumed by the article to be heated 101 is maximized, so that high-speed heating processing to the article to be heated 101 can be executed.

Next, the case where the heating condition is the uniform heating of the article to be heated 101 as another one of the microwave heating modes will be described.

The heating chamber 100 to which the microwave is supplied is a closed space, and a shape of the heating chamber is set so that a plurality of resonance modes is generated in the frequency band of the supplied microwave.

For example, in a case where the shape of the heating chamber is set so as to have 360 mm in width, 360 mm in depth, and 210 mm in height, and under a condition that there is no article to be heated 101 serving as a load in the heating chamber 100, standing waves of (530) or (350) at 2,428 MHz, (441) at 2,461 MHz, and (313) at 2,514 MHz are generated as relationships between the frequencies and the resonance modes. The numerical values in the parentheses indicate the numbers of nodes respectively generated in the width direction, the depth direction, and the height direction. The numerical values indicate dispersion of strength of an electromagnetic wave of the microwave in the heating chamber 100.

When the article to be heated 101 is accommodated in the heating chamber 100, relative permittivity of the article to be heated 101 is larger than 1 that is relative permittivity of the air, so that it is operated as if a substantial shape of the heating chamber 100 is enlarged. As a result, the frequencies generated in the above resonance modes in accordance with a type or a volume of the article to be heated 101 are generated on the lower side with respect to the above values.

Control of the uniform heating described below utilizes the plurality of resonance modes generated in the heating chamber 100.

Figure 4:
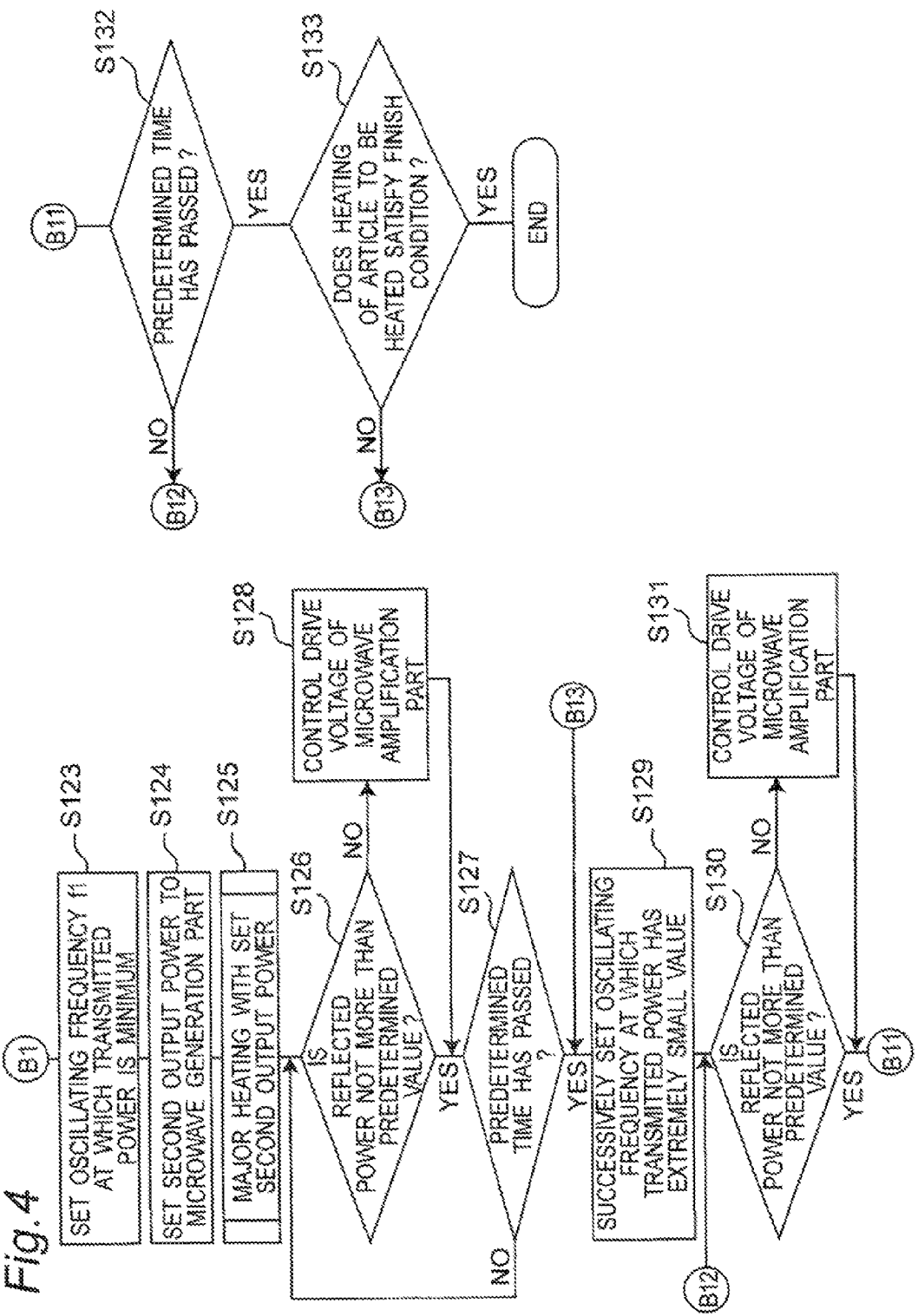
FIG. 4 is a flowchart showing control actions in the microwave heating apparatus of the first embodiment.
Figure 5:
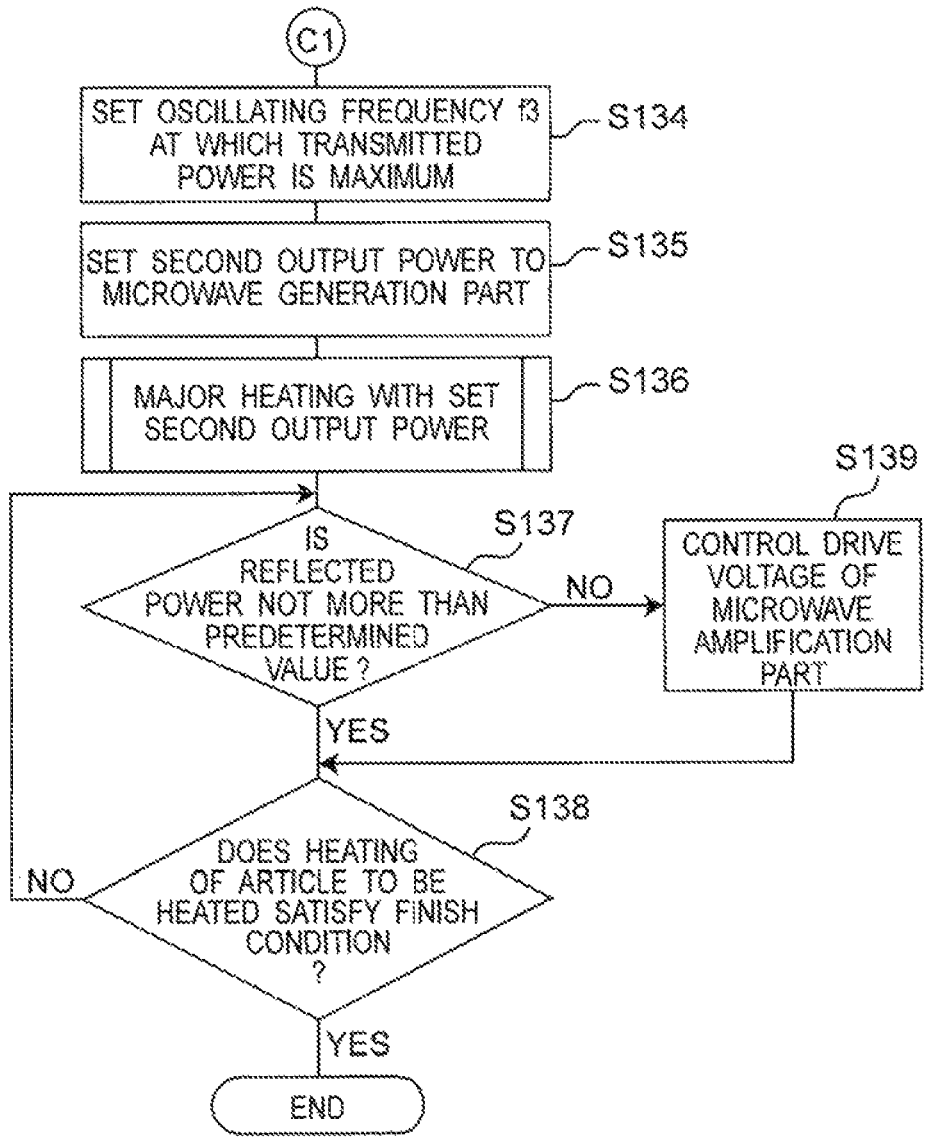
FIG. 5 is a flowchart showing control actions in the microwave heating apparatus of the first embodiment.

In a case where the heating condition is determined to the uniform heating in Step S116 shown in FIG. 3, the flow proceeds to Step S123 of FIG. 4.

In Step S123, the frequency at which the transmitted power has the minimum value (such as the frequency f1 in FIG. 2) is set as the oscillating frequency, and the flow proceeds to Step S124.

In Step S124, the drive voltage of the former microwave amplification part 112 and/or the drive voltage of the main microwave amplification part 114 is set so that the microwave generation part 10 generates the second output power serving as the rated output. Next, the major heating action is started with the second output power (the rated output) set in Step S124 (Step S125). In the major heating action, the flow proceeds to Step S126, and it is determined whether or not the reflected power detected by the power detection part 119 is not more than the predetermined value such as the value with which the ratio of the reflected power corresponds to 10% of the output of the microwave generation part 10. In a case where the reflected power does not exceed the predetermined value with which the ratio of the reflected power corresponds to 10%, the flow proceeds to Step S127. In a case where the reflected power exceeds the predetermined value, the flow proceeds to Step S128. In Step S128, the drive voltage of the former microwave amplification part 112 and/or the drive voltage of the main microwave amplification part 114 is controlled to be reduced so that the reflected power is adjusted to be not more than the predetermined value, and the flow proceeds to Step S127.

In Step S127, it is determined whether or not current action time has reached a predetermined length regulating time of operating at the same frequency. In a case where the action time has not yet reached the predetermined length, the flow is returned to Step S126. In a case where the action time has reached the predetermined length, the flow proceeds to Step S129.

In Step S129, the frequency at which the transmitted power is the second smallest (such as the frequency f2 in FIG. 2) among a group of the oscillating frequencies at which the transmitted power detected by the power detection part 119 has the extremely small value is set as the frequency, and the flow proceeds to Step S130.

It should be noted that in a case of the characteristic curve shown in FIG. 2, there are two frequencies at which the transmitted power has the extremely small value, and these two frequencies are switched and selected. However, in the characteristic curve shown as one example in FIG. 2, the frequency at which the ratio of the transmitted power is not more than 10% is only in the band of the frequency f1. Thus, in order to perform the uniform heating, there is a need for controlling to reduce the output power, to stop switching and selecting the frequencies at which the transmitted power has the extremely small value, or to limit the action time.

In a case where there are three or more frequencies at which the transmitted power has the extremely small value, the frequencies are switched and selected successively from the frequency at which the transmitted power is low to the frequency at which the transmitted power is high. In this switching and selection, when the frequency reaches the value at which the transmitted power has the maximum extremely small value, the frequency is once returned to the frequency at which the transmitted power has the minimum extremely small value, and then the frequencies at which the transmitted power has the higher value may be successively switched and selected. Alternatively, the frequencies at which the transmitted power has the lower value may be reversely and successively switched and selected after the frequency at which the transmitted power has the maximum extremely small value.

In Steps S130 to S132, the same control actions as in Steps S126 to S128 described above are executed. When the action time at the current oscillating frequency reaches the predetermined length in Step S132, the flow proceeds to Step S133.

In Step S133, the same control action as in Step S121 described above is executed. When it is determined that the heating processing is not completed, the flow is returned to Step S129. When it is determined that the heating processing is completed, the heating action is finished.

As described above, in the microwave heating apparatus of the first embodiment, the microwave is formed by controlling the microwave oscillation part 11 to successively generate the frequencies among the group of the frequencies at which the detection signals of the power detection part 119 have the extremely small values, and is supplied from the first feeding part 105 into the first heating chamber 100a. The microwave energy amount supplied into the first heating chamber 100a and consumed by the article to be heated 101 is maximized and microwave distribution in the space in the heating chamber to which the microwave power is supplied from the first feeding part 105 is changed, so that the uniform heating of the article to be heated 101 can be efficiently executed.

Next, the case where the heating condition is the grilling heating of the article to be heated 101 will be described. The grilling heating is in a radiation conduction heating mode.

In Step S114 shown in FIG. 3, the control content is selected in accordance with the heating condition of the article to be heated 101. In a case where the heating condition is the grilling heating of the article to be heated 101, the flow proceeds to Step S134 shown in FIG. 5.

In Step S134, the oscillating frequency of the microwave oscillation part 11 is set to the frequency at which the transmitted power has the maximum value (such as the frequency f3 in FIG. 2), and the flow proceeds to Step S135.

In Step S135, the drive voltage of the former microwave amplification part 112 and/or the drive voltage of the main microwave amplification part 114 is set so that the microwave generation part 10 generates the second output power serving as the rated output. Next, the major heating action is started with the second output power set in Step S135 (Step S136). In the major heating action, the flow proceeds to Step S137, and it is determined whether or not the reflected power detected by the power detection part 119 is not more than the predetermined value (the value with which the ratio of the reflected power corresponds to 10% of the output of the microwave generation part 10). In a case where the reflected power does not exceed the predetermined value, the flow proceeds to Step S138. In a case where the reflected power exceeds the predetermined value, the flow proceeds to Step S139. In Step S139, the drive voltage of the former microwave amplification part 112 and/or the drive voltage of the main microwave amplification part 114 is controlled to be reduced so that the reflected power is adjusted to be not more than the predetermined value, and the flow proceeds to Step S138.

In Step S138, the heating progress of the article to be heated 101 is determined. With regard to this heating progress, it is determined whether or not the heating processing time inputted as the heating condition has passed. In a case where the heating processing time has not yet passed, the flow is returned to Step S137. In a case where the heating processing time has passed, the heating action is finished.

As described above, by controlling the microwave oscillation part 11 so as to generate the frequency at which the transmitted power detected by the power detection part 119 has the maximum value, the microwave energy amount supplied from the first feeding part 105 into the first heating chamber 100a and consumed by the article to be heated 101 is minimized. Therefore, the microwave energy supplied from the second feeding part 106 into the second heating chamber 100b is maximized, and a microwave energy amount absorbed by the microwave absorber layer 104 is maximized, so that the grilling heating to the article to be heated 101 can be facilitated.

It should be noted that in the microwave heating apparatus of the first embodiment, the microwave heating mode and the radiation conduction heating mode can be not only respectively independently executed, but also combined with each other and executed as a composite heating mode.

The heating control action in the microwave heating apparatus of the first embodiment is described above. Hereinafter, effects by the heating control actions will be described.

By changing the oscillating frequency of the microwave oscillation part 11 at a predetermined frequency interval over the entire bandwidth (variable range) thereof following the start of heating the article to be heated 101, load impedance when the first heating chamber 100a is seen from the first feeding part 105 and the second heating chamber 100b is seen from the second feeding part 106 can be changed.

By changing the load impedance in such a way, the ratio between the microwave energy amount supplied from the first feeding part 105 into the first heating chamber 100a and consumed by the article to be heated 101, and the microwave energy amount returned from the first heating chamber 100a to the first feeding part 105 and supplied from the second feeding part 106 to the second heating chamber 100b via the circulator 118 so as to be absorbed by the microwave absorber layer 104 can be arbitrarily selected taking the oscillating frequency as a parameter. As a result, the article to be heated 101 can be effectively heated in accordance with the required heating condition.

The load impedance is changed even at the same frequency due to the shape, the type, and the amount of the article to be heated 101 accommodated in the first heating chamber 100a. However, by selecting an optimal oscillating frequency, the load impedance when the first heating chamber 100a is seen from the first feeding part 105 is brought close to power impedance when the microwave generation part 10 is seen from the first feeding part 105, so that the reflected power to the first feeding part 105 or the transmitted power to the second feeding part 106 can be reduced. In such a way, by utilizing the oscillating frequency at which the reflected power to the first feeding part 105 or the transmitted power to the second feeding part 106 has the smallest value, a heat receiving amount of the microwave energy to the article to be heated 101 is maximized, so that the article to be heated 101 can be heated at a high speed.

With the group of the frequencies at which the reflected power to the first feeding part 105 or the transmitted power to the second feeding part 106 has the extremely small value in a frequency characteristic, by successively switching the frequencies in the group of the frequencies and supplying the microwave power to the first heating chamber 100a and the second heating chamber 100b, the microwave distribution generated in each of the first heating chamber 100a and the second heating chamber 100b can be changed. As a result, the uniform heating of the article to be heated 101 and the microwave absorber layer 104 can be facilitated.

As described above, with the microwave heating apparatus of the first embodiment, in the first heating chamber 100a accommodating the article to be heated 101, the high-speed heating or the uniform heating of the article to be heated 101 can be efficiently executed by the above frequency selection control.

In the microwave heating apparatus of the first embodiment, there are a large number of frequencies at which the reflected power from the first heating chamber 100a to the first feeding part 105 or the transmitted power to the second feeding part 106 is large. With the microwave heating apparatus of the first embodiment, by utilizing the frequencies at which the microwave power amount supplied from the second feeding part 106 into the second heating chamber 100b is large, the grilling heating of the article to be heated 101 is realized. That is, the frequency at which the reflected power to the first feeding part 105 or the transmitted power to the second feeding part 106 is maximum is selected, and the microwave generation part 10 is operated at the selected frequency. By operating the microwave generation part 10 in such a way, the heat receiving amount of the microwave to the article to be heated 101 in the first heating chamber 100a accommodating the article to be heated 101 is minimum. The microwave unconsumed in the first heating chamber 100a and reflected to the first feeding part 105 is transmitted to the second feeding part 106 via the circulator 118, and is supplied into the second heating chamber 100b. The microwave supplied into the second heating chamber 100b is absorbed by the microwave absorber layer 104, so that the microwave absorber layer 104 generates heat. The generated heat of the microwave absorber layer 104 is transferred to the joined partition part 103. The partition part 103 at a high temperature radiates the heat into the first heating chamber 100a accommodating the article to be heated 101. Since the article to be heated 101 receives the radiated heat, the microwave absorber layer 104 does not reach thermal saturation and the supplied microwave can be substantially 100% consumed. As a result, with the microwave heating apparatus of the first embodiment, the grilling heating can be performed on the article to be heated 101 at a high speed.

As described above, in the microwave heating apparatus of the first embodiment, the output power of the microwave generation part 10 supplied into the heating chamber 100 can be substantially completely consumed by the article to be heated 101 and the microwave absorber layer 104. Thereby, the output of the microwave generation part 10 can be substantially 100% consumed in the heating processing of the article to be heated 101. Thus, with the microwave heating apparatus of the first embodiment according to the present invention, a heating apparatus having an excellent energy-saving performance can be provided.

It should be noted that in a case where the microwave absorber layer 104 reaches the thermal saturation and the absorption ability of the microwave is saturated, reflected power is generated from the second heating chamber 100b to the second feeding part 106. The reflected power is reflected to the microwave generation part 10 via the circulator 118, and there is a risk that the semiconductor elements serving as active elements of the microwave generation part 10 are thermally destructed. In order to prevent such thermal destruction, in the microwave heating apparatus of the first embodiment according to the present invention, when the reflected power from the second feeding part 106 exceeds a predetermined level (such as 10% of the output of the microwave generation part 10), the drive voltage of each of the microwave amplification parts 112, 114 is reduced. By controlling to reduce the drive voltage of each of the microwave amplification parts 112, 114 in such a way, a thermal loss amount due to amplification actions is reduced and the reflected power is reduced, so that the thermal destruction of the semiconductor elements can be surely prevented.

In the microwave heating apparatus of the first embodiment according to the present invention, the control of the grilling heating may be performed only at the frequency at which the transmitted power to the second feeding part 106 is maximum, or the control may be performed to sweep the frequency within a specified band taking the frequency at which the transmitted power to the second feeding part 106 is maximum as a central frequency (such as 20 MHz). By controlling to sweep the frequency, the entire microwave absorber layer 104 is uniformly heated. Thus, the grilling heating of the article to be heated 101 having a large bottom area can be effectively executed.

Selection of various control methods for the grilling heating described above may be preliminarily set in accordance with the shape, the type, the amount, and the like of the article to be heated 101.

(Second Embodiment)

Figure 6:
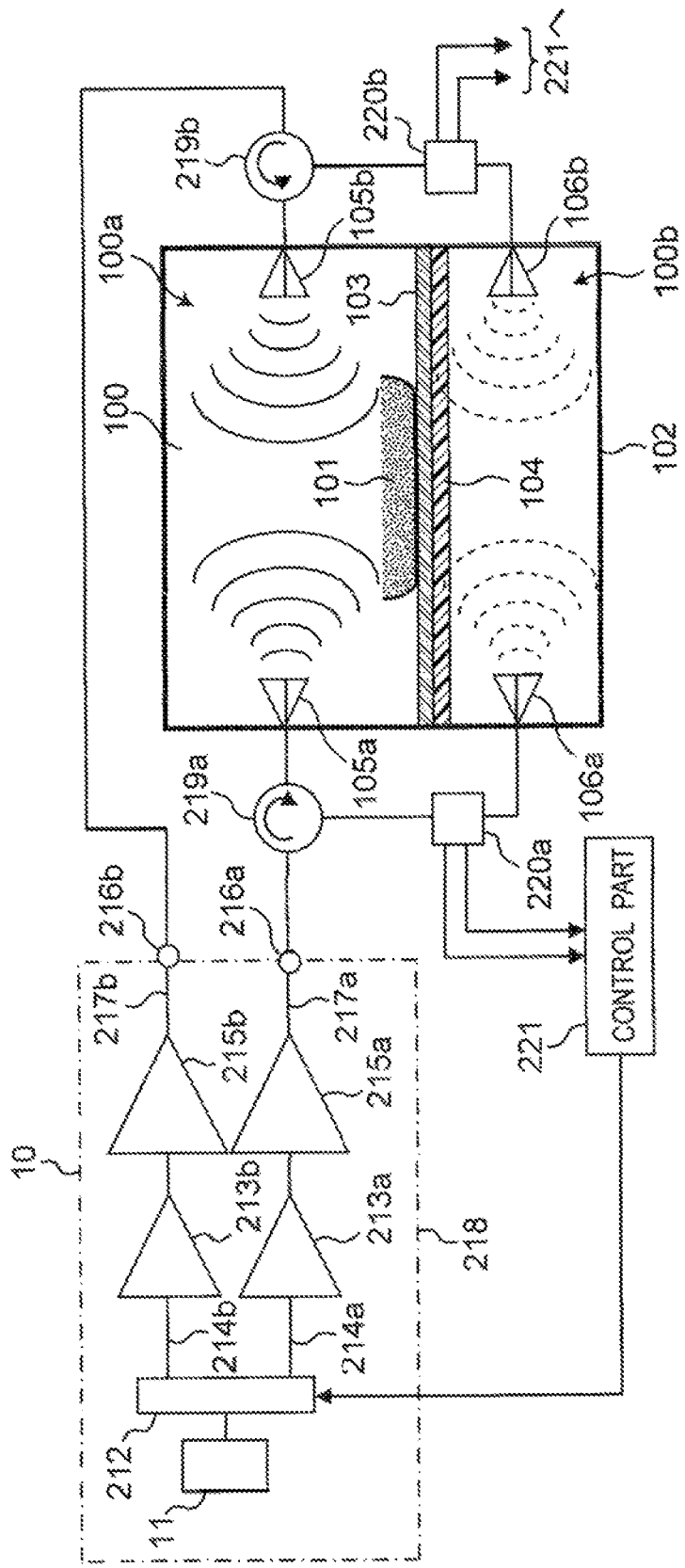
FIG. 6 is a diagram showing a configuration of a microwave heating apparatus of a second embodiment according to the present invention.
Figure 7:
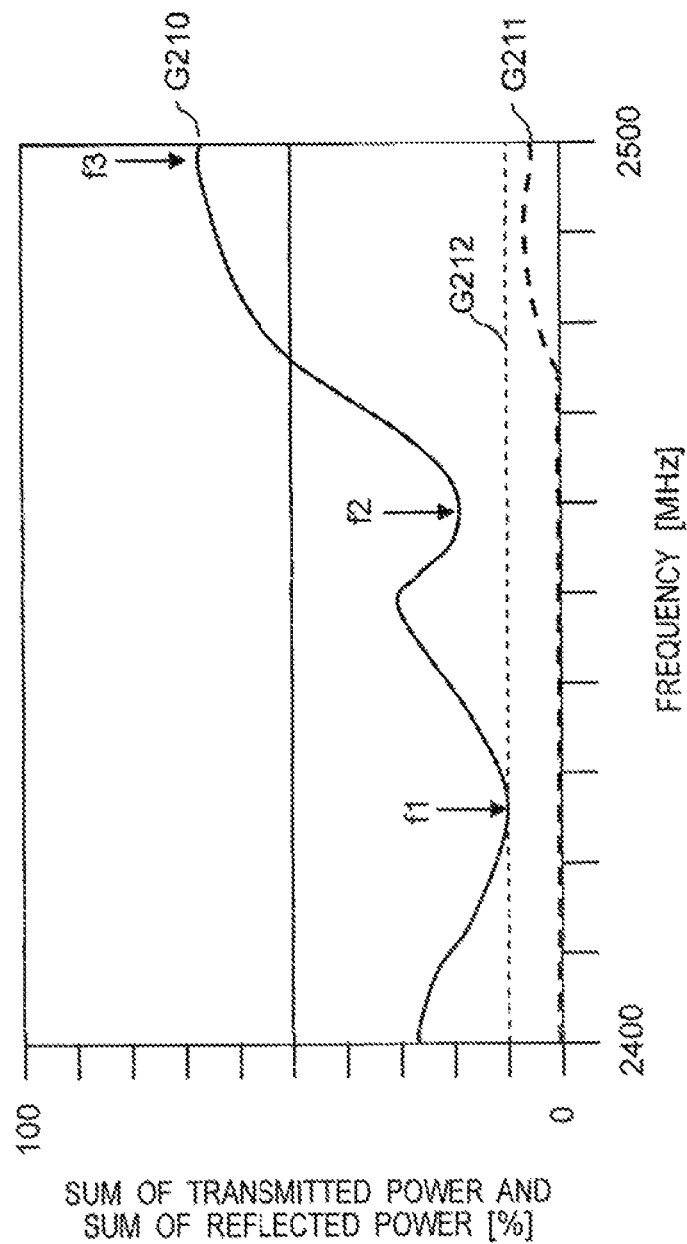
FIG. 7 is a characteristic diagram showing one example of detection signals of power detection parts in the microwave heating apparatus of the second embodiment.
Figure 8:
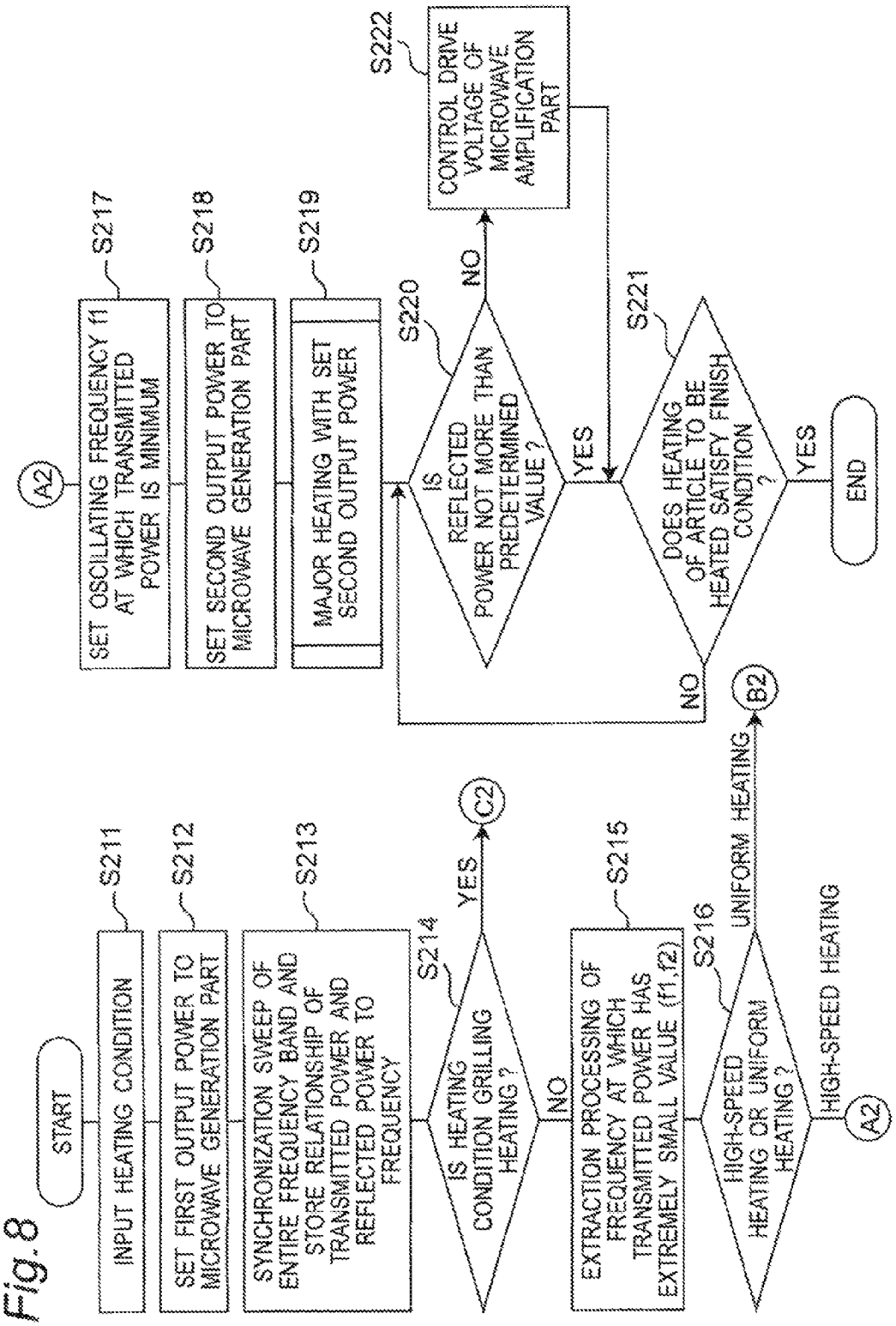
FIG. 8 is a flowchart showing control actions in the microwave heating apparatus of the second embodiment.
Figure 9:
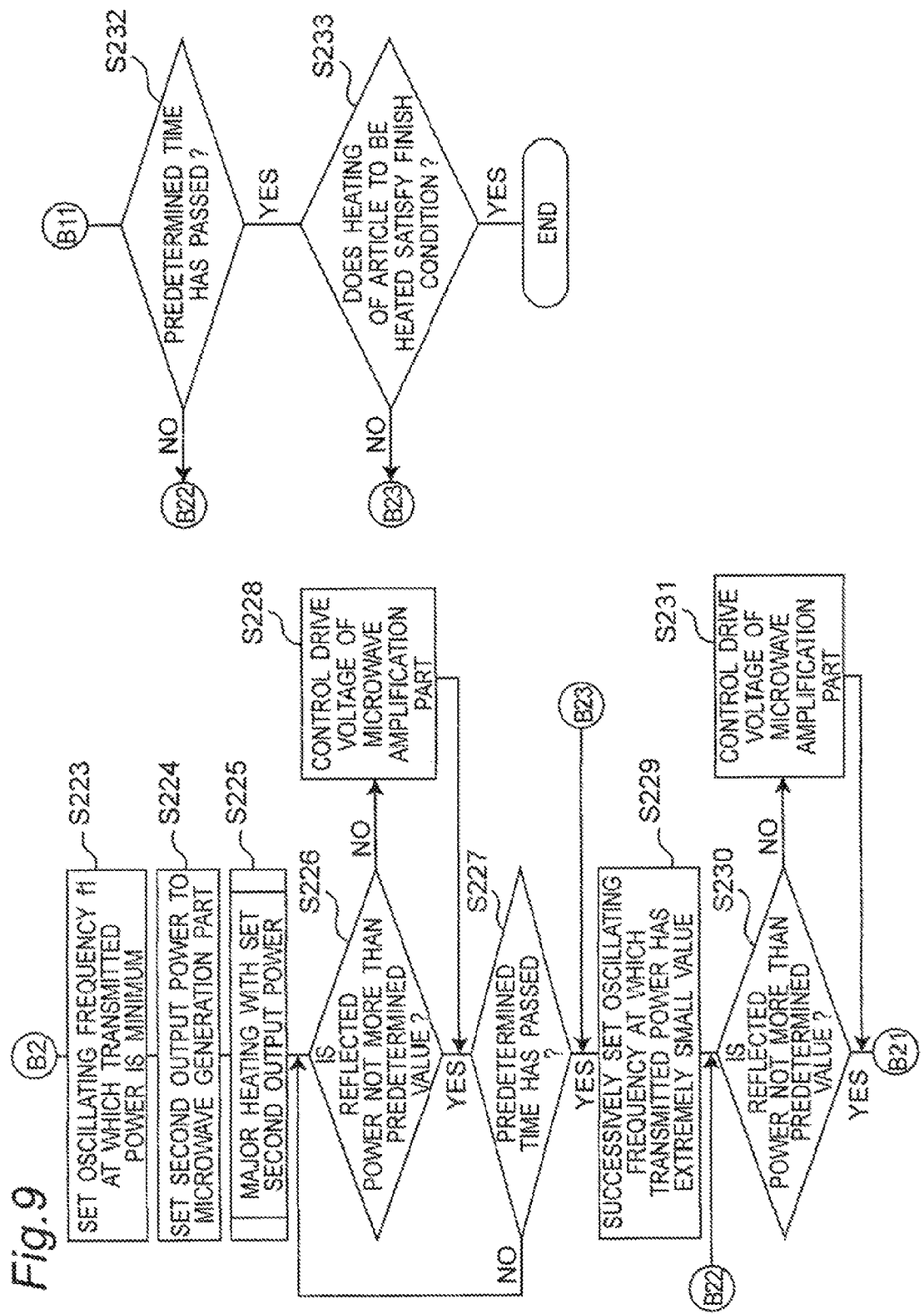
FIG. 9 is a flowchart showing control actions in the microwave heating apparatus of the second embodiment.
Figure 10:
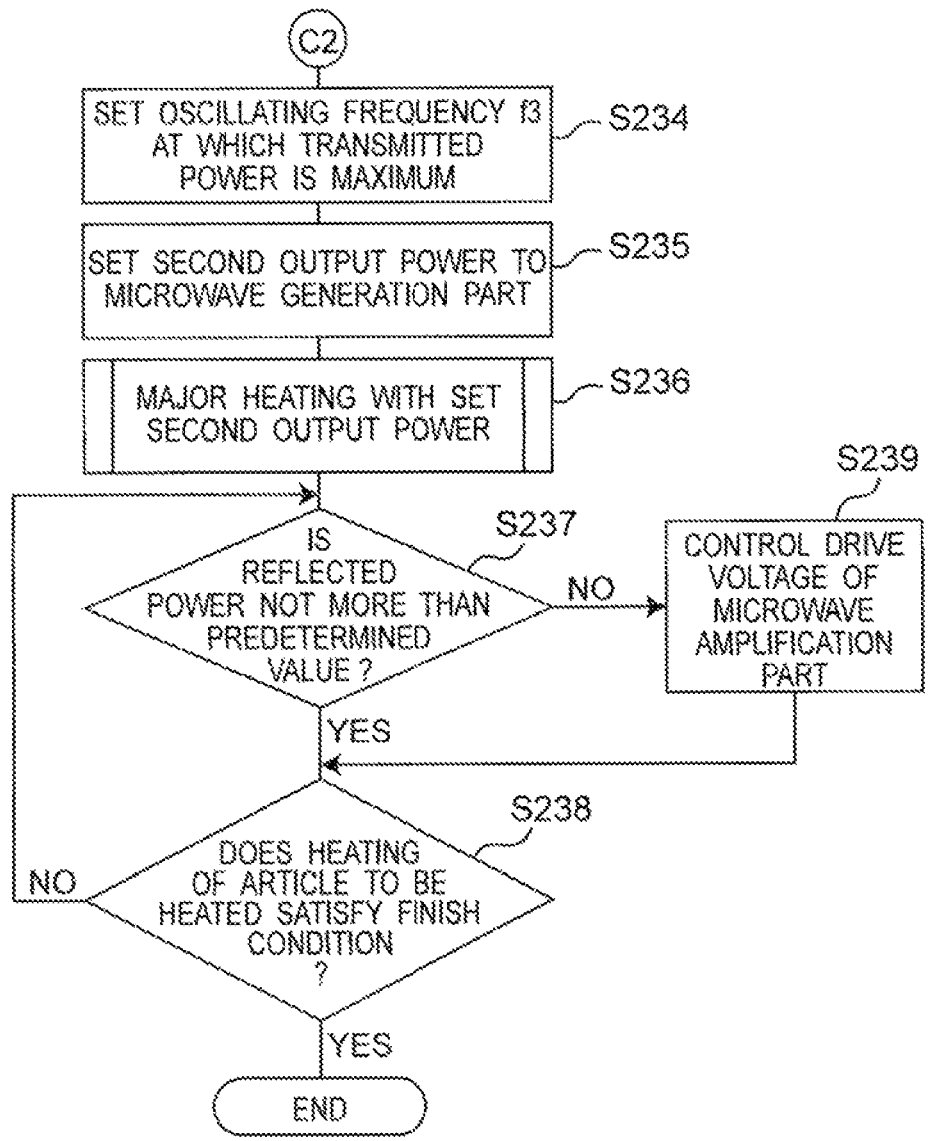
FIG. 10 is a flowchart showing control actions in the microwave heating apparatus of the second embodiment.

Hereinafter, a microwave heating apparatus of a second embodiment according to the present invention will be described with reference to attached FIGS. 6 to 10. FIG. 6 is a block diagram showing a configuration of the microwave heating apparatus of the second embodiment. FIG. 7 is a frequency characteristic diagram of the microwave heating apparatus of the second embodiment. FIGS. 8 to 10 are flowcharts showing actions in the microwave heating apparatus of the second embodiment. In the description of the second embodiment, constituent elements having the same functions and configurations as those of the above first embodiment will be given the same symbols, and the description of the first embodiment will be applied to description thereof.

In FIG. 6, the microwave generation part 10 in the microwave heating apparatus of the second embodiment has the microwave oscillation part 11 formed with using the semiconductor element, a power divider 212 for dividing the output of the microwave oscillation part 11 into two and outputting the divided outputs, former microwave amplification parts 213a, 213b to which the outputs divided in the power divider 212 are inputted via microwave transmission passages 214a, 214b, and main microwave amplification parts 215a, 215b respectively for further amplifying outputs of the former microwave amplification parts 213a, 213b. Outputs of the main microwave amplification parts 215a, 215b are respectively guided to output parts 216a, 216b via microwave transmission passages 217a, 217b. The former microwave amplification parts 213a, 213b and the main microwave amplification parts 215a, 215b are respectively formed with using semiconductor elements.

The microwave generation part 10 is formed on a dielectric substrate 218 made of a low-dielectric loss material. The former microwave amplification parts 213a, 213b and the main microwave amplification parts 215a, 215b are formed by circuits having conductive patterns formed on one surface of the dielectric substrate 218. In order to preferably operate the semiconductor elements serving as amplifying elements of the microwave amplification parts 213a, 213b, 215a, 215b, matching circuits are respectively provided on the input sides and the output sides of the semiconductor elements.

In the microwave transmission passages 214a, 214b, 217a, 217b, transmission passages having characteristic impedance of 50Ω are formed by the conductive patterns provided on the one surface of the dielectric substrate 218.

The microwave oscillation part 11 of the microwave generation part 10 has the frequency variable function of generating frequencies of 2,400 MHz to 2,500 MHz.

As shown in FIG. 6, the microwave heating apparatus of the second embodiment is provided with the heating chamber 100 accommodating the article to be heated 101, the heating chamber into which the microwave outputted from the microwave generation part 10 is supplied. In the heating chamber 100, the door for bringing the article to be heated 101 in and out (not shown) is provided in the one wall surface forming the heating chamber 100. In the heating chamber 100, the wall surfaces other than the wall surface in which the door is provided are formed by the closure plates made of the metal materials so that the microwave supplied into the heating chamber 100 is enclosed inside the heating chamber. The partition part 103 arranged and spaced apart from the heating chamber bottom wall surface 102 by the predetermined distance so as to partition the space in the heating chamber, the partition part on which the article to be heated 101 is mounted is provided inside the heating chamber 100. Therefore, the space in the heating chamber is divided by the partition part 103 into the first heating chamber 100a accommodating the article to be heated 101 in the upper space of the partition part 103, and the second heating chamber 100b as the lower space of the partition part 103. This partition part 103 is made of the metal material. On the surface (the back surface) of the partition part 103 on the opposite side of the mount surface for the article to be heated, that is, on the surface facing the second heating chamber 100b, the microwave absorber layer 104 serving as the microwave absorber which contains the microwave absorbent material is provided and closely attached.

In the heating chamber 100, there are provided two first feeding parts 105a, 105b for supplying the microwaves into the first heating chamber 100a accommodating the article to be heated 101, and two second feeding parts 106a, 106b for supplying the microwaves into the second heating chamber 100b with the one wall surface formed by the microwave absorber layer 104. The two first feeding parts 105a, 105b in the first heating chamber 100a are respectively arranged on a left wall surface and a right wall surface of the first heating chamber 100a so as to face each other. The two second feeding parts 106a, 106b in the second heating chamber 100b are respectively arranged on a left wall surface and a right wall surface of the second heating chamber 100b so as to face each other.

As well as the microwave absorber layer 104 in the above first embodiment, the base material of the microwave absorber layer 104 covering the back surface of the partition part 103 is the microwave absorbent material formed by mixing the ferrite and the resin material. The microwave absorber layer is attached to the surface facing the second heating chamber 100b (the joint surface) of the back surface of the partition part 103 to which the heat resistant coating is provided.

It should be noted that the joint surface of the partition part 103 is formed into a convexo-concave shape, and the surface area of the microwave absorber layer 104 is increased, so that the absorbing performance of the microwave supplied to the second heating chamber 100b is improved.

As shown in FIG. 6, the outputs from the microwave generation part 10 are respectively transmitted to the first feeding parts 105a, 105b via circulators 219a, 219b forming circulation type non-reciprocal circuits, and are supplied into the first heating chamber 100a. The reflected microwaves respectively returned from the first heating chamber 100a to the circulators 219a, 219b via the first feeding parts 105a, 105b are respectively transmitted to the second feeding parts 106a, 106b by the circulators 219a, 219b. In such a way, the circulators 219a, 219b are formed so as to transmit to the second feeding parts 106a, 106b the reflected microwaves returned from the first feeding parts 105a, 105b to the circulators 219a, 219b.

Power detection parts 220a, 220b are respectively arranged in transmission passages between the circulators 219a, 219b and the second feeding parts 106a, 106b. The power detection parts 220a, 220b respectively detect power amounts of the microwaves respectively transmitted from the circulators 219a, 219b to the second feeding parts 106a, 106b and power amounts of the reflected microwaves respectively returned from the second heating chamber 100b to the circulators 219a, 219b via the second feeding parts 106a, 106b.

In the microwave heating apparatus of the second embodiment, a control part 221 for controlling the actions of the microwave generation part 10 is provided. The control part 221 receives signals detected by the power detection parts 220a, 220b, performs the various processing, and then performs the variable control on the oscillating frequency of the microwave oscillation part 11.

The power detection parts 220a, 220b are formed by directional couplers having coupling degrees of about 40 dB, and detect the power amounts of about 1/10,000 of the transmitted and reflected microwave power. The power signals indicating the power amounts detected in the power detection parts 220a, 220b are respectively rectified by wave detection diodes (not shown), smoothed by capacitors (not shown), and outputted. The output signals thereof are inputted to the control part 221.

Next, actions of the microwave heating apparatus of the second embodiment according to the present invention formed as above will be described with reference to FIGS. 7 to 10.

FIG. 7 is a characteristic diagram showing one example of the detection signals of the power detection parts 220a, 220b in the microwave heating apparatus of the second embodiment. In FIG. 7, the horizontal axis of the graph indicates the frequencies (MHz), and the vertical axis indicates ratios (%) of the sum of the power (the transmitted power) detected by the power detection parts 220a, 220b and transmitted to the second feeding parts and the sum of the power (the reflected power) to be returned from the second feeding parts 106a, 106b to the circulators 219a, 219b, relative to the sum of the outputs of the microwave generation part 10. A characteristic curve G210 is indicative of the ratio of the transmitted power, and a characteristic curve G211 is indicative of the ratio of the reflected power.

The characteristic curve G210 indicative of the transmitted power has frequencies f1, f2 at which the transmission power values are extremely small, and a frequency f3 at which the transmission power has the maximum value. The characteristic curve G211 indicative of the reflected power indicates that there is a frequency band where the reflected power returned from the second feeding parts 106a, 106b to the circulators is generated in a high frequency region although the frequencies are at a low level over the entire frequency band. The reflected power is generated by the absorption ability of the microwave absorber layer 104 and the characteristic change in accordance with the impedance change of the microwave absorber layer 104 due to the absorption of the microwave and the heat generation.

It should be noted that in the graph of FIG. 7, a straight line G212 shown by a broken line indicates that the ratio of the reflected power when the microwave generation part 10 is operated with the rated output is 10%. When this 10% level, that is, an absolute value of the reflected power corresponding to 10% of the rated output serving as a reference value is exceeded, the control part 221 controls to switch the oscillating frequency of the microwave oscillation part 11 to the different frequency, and/or controls to reduce the drive voltage of each of the former microwave amplification parts 213a, 213b, 215a, 215b so as to decrease the outputs of the microwave generation part 10.

Hereinafter, a detailed control example of the microwave heating apparatus of the second embodiment according to the present invention will be described with reference to the flowcharts of FIGS. 8 to 10.

The article to be heated 101 is accommodated in the heating chamber 100 and mounted on the partition part 103, the heating condition is set by the operation part (not shown), and the heating start key is pressed, so that a heating start signal is generated (Step S211 in FIG. 8). The control part 221 to which the heating start signal is inputted generates a control output signal so as to set the microwave generation part 10 to the first output power such as the power of less than 100 W, and start the actions (Step S212). At this time, the control part 221 supplies the predetermined drive power voltage to the former microwave amplification parts 213a, 213b and the main microwave amplification parts 215a, 215b. The control part 221 also outputs the control signal of setting the initial oscillating frequency of the microwave oscillation part 11 to for example 2,400 MHz, and starts the oscillation action of the microwave oscillation part 11. In such a way, in the initial stage, the microwave generation part 10 outputs the microwave power of less than 100 W at for example 2,400 MHz as the first output power.

Next, in Step S213, the oscillating frequency of the microwave oscillation part 11 is changed to the higher frequency from 2,400 MHz in the initial stage at a 1 MHz pitch (for example 1 MHz per 10 milliseconds), and is changed to be 2,500 MHz at the upper limit of the frequency variable range. In this frequency variable action, the transmitted power and the reflected power obtained from the power detection parts 220*a*, 220*b* are respectively stored, and the flow proceeds to Step S214.

In Step S214, the control content is selected in accordance with the heating condition of the article to be heated 101. In a case where the heating condition is the grilling heating of the article to be heated 101, the flow proceeds to Step S234 shown in FIG. 10. In a case where the heating condition is other than the grilling heating, the flow proceeds to Step S215. The case where the heating condition is other than the grilling heating indicates such a case where the article to be heated 101 is heated or defrosted with mainly utilizing the microwave.

In Step S215, the frequencies at which the sum of the transmitted power obtained from the power detection parts 220*a*, 220*b* has the extremely small value in the frequency characteristic curve (such as the frequencies f1, f2 in FIG. 7) are extracted, and the flow proceeds to Step S216. In Step S216, the following control routine is selected in accordance with the heating condition of any one of the high-speed heating and the uniform heating of the article to be heated 101. In a case where the heating condition is the high-speed heating, the flow proceeds to Step S217. In a case of the uniform heating, the flow proceeds to Step S223 shown in FIG. 9. The high-speed heating and the uniform heating are in the microwave heating mode.

Firstly, the case where the heating condition is the high-speed heating with using the microwave as one of the microwave heating mode will be described.

In a case where the high-speed heating is selected as the heating condition, the frequency at which the transmitted power has the minimum value (such as the frequency f1 in FIG. 7) is set as the oscillating frequency in Step S217, and the flow proceeds to Step S218.

In Step S218, the drive voltage of the former microwave amplification parts 213*a*, 213*b* and/or the drive voltage of the main microwave amplification parts 215*a*, 215*b* is set so that the microwave generation part 10 generates the second output power serving as the rated output.

Next, the major heating action is started with the second output power (the rated output) set in Step S218 (Step S219). In the major heating action, the flow proceeds to Step S220, and it is determined whether or not the reflected power detected by each of the power detection parts 220*a*, 220*b* is not more than a predetermined value (a value corresponding to 10% of the rated output of the microwave generation part 10). In a case where the reflected power does not exceed the predetermined value, the flow proceeds to Step S221. In a case where the reflected power exceeds the predetermined value, the flow proceeds to Step S222. In Step S222, the drive voltage of the former microwave amplification parts 213*a*, 213*b* and/or the drive voltage of the main microwave amplification parts 215*a*, 215*b* is controlled to be reduced so that the reflected power is adjusted to be not more than the predetermined value, and the flow proceeds to Step S221.

In Step S221, the heating progress of the article to be heated 101 is determined. With regard to this heating progress, when the heating processing time is set as the heating condition, it is determined whether or not the heating processing time has passed. When the heating processing time has not yet passed, the flow is returned to Step S220. When the heating processing time has passed, the heating action is finished.

It should be noted that in a case where the means for detecting the physical information of the article to be heated 101 such as the surface temperature, the size, the amount, and the like relating to the article to be heated 101 is provided in the microwave heating apparatus of the second embodiment, it may be determined whether or not the heating is completed in accordance with the detection signal of the detection means of the physical information. For example in a case where the temperature detection means is used as the detection means of the physical information, it is determined whether or not the temperature has reached the desired degree (such as 75° C.). In a case where the temperature has not yet reached the desired degree, the flow is returned to Step S220. In a case where the temperature has reached the desired degree, the heating action is finished. In a case where the means for detecting the size or the amount relating to the article to be heated 101 is provided, the heating action time preliminarily determined relative to the range of each of the size and the amount is extracted in accordance with the processing method such as the cooking method, and the finish of the heating action may be determined in accordance with whether or not the heating action time has passed.

As described above, by controlling the microwave oscillation part 11 to generate the frequency at which the transmitted power detected by each of the power detection parts 220*a*, 220*b* has the minimum value, a microwave energy amount supplied from the first feeding parts 105*a*, 105*b* into the first heating chamber 100*a* and consumed by the article to be heated 101 is maximized, so that the high-speed heating processing to the article to be heated 101 can be executed.

Next, the case where the heating condition is the uniform heating of the article to be heated 101 as another one of the microwave heating modes will be described.

The control of the uniform heating described below utilizes the plurality of resonance modes generated in the heating chamber 100 described in the above first embodiment.

In a case where it is determined that the heating condition is the uniform heating in Step S216 shown in FIG. 8, the flow proceeds to Step S223 of FIG. 9.

In Step S223, the frequency at which the transmitted power has the minimum value (such as the frequency f1 in FIG. 7) is set as the oscillating frequency, and the flow proceeds to Step S224.

In Step S224, the drive voltage of the former microwave amplification parts 213*a*, 213*b* and/or the drive voltage the main microwave amplification parts 215*a*, 215*b* is set so that the microwave generation part 10 generates the second output power serving as the rated output. Next, the major heating action is started with the second output power set in Step S224 (Step S225). In the major heating action, the flow proceeds to Step S226, and it is determined whether or not the reflected power detected by each of the power detection parts 220*a*, 220*b* is not more than the predetermined value such as the value corresponding to 10% of the rated output of the microwave generation part 10. In a case where the reflected power does not exceed the predetermined value, the flow proceeds to Step S227. In a case where the reflected power exceeds the predetermined value, the flow proceeds to Step S228. In Step S228, the drive voltage of the former microwave amplification parts 213*a*, 213*b* and/or the drive voltage of the main microwave amplification parts 215*a*, 215*b* is controlled to be reduced so that the reflected power is adjusted to be not more than the predetermined value, and the flow proceeds to Step S227.

In Step S227, it is determined whether or not the current action time has reached the predetermined length regulating the time of operating at the same frequency. In a case where the action time has not yet reached the predetermined length, the flow is returned to Step S226. In a case where the action time has reached the predetermined length, the flow proceeds to Step S229.

In Step S229, the frequency at which the transmitted power is the second smallest (such as the frequency f2 in FIG. 7)

among the group of the oscillating frequencies at which the transmitted power detected by each of the power detection parts 220*a*, 220*b* has the extremely small value is set, and the flow proceeds to Step S230.

It should be noted that in a case of the characteristic curve shown in FIG. 7, there are two frequencies at which the transmitted power has the extremely small value, and the two frequencies are switched and selected. However, in the characteristic curve shown as one example in FIG. 7, the frequency at which the ratio of the transmitted power is not more than 10% is only in the band of the frequency f1. Thus, in order to perform the uniform heating, there is a need for controlling to reduce the output power, stop switching and selecting the frequencies at which the transmitted power has the extremely small value, or limiting the action time.

In a case where there are three or more frequencies at which the transmitted power has the extremely small value, the frequencies are switched and selected successively from the frequency at which the transmitted power is low to the frequency at which the transmitted power is high. In this switching and selection, when the frequency reaches the value at which the transmitted power has the maximum extremely small value, the frequency is once returned to the frequency at which the transmitted power has the minimum extremely small value, and then the frequencies at which the transmitted power has the higher value may be successively switched and selected. Alternatively, the frequencies at which the transmitted power has the lower value may be reversely and successively switched and selected after the frequency at which the transmitted power has the maximum extremely small value.

In Steps S230 to S232, the same control actions as in Steps S226 to S228 described above are executed. When the action time at the current oscillating frequency reaches the predetermined length in Step S232, the flow proceeds to Step S233.

In Step S233, the same control action as in Step S221 described above is executed. When it is determined that the heating processing is not completed, the flow is returned to Step S229. When it is determined that the heating processing is completed, the heating action is finished.

As described above, by controlling the microwave oscillation part 11 to successively generate the frequencies among the group of the frequencies at which the transmitted power detected by each of the power detection parts 220*a*, 220*b* has the extremely small value, the microwave to be supplied from each of the first feeding parts 105*a*, 105*b* into the first heating chamber 100*a* is formed. The microwave energy amount consumed by the article to be heated 101 is maximized and the microwave distribution in the space in the heating chamber to which the microwave is supplied from the first feeding parts 105*a*, 105*b* is changed, so that the uniform heating to the article to be heated 101 can be executed.

Next, the case where the heating condition is the grilling heating of the article to be heated 101 will be described. The grilling heating is in the radiation conduction heating mode.

In Step S214 shown in FIG. 8, the control content is selected in accordance with the heating condition of the article to be heated 101. In a case where the heating condition is the grilling heating of the article to be heated 101, the flow proceeds to Step S234 shown in FIG. 10.

In Step S234, the oscillating frequency of the microwave oscillation part 11 is set to the frequency at which the transmitted power has the maximum value (such as the frequency f3 in FIG. 7), and the flow proceeds to Step S235.

In Step S235, the drive voltage of the former microwave amplification parts 213*a*, 213*b* and/or the drive voltage of the main microwave amplification parts 215*a*, 215*b* is set so that the microwave generation part 10 generates the second output power serving as the rated output. Next, the major heating action is started with the second output power set in Step S235 (Step S236). In the major heating action, the flow proceeds to Step S237, and it is determined whether or not the reflected power detected by each of the power detection parts 220*a*, 220*b* is not more than the predetermined value (the value with which the ratio of the reflected power corresponds to 10% of the rated output of the microwave generation part 10). In a case where the reflected power does not exceed the predetermined value, the flow proceeds to Step S238. In a case where the reflected power exceeds the predetermined value, the flow proceeds to Step S239. In Step S239, the drive voltage of the former microwave amplification parts 213*a*, 213*b* and/or the drive voltage of the main microwave amplification parts 215*a*, 215*b* is controlled to be reduced so that the reflected power is adjusted to be not more than the predetermined value, and the flow proceeds to Step S238.

In Step S238, the heating progress of the article to be heated 101 is determined. With regard to this heating progress, it is determined whether or not the heating processing time inputted as the heating condition has passed. In a case where the heating processing time has not yet passed, the flow is returned to Step S237. In a case where the heating processing time has passed, the heating action is finished.

As described above, in the grilling heating in the microwave heating apparatus of the second embodiment, by controlling the microwave oscillation part 11 to generate the frequency at which the transmitted power detected by each of the power detection parts 220*a*, 220*b* has the maximum value, the microwave energy amount supplied from the first feeding parts 105*a*, 105*b* into the first heating chamber 100*a* and consumed by the article to be heated 101 is minimized. Therefore, the microwave energy supplied from the second feeding parts 106*a*, 106*b* into the second heating chamber 100*b* is maximized, and the microwave energy amount consumed by the microwave absorber layer 104 is maximized, so that the grilling heating to the article to be heated 101 can be facilitated.

It should be noted that in the microwave heating apparatus of the second embodiment, the microwave heating mode and the radiation conduction heating mode can be not only respectively independently executed, but also combined with each other and executed as the composite heating mode.

The heating control actions in the microwave heating apparatus of the second embodiment is described above. Hereinafter, effects by the heating control actions will be described.

By changing the oscillating frequency of the microwave oscillation part 11 at the predetermined frequency interval over the entire bandwidth (variable range) thereof following the start of heating the article to be heated 101, load impedance when the first heating chamber 100*a* is seen from the first feeding parts 105*a*, 105*b* and the second heating chamber 100*b* is seen from the second feeding parts 106*a*, 106*b* can be changed. By changing the load impedance in such a way, the ratio between the microwave energy amount supplied from the first feeding parts 105*a*, 105*b* into the first heating chamber 100*a* and consumed by the article to be heated 101, and the microwave energy amount returned from the first heating chamber 100*a* to the first feeding parts 105*a*, 105*b*, supplied from the second feeding parts 106*a*, 106*b* to the second heating chamber 100*b* via the circulators 219*a*, 219*b*, and absorbed by the microwave absorber layer 104 can be arbitrarily selected taking the oscillating frequency as the parameter. As a result, the article to be heated 101 can be effectively heated in accordance with the required heating condition.

The load impedance is changed even at the same frequency due to the shape, the type, and the amount of the article to be heated 101 accommodated in the first heating chamber 100a. However, by selecting the optimal oscillating frequency, the load impedance when the first heating chamber 100a is seen from the first feeding parts 105a, 105b is brought close to power impedance when the microwave generation part 10 is seen from the first feeding parts 105a, 105b, so that the reflected power to the first feeding parts 105a, 105b, or the transmitted power to the second feeding parts 106a, 106b can be reduced. In such a way, by utilizing the oscillating frequency at which the reflected power to the first feeding parts 105a, 105b or the transmitted power to the second feeding parts 106a, 106b has the smallest value, the heat receiving amount of the microwave energy to the article to be heated 101 is maximized, so that the article to be heated 101 can be heated at a high speed.

With the group of the frequencies at which the sum of the reflected power to the first feeding parts 105a, 105b or the sum of the transmitted power to the second feeding parts 106a, 106b has the extremely small value in the frequency characteristic, by successively switching the frequencies in the group of the frequencies and supplying to the first heating chamber 100a and the second heating chamber 100b, the microwave distribution generated in each of the first heating chamber 100a and the second heating chamber 100b can be changed. As a result, the uniform heating of the article to be heated 101 and the microwave absorber layer 104 can be facilitated.

As described above, with the microwave heating apparatus of the second embodiment, in the first heating chamber 100a accommodating the article to be heated 101, the high-speed heating or the uniform heating of the article to be heated 101 can be efficiently executed by the above frequency selection control.

In the microwave heating apparatus of the second embodiment, there are a large number of frequencies at which the sum of the reflected power from the first heating chamber 100a to the first feeding parts 105a, 105b or the sum of the transmitted power to the second feeding parts 106a, 106b is large. With the microwave heating apparatus of the second embodiment, by utilizing the frequencies at which the microwave power amounts supplied from the second feeding parts 106a, 106b into the second heating chamber 100b are large, the grilling heating of the article to be heated 101 is realized. That is, the frequency at which the sum of the reflected power to the first feeding parts 105a, 105b or the sum of the transmitted power to the second feeding parts 106a, 106b is maximum is selected, and the microwave generation part 10 is operated at the selected frequency. By operating the microwave generation part 10 in such a way, the heat receiving amount of the microwave to the article to be heated 101 in the first heating chamber 100a accommodating the article to be heated 101 is minimum. The reflected microwave unconsumed in the first heating chamber 100a and returned to the first feeding parts 105a, 105b is transmitted to the second feeding parts 106a, 106b via the circulators 219a, 219b, and is supplied into the second heating chamber 100b. The microwave supplied into the second heating chamber 100b is absorbed by the microwave absorber layer 104, so that the microwave absorber layer 104 generates the heat. The generated heat of the microwave absorber layer 104 is transferred to the joined partition part 103. The partition part 103 at the high temperature radiates the heat into the first heating chamber 100a accommodating the article to be heated 101. Since the article to be heated 101 receives the radiated heat, the microwave absorber layer 104 does not reach the thermal saturation, and the supplied microwave can be substantially 100% consumed. As a result, with the microwave heating apparatus of the second embodiment, the grilling heating can be performed on the article to be heated 101 at a high speed.

As described above, in the microwave heating apparatus of the second embodiment, the output power of the microwave generation part 10 supplied into the heating chamber 100 can be substantially completely consumed by the article to be heated 101 and the microwave absorber layer 104. Thereby, the outputs of the microwave generation part 10 are substantially 100% consumed in the heating processing of the article to be heated 101. Therefore, with the microwave heating apparatus of the second embodiment according to the present invention, a heating apparatus having an excellent energy-saving characteristic can be provided.

It should be noted that in a case where the microwave absorber layer 104 reaches the thermal saturation and the absorption ability of the microwave is saturated, reflected power is generated from the second heating chamber 100b to the second feeding parts 106a, 106b. The reflected power is reflected to the microwave generation part 10 via the circulators 219a, 219b, and there is a risk that the semiconductor elements serving as the active elements of the microwave generation part 10 are thermally destructed. In order to prevent such thermal destruction, in the microwave heating apparatus of the second embodiment according to the present invention, when the reflected power from each of the second feeding parts 106a, 106b exceeds a predetermined level (such as the value corresponding to 10% of the rated output of the microwave generation part 10), the drive voltage of corresponding one of the microwave amplification parts 213a, 213b, 215a, 215b is controlled to be reduced. By controlling in such a way, the thermal loss amount due to the amplification actions is reduced and the reflected power is reduced, so that the thermal destruction of the semiconductor elements is surely prevented.

In the microwave heating apparatus of the second embodiment according to the present invention, the control of the grilling heating may be performed only at the frequency at which the transmitted power to each of the second feeding parts 106a, 106b is maximum, or the control may be performed to sweep the frequency within the specified band taking the frequency at which the transmitted power to each of the second feeding parts 106a, 106b is maximum as the central frequency (such as 20 MHz). By controlling to sweep the frequency, the entire microwave absorber layer 104 is uniformly heated. Thus, the grilling heating of the article to be heated 101 having the large bottom area can be effectively executed.

The selection of the various control methods of the grilling heating described above may be preliminarily set in accordance with the shape, the type, the amount, and the like of the article to be heated 101.

(Third Embodiment)

Figure 11:
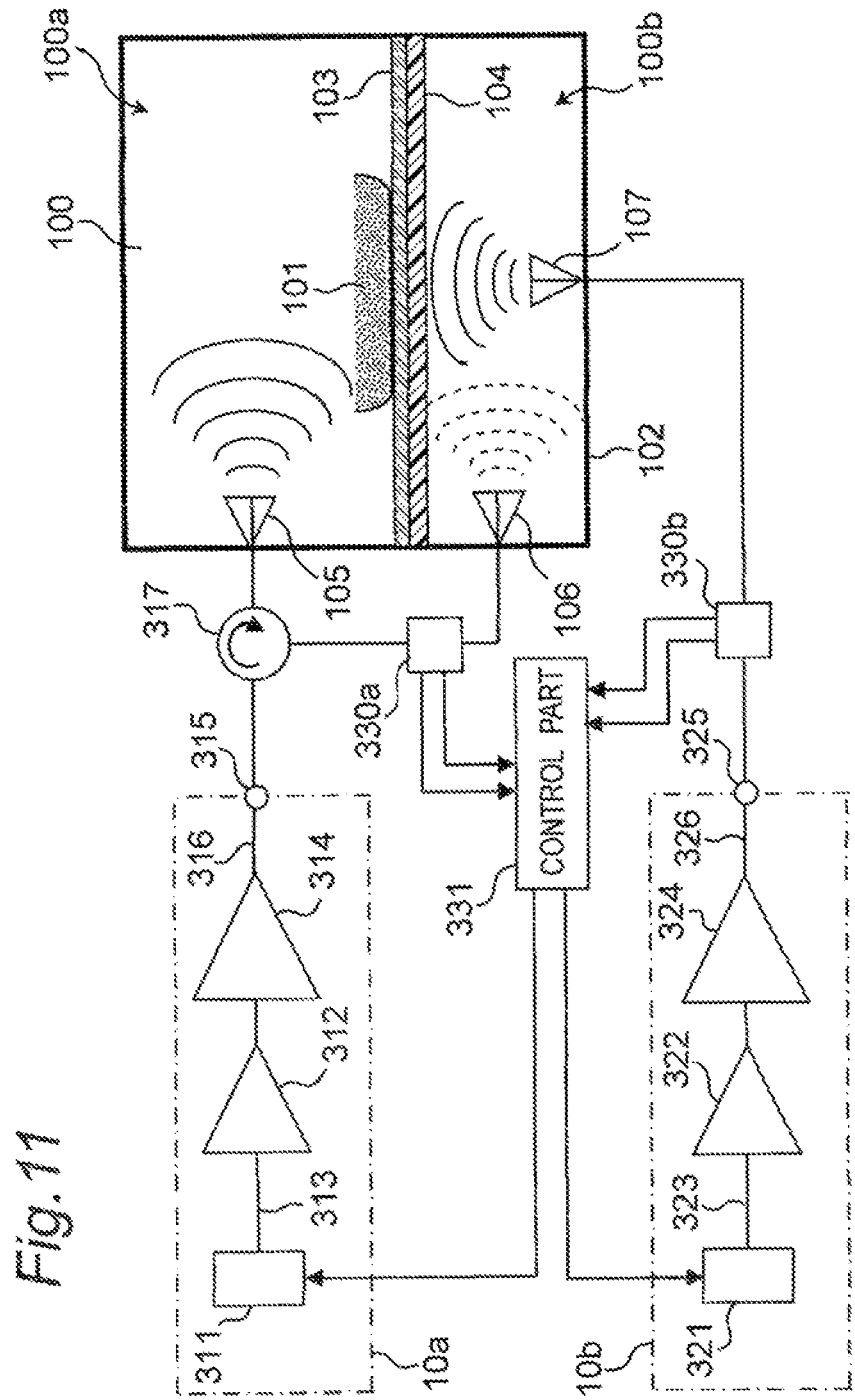
FIG. 11 is a diagram showing a configuration of a microwave heating apparatus of a third embodiment according to the present invention.
Figure 12:
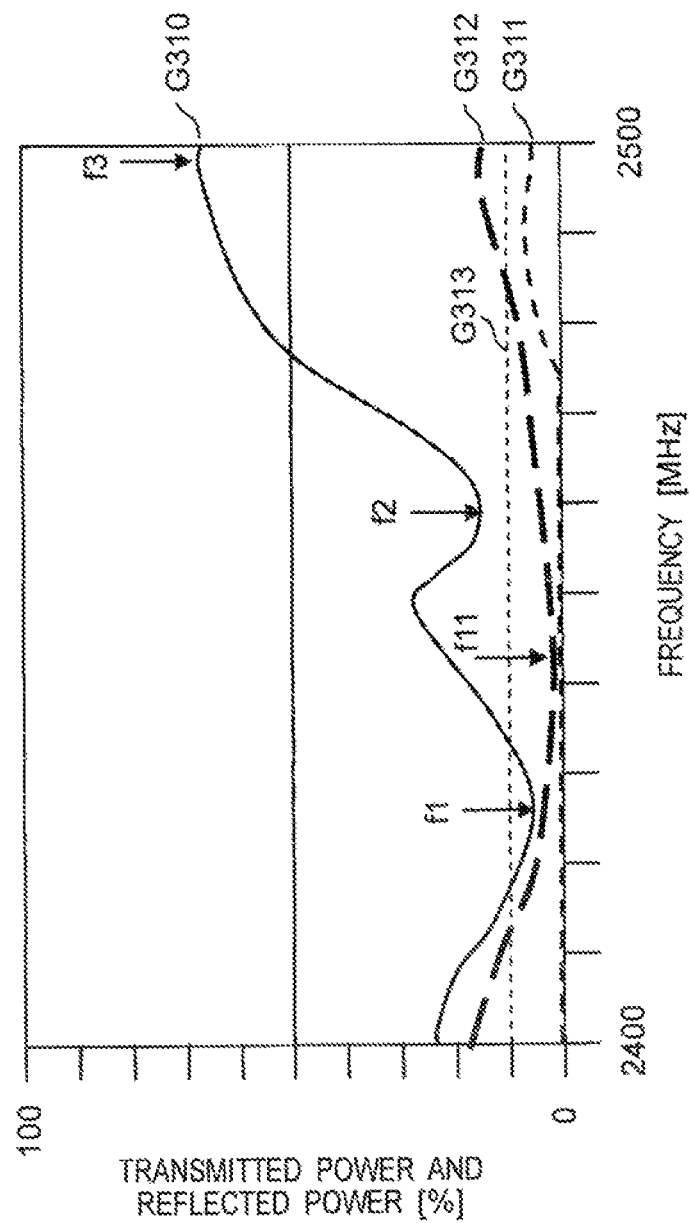
FIG. 12 is a characteristic diagram showing one example of detection signals of power detection parts in the microwave heating apparatus of the third embodiment.
Figure 14:
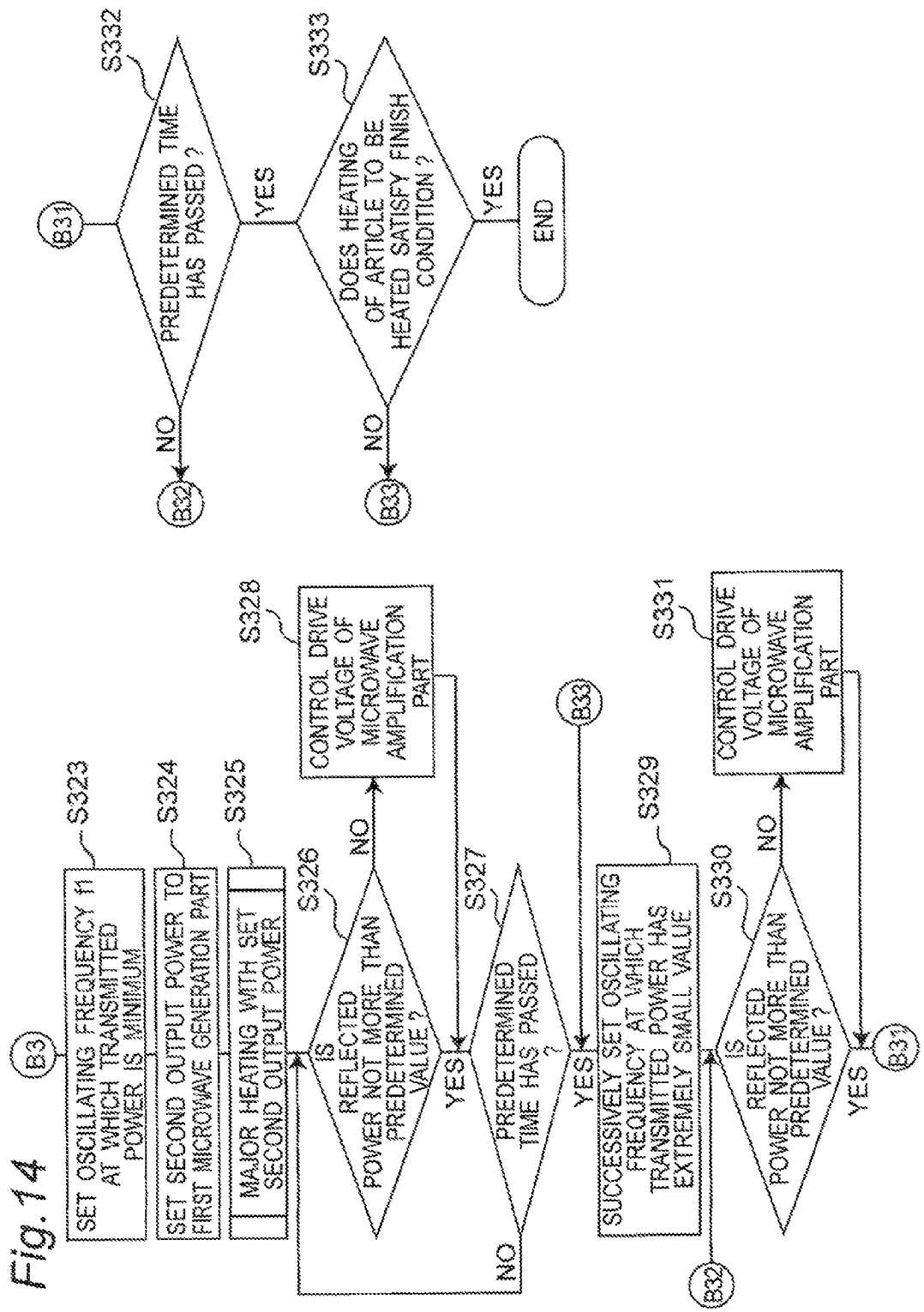
FIG. 14 is a flowchart showing control actions in the microwave heating apparatus of the third embodiment.
Figure 15:
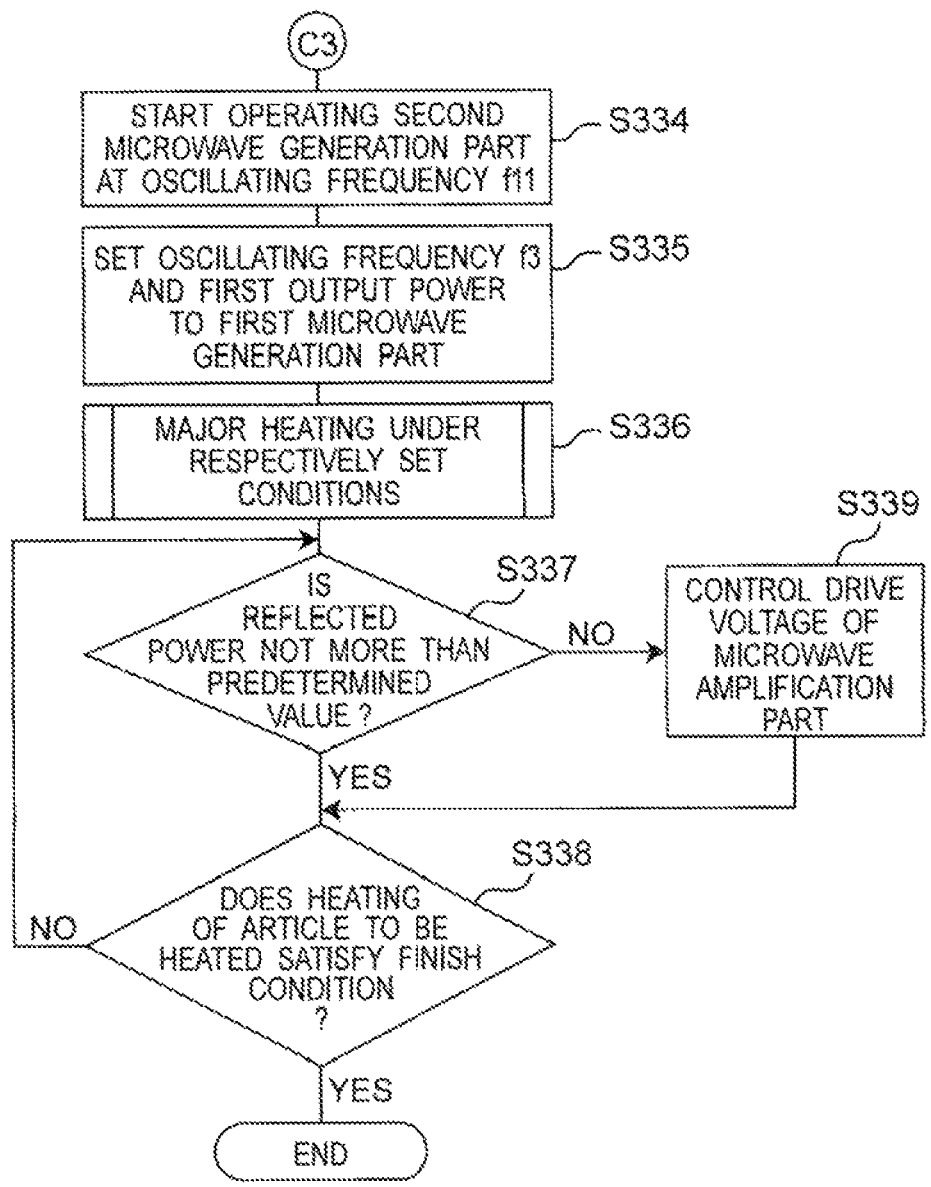
FIG. 15 is a flowchart showing control actions in the microwave heating apparatus of the third embodiment.

Hereinafter, a microwave heating apparatus of a third embodiment according to the present invention will be described with reference to attached FIGS. 11 to 15. FIG. 11 is a block diagram showing a configuration of the microwave heating apparatus of the third embodiment. FIG. 12 is a frequency characteristic diagram of the microwave heating apparatus of the third embodiment. FIGS. 13 to 15 are flow-charts showing actions in the microwave heating apparatus of the third embodiment. In the description of the third embodiment, the constituent elements having the same functions and configurations as those of the above first embodiment will be given the same symbols, and the description of the first embodiment will be applied to description thereof.

In FIG. 11, the microwave heating apparatus of the third embodiment has two microwave generation parts 10a, 10b.

The first microwave generation part 10a has a microwave oscillation part 311 formed with using a semiconductor element, a former microwave amplification part 312 to which an output of the microwave oscillation part 311 is inputted, and a main microwave amplification part 314 for further amplifying an output of the former microwave amplification part 312. The first microwave generation part 10a has a microwave transmission passage 313 for guiding the output of the microwave oscillation part 311 to the former microwave amplification part 312, and a microwave transmission passage 316 for guiding an output of the main microwave amplification part 314 to an output part 315. The former microwave amplification part 312 and the main microwave amplification part 314 are formed with using semiconductor elements.

Similarly, the second microwave generation part 10b has a microwave oscillation part 321 formed with using a semiconductor element, a former microwave amplification part 322 to which an output of the microwave oscillation part 321 is inputted, and a main microwave amplification part 324 for further amplifying an output of the former microwave amplification part 322. The second microwave generation part 10b has a microwave transmission passage 323 for guiding the output of the microwave oscillation part 321 to the former microwave amplification part 322, and a microwave transmission passage 326 for guiding an output of the main microwave amplification part 324 to an output part 325. The former microwave amplification part 322 and the main microwave amplification part 324 are formed with using semiconductor elements.

The first microwave generation part 10a and the second microwave generation part 10b have the same configuration and are respectively formed on a dielectric substrate made of a low-dielectric loss material. The former microwave amplification parts 312, 322 and the main microwave amplification parts 314, 324 are formed by circuits having conductive patterns formed on one surface of the dielectric substrate. In order to preferably operate the semiconductor elements serving as amplifying elements of the microwave amplification parts 312, 314, 322, 324, matching circuits are respectively provided on the input sides and the output sides of the semiconductor elements.

In the microwave transmission passages 313, 323, 316, 326, transmission passages having characteristic impedance of 50Ω are formed by the conductive patterns provided on the one surface of the dielectric substrate.

The microwave oscillation parts 311, 321 of the first microwave generation part 10a and the second microwave generation part 10b respectively have the frequency variable functions of generating the frequencies of 2,400 MHz to 2,500 MHz.

As shown in FIG. 11, the microwave heating apparatus of the third embodiment is provided with the heating chamber 100 accommodating the article to be heated 101, the heating chamber into which microwaves outputted from the microwave generation parts 10a, 10b are supplied. In the heating chamber 100, the door for bringing the article to be heated 101 in and out (not shown) is provided in the one wall surface forming the heating chamber 100. In the heating chamber 100, the wall surfaces other than the wall surface in which the door is provided are formed by the closure plates made of the metal materials so that the microwave supplied into the heating chamber 100 is enclosed inside the heating chamber. The partition part 103 arranged and spaced apart from the heating chamber bottom wall surface 102 by the predetermined distance so as to partition the space in the heating chamber, the partition part on which the article to be heated 101 is mounted is provided inside the heating chamber 100. Therefore, the space in the heating chamber is divided by the partition part 103 into the first heating chamber 100a accommodating the article to be heated 101 in the upper space of the partition part 103, and the second heating chamber 100b serving as the lower space of the partition part 103. This partition part 103 is made of the metal material. On the surface (the back surface) of the partition part 103 on the opposite side of the mount surface for the article to be heated, that is, on the surface facing the second heating chamber 100b, the microwave absorber layer 104 serving as the microwave absorber which contains the microwave absorbent material is provided and closely attached.

In the heating chamber 100, the first feeding part 105 for supplying the microwave into the first heating chamber 100a accommodating the article to be heated 101, and the second feeding part 106 and a third feeding part 107 for supplying the microwaves into the second heating chamber 100b with the one wall surface formed by the microwave absorber layer 104 are provided.

In the second heating chamber 100b, the third feeding part 107 is arranged in a substantially center part of the heating chamber bottom wall surface 102 facing the microwave absorber layer 104 so that the supplied microwave is scattered and radiated over the entire region of the microwave absorber layer 104. The second feeding part 106 is provided at a wall surface position where coupling with the microwave radiated from the third feeding part 107 is weak, or has a feeding antenna shape. The microwave radiated from the second feeding part 106 is the reflected microwave received from the first heating chamber 100a by the first feeding part 105.

As well as the microwave absorber layer 104 in the above first embodiment, the base material of the microwave absorber layer 104 covering the back surface of the partition part 103 is the microwave absorbent material formed by mixing the ferrite and the resin material. The microwave absorber layer is attached to the joint surface of the back surface of the partition part 103 to which the heat resistant coating is provided.

It should be noted that the joint surface of the partition part 103 is formed into a convexo-concave shape, and the surface area of the microwave absorber layer 104 is increased, so that the absorbing performance of the microwave supplied to the second heating chamber 100b is improved.

As shown in FIG. 11, an output from the first microwave generation part 10a is transmitted to the first feeding part 105 via a circulator 317 forming a circulation type non-reciprocal circuit, and supplied into the first heating chamber 100a. The reflected microwave unconsumed in the first heating chamber 100a and returned from the first feeding part 105 to the circulator 317 is transmitted to the second feeding part 106 by the circulator 317. In such a way, the circulator 317 is formed and arranged so as to transmit the reflected microwave returned from the first feeding part 105 to the circulator 317 to the second feeding part 106.

A power detection part 330a is arranged in a transmission passage between the circulator 317 and the second feeding part 106. The power detection part 330a respectively detects a power amount of the microwave transmitted from the circulator 317 to the second feeding part 106 and a power amount of the reflected microwave returned from the second heating chamber 100b to the circulator 317 via the second feeding part 106.

Meanwhile, an output of the second microwave generation part 10b is transmitted to the third feeding part 107. A power detection part 330b is arranged in a transmission passage between the output part 325 of the microwave generation part 10b and the third feeding part 107. The power detection part 330b respectively detects a power amount of the microwave transmitted from the output part 325 to the third feeding part 107 and a power amount of the reflected microwave returned from the second heating chamber 100b to the output part 325 via the third feeding part 107.

In the microwave heating apparatus of the third embodiment, a control part 331 for respectively controlling actions of the first microwave generation part 10a and the second microwave generation part 10b is provided. The control part 331 receives signals detected by the power detection parts 330a, 330b, performs the various processing, and then respectively performs the variable control on oscillating frequencies of the microwave oscillation parts 311, 321.

The power detection parts 330a, 330b are formed by directional couplers having coupling degrees of about 40 dB, and detect the power amounts of about 1/10,000 of the transmitted and reflected microwave power. The power signals detected in the power detection parts 330a, 330b indicating the power amounts are respectively rectified by wave detection diodes (not shown), smoothed by capacitors (not shown), and outputted. The output signals thereof are inputted to the control part 331.

Next, actions of the microwave heating apparatus of the third embodiment according to the present invention formed as above will be described with reference to FIGS. 12 to 15.

FIG. 12 is the characteristic diagram showing one example of the detection signals of the power detection parts 330a, 330b in the microwave heating apparatus of the third embodiment. In FIG. 12, the horizontal axis of the graph indicates the frequencies (MHz), and the vertical axis indicates ratios (%) of the power (the transmitted power) detected by the power detection parts 330a, 330b to be transmitted to the second feeding part, and the power (the reflected power) to be returned from the second feeding part 106 and the third feeding part 107 relative to the output power of the microwave generation parts 10a, 10b. A characteristic curve G310 is indicative of the ratio of the transmitted power detected by the power detection part 330a, a characteristic curve G311 is indicative of the ratio of the reflected power detected by the power detection part 330a, and a characteristic curve G312 is indicative of the ratio of the reflected power detected by the power detection part 330b.

The characteristic curve G310 indicating the transmitted power has frequencies f1, f2 at which the transmission power has the extremely small value, and a frequency f3 at which the transmission power has the maximum value. The characteristic curve G311 indicating the reflected power indicates that there is the reflected power returned from the second feeding part 106 to the circulator 317 is generated in some frequency regions although the reflected power is a little amount. The reflected power is generated by the absorption ability of the microwave absorber layer 104 and the characteristic change in accordance with the impedance change of the microwave absorber layer 104 due to the absorption of the microwave and the heat generation.

It should be noted that in the graph of FIG. 12, a straight line G313 shown by a broken line indicates a level that the ratio of the reflected power when the first microwave generation part 10a is operated with the maximum rated output is 10%. When this level of the absolute value of the reflected power is exceeded, the control part 331 controls to switch the oscillating frequency of the microwave oscillation part 311 to the different frequency, and/or controls to reduce the drive voltage of the microwave amplification parts 312, 314 so as to decrease the output of the microwave generation part 10a.

As shown by the characteristic curve G312, although the ratio of the reflected power is a low level as a whole, there is a frequency f11 indicating a minimum value in the characteristic curve. The control part 331 controls the microwave oscillation part 321 so that the second microwave generation part 10b generates the frequency f11 indicating the minimum value. It should be noted that the second heating chamber 100b provided with the microwave absorber layer 104 forms space shown by a characteristic of the characteristic curve G312.

Hereinafter, a detailed control example of the microwave heating apparatus of the third embodiment according to the present invention will be described with reference to the flowcharts of FIGS. 13 to 15.

The article to be heated 101 is accommodated in the heating chamber 100 and mounted on the partition part 103, the heating condition is set by the operation part (not shown), and the heating start key is pressed, so that a heating start signal is generated (Step S311 in FIG. 13). The control part 331 to which the heating start signal is inputted generates a control output signal so as to set the first microwave generation part 10a to the first output power such as the power of less than 100 W, and start the actions (Step S312). At this time, the control part 331 supplies the predetermined drive power voltage to the former microwave amplification part 312 and the main microwave amplification part 314. The control part 331 also outputs the control signal of setting the initial oscillating frequency of the microwave oscillation part 311 to for example 2,400 MHz, and starts the oscillation action of the microwave oscillation part 311. In such a way, in the initial stage, the first microwave generation part 10a outputs the microwave power of less than 100 W at for example 2,400 MHz as the first output power.

Next, in Step S313, the oscillating frequency of the microwave oscillation part 311 is changed to the higher frequency from 2,400 MHz in the initial stage at a 1 MHz pitch (for example 1 MHz per 10 milliseconds), and changed to be 2,500 MHz at the upper limit of the frequency variable range. In this frequency variable action, the transmitted power and the reflected power obtained from the power detection part 330a are respectively stored, and the flow proceeds to Step S314.

In Step S314, the control content is selected in accordance with the heating condition of the article to be heated 101. In a case where the heating condition is the grilling heating of the article to be heated 101, the flow proceeds to Step S334 shown in FIG. 15. In a case where the heating condition is other than the grilling heating, the flow proceeds to Step S315. The case where the heating condition is other than the grilling heating indicates such a case where the article to be heated 101 is heated or defrosted with mainly utilizing the microwave.

In Step S315, the frequencies at which the sum of the transmitted power obtained from the power detection part 330a has the extremely small value in the frequency characteristic curve (such as the frequencies f1, f2 in FIG. 12) are extracted, and the flow proceeds to Step S316. In Step S316, the following control routine is selected in accordance with the heating condition of any one of the high-speed heating and the uniform heating of the article to be heated 101. In a case where the heating condition is the high-speed heating, the flow proceeds to Step S317. In a case of the uniform heating, the flow proceeds to Step S323 shown in FIG. 14. The high-speed heating and the uniform heating are in the microwave heating mode.

Firstly, the case where the heating condition is the high-speed heating with using the microwave as one of the microwave heating mode will be described.

In a case where the high-speed heating is selected as the heating condition, the frequency at which the transmitted power has the minimum value (such as the frequency f1 in FIG. 12) is set as the oscillating frequency in Step S317, and the flow proceeds to Step S318.

In Step S318, the drive voltage of the former microwave amplification part 312 and/or the main microwave amplification part 314 is set so that the first microwave generation part 10a generates the second output power serving as the rated output.

Next, the major heating action is started with the second output power set in Step S318 (Step S319). In the major heating action, the flow proceeds to Step S320, and it is determined whether or not the absolute value of the reflected power detected by the power detection part 330a is not more than a predetermined value (the ratio of the reflected power is not more than 10% of the rated output upon operation of the first microwave generation part 10a with the second output power serving as the rated output). In a case where the absolute value of the reflected power does not exceed the predetermined value, the flow proceeds to Step S321. In a case where the absolute value exceeds the predetermined value, the flow proceeds to Step S322. In Step S322, the drive voltage of the former microwave amplification part 312 and/or the main microwave amplification part 314 is controlled to be reduced so that the absolute value of the reflected power is adjusted to be not more than the predetermined value, and the flow proceeds to Step S321.

In Step S321, the heating progress of the article to be heated 101 is determined. With regard to this heating progress, when the heating processing time is set as the heating condition, it is determined whether or not the heating processing time has passed. When the heating processing time has not yet passed, the flow is returned to Step S320. When the heating processing time has passed, the heating is finished.

It should be noted that in a case where the means for detecting the physical information of the article to be heated 101 such as the surface temperature, the size, the amount, and the like relating to the article to be heated 101 is provided in the microwave heating apparatus of the third embodiment, it may be determined whether or not the heating is completed in accordance with the detection signal of the detection means of the physical information. For example in a case where the temperature detection means is used as the detection means of the physical information, it is determined whether or not the temperature has reached the desired degree (such as 75° C.). In a case where the temperature has not yet reached the desired degree, the flow is returned to Step S320. In a case where the temperature has reached the desired degree, the heating action is finished. In a case where the means for detecting the size or the amount relating to the article to be heated 101 is provided, the heating action time preliminarily determined relative to the range of each of the size and the amount is extracted in accordance with the processing method such as the cooking method, and the finish of the heating action may be determined in accordance with whether or not the heating action time has passed.

As described above, by controlling the microwave oscillation part 311 so as to generate the frequency at which the transmitted power detected by the power detection part 330a has the minimum value, a microwave energy amount supplied from the first feeding part 105 into the first heating chamber 100a and consumed by the article to be heated 101 is maximized, so that the high-speed heating processing to the article to be heated 101 can be executed.

Next, the case where the heating condition is the uniform heating of the article to be heated 101 as another one of the microwave heating modes will be described.

The control of the uniform heating described below utilizes the plurality of resonance modes generated in the heating chamber 100 described in the above first embodiment.

In a case where it is determined that the heating condition is the uniform heating in Step S316 shown in FIG. 13, the flow proceeds to Step S323 of FIG. 14.

In Step S323, the frequency at which the transmitted power has the minimum value (such as the frequency f1 in FIG. 12) is set as the oscillating frequency, and the flow proceeds to Step S324.

In Step S324, the drive voltage of the former microwave amplification part 312 and/or the main microwave amplification part 314 is set so that the first microwave generation part 10a generates the second output power serving as the rated output. Next, the major heating action is started with the second output power set in Step S324 (Step S325). In the major heating action, the flow proceeds to Step S326, and it is determined whether or not the absolute value of the reflected power detected by the power detection part 330a is not more than the predetermined value, for example, the ratio of the reflected power is not more than 10% of the rated output upon the operation of the first microwave generation part 10a with the second output power serving as the rated output. In a case where the absolute value of the reflected power does not exceed the predetermined value, the flow proceeds to Step S327. In a case where the absolute value exceeds the predetermined value, the flow proceeds to Step S328. In Step S328, the drive voltage of the former microwave amplification part 312 and/or the main microwave amplification part 314 is controlled to be reduced so that the absolute value is adjusted to be not more than the predetermined value, and the flow proceeds to Step S327.

In Step S327, it is determined whether or not the current action time has reached the predetermined length regulating the time of operating at the same frequency. In a case where the action time has not yet reached the predetermined length, the flow is returned to Step S326. In a case where the action time has reached the predetermined length, the flow proceeds to Step S329.

In Step S329, the frequency at which the transmitted power is the second smallest (such as the frequency f2 in FIG. 12) among the group of the oscillating frequencies at which the transmitted power detected by the power detection part 330a has the extremely small value is set, and the flow proceeds to Step S330.

It should be noted that in a case of the characteristic curve shown in FIG. 12, there are two frequencies at which the transmitted power has the extremely small value, and the two frequencies are switched and selected. However, in the characteristic curve shown as one example in FIG. 12, the frequency at which the ratio of the transmitted power is not more than 10% is only in the band in the vicinity of the frequency f1. Thus, in order to perform the uniform heating, there is a need for controlling to reduce the output power, stop switching and selecting the frequencies at which the transmitted power has the extremely small value, or limiting the action time.

In a case where there are three or more frequencies at which the transmitted power has the extremely small value, the frequencies are switched and selected successively from the frequency at which the transmitted power is low to the frequency at which the transmitted power is high. In this switching and selection, when the frequency reaches the value at which the transmitted power has the maximum extremely small value, the frequency is once returned to the value at which the transmitted power has the minimum extremely small value, and then the frequencies at which the transmitted power has the higher value may be successively switched and selected. Alternatively, the frequencies at which the transmitted power has the lower value may be reversely and successively switched and selected after the frequency at which the transmitted power has the maximum extremely small value.

In Steps S330 to S332, the same control actions as in Steps S326 to S328 described above are executed. When the action time at the current oscillating frequency reaches the predetermined length in Step S332, the flow proceeds to Step S333.

In Step S333, the same control action as in Step S321 described above is executed. When it is determined that the heating processing is not completed, the flow is returned to Step S329. When it is determined that the heating processing is completed, the heating action is finished.

As described above, by controlling the microwave oscillation part 311 to successively generate the frequencies among the group of the frequencies at which the transmitted power detected by the power detection part 330a has the extremely small value, the microwave energy amount supplied from the first feeding part 105 into the first heating chamber 100a and consumed by the article to be heated 101 is maximized and the microwave distribution in the space in the heating chamber to which the microwave is supplied from the first feeding part 105 is changed, so that the uniform heating to the article to be heated 101 can be executed.

Next, the case where the heating condition is the grilling heating of the article to be heated 101 will be described. The grilling heating is in the radiation conduction heating mode.

In Step S314 shown in FIG. 13, the control content is selected in accordance with the heating condition of the article to be heated 101. In a case where the heating condition is the grilling heating of the article to be heated 101, the flow proceeds to Step S334 shown in FIG. 15.

In Step S334, the microwave oscillation part 321 of the second microwave generation part 10b is operated at the preliminarily defined oscillating frequency f11, the drive voltage of the former microwave amplification part 322 and/or the main microwave amplification part 324 is set so that the second microwave generation part 10b generates the rated output, and the actions of the microwave generation part 10b are started.

In Step S335, the drive voltage of the former microwave amplification part 312 and/or the main microwave amplification part 314 is set so that the first microwave generation part 10a generates the first output power at the oscillating frequency f3 at which the transmitted power detected by the power detection part 330a has the maximum value. Next, the major heating action is started with the output power set in Steps S334 and S335 (Step S336). In the major heating action, the flow proceeds to Step S337, and it is determined whether or not the reflected power detected by the power detection part 330b is not more than a predetermined value (a value with which the ratio of the reflected power corresponds to 10% of the output of the second microwave generation part 10b). In a case where the reflected power does not exceed the predetermined value, the flow proceeds to Step S338. In a case where the reflected power exceeds the predetermined value, the flow proceeds to Step S339. In Step S339, the drive voltage of the former microwave amplification part 322 and/or the main microwave amplification part 324 is controlled to be reduced so that the reflected power is adjusted to be not more than the predetermined value, and the flow proceeds to Step S338.

In Step S338, the heating progress of the article to be heated 101 is determined. With regard to this heating progress, it is determined whether or not the heating processing time inputted as the heating condition has passed. In a case where the heating processing time has not yet passed, the flow is returned to Step S337. In a case where the heating processing time has passed, the heating is finished.

As described above, in the grilling heating in the microwave heating apparatus of the third embodiment, by controlling the microwave oscillation part 311 to generate the frequency at which the transmitted power detected by the power detection part 330a has the maximum value, the microwave energy amount supplied from the first feeding part 105 into the first heating chamber 100a and consumed by the article to be heated 101 is minimized. Therefore, the microwave energy supplied from the second feeding part 106 into the second heating chamber 100b is maximized, and the microwave is supplied from the third feeding part 107 into the second heating chamber 100b. Thus, by the sum of the microwave supplied from the second feeding part 106 and the microwave supplied from the third feeding part 107, the microwave energy amount consumed by the microwave absorber layer 104 is maximized, and a heat generation speed of the microwave absorber layer 104 is maximized, so that the grilling heating of the article to be heated 101 can be executed at a high speed.

It should be noted that in the microwave heating apparatus of the third embodiment, the microwave heating mode and the radiation conduction heating mode can be not only respectively independently executed, but also combined with each other and executed as the composite heating mode.

The heating control actions in the microwave heating apparatus of the third embodiment is described above. Hereinafter, effects by the heating control actions will be described.

By changing the oscillating frequency of the microwave oscillation part 311 at the predetermined frequency interval over the entire bandwidth (variable range) thereof following the start of heating the article to be heated 101, the load impedance when the first heating chamber 100a is seen from the first feeding part 105 can be changed. By changing the load impedance in such a way, the ratio between the microwave energy amount supplied from the first feeding part 105 into the first heating chamber 100a and consumed by the article to be heated 101, and the microwave energy amount reflected to the first feeding part 105, supplied from the second feeding part 106 to the second heating chamber 100b via the circulator 317, and absorbed by the microwave absorber layer 104 can be arbitrarily selected taking the oscillating frequency as the parameter. As a result, the article to be heated 101 can be effectively heated in accordance with the required heating condition.

The load impedance is changed even at the same frequency due to the shape, the type, and the amount of the article to be heated 101 accommodated in the first heating chamber 100a. However, by selecting the optimal oscillating frequency, the load impedance when the first heating chamber 100a is seen from the first feeding part 105 is brought close to output impedance of the microwave generation part 10a, so that the reflected power to the first feeding part 105, or the transmitted power to the second feeding part 106 can be reduced. In such a way, by utilizing the oscillating frequency at which the reflected power to the first feeding part 105, or the transmitted power to the second feeding part 106 has the smallest value, the heat receiving amount of the microwave energy to the article to be heated 101 is maximized, so that the article to be heated 101 can be heated at a high speed.

With the group of the frequencies at which the reflected power to the first feeding part 105, or the transmitted power to the second feeding part 106 has the extremely small value in the frequency characteristic, by successively switching the frequencies in the group of the frequencies and supplying to the first heating chamber 100a, the microwave distribution generated in the space in the first heating chamber 100a can be changed. As a result, the uniform heating of the article to be heated 101 and the microwave absorber layer 104 can be facilitated.

As described above, with the microwave heating apparatus of the third embodiment, in the first heating chamber 100a accommodating the article to be heated 101, the high-speed heating or the uniform heating of the article to be heated 101 can be efficiently executed by the above frequency selection control.

In the microwave heating apparatus of the third embodiment, there are a large number of frequencies at which the reflected power from the first heating chamber 100a to the first feeding part 105, or the transmitted power to the second feeding part 106 is large. With the microwave heating apparatus of the third embodiment, by utilizing the frequencies at which the microwave power amount supplied from the second feeding part 106 into the second heating chamber 100b is large, facilitation of the grilling heating of the article to be heated 101 is realized at the same time as guiding heating (inside heating) of the article to be heated 101. That is, in the grilling heating, the frequency at which the reflected power to the first feeding part 105, or the transmitted power to the second feeding part 106 is maximum is selected, and the first microwave generation part 10a is operated at the selected frequency. Thereby, the heat receiving amount of the microwave to the article to be heated 101 in the first heating chamber 100a accommodating the article to be heated 101 is minimum, and the reflected microwave energy unconsumed in the first heating chamber 100a and returned to the first feeding part 105 is maximum. The reflected microwave is transmitted to the second feeding part 106 via the circulator 317, and supplied from the second feeding part 106 into the second heating chamber 100b.

In the grilling heating, the microwave is supplied from the second microwave generation part 10b into the second heating chamber 100b at the best efficiency. Therefore, the microwaves from both the first microwave generation part 10a and the second microwave generation part 10b are supplied into the second heating chamber 100b, the microwave absorber layer 104 absorbs the microwave energy thereof, and the microwave absorber layer 104 generates the heat at a high speed. The generated heat of the microwave absorber layer 104 is transferred to the joined partition part 103. The partition part 103 at the high temperature radiates the heat into the first heating chamber 100a accommodating the article to be heated 101. Since the article to be heated 101 receives the radiated heat, the microwave absorber layer 104 does not reach the thermal saturation, and the supplied microwave can be substantially 100% consumed. As a result, with the microwave heating apparatus of the third embodiment, the grilling heating can be performed on the article to be heated 101 at a high speed.

As described above, in the microwave heating apparatus of the third embodiment, the output power of the microwave generation parts 10a, 10b supplied into the heating chamber 100 can be substantially completely consumed by the article to be heated 101 and the microwave absorber layer 104. Thereby, the outputs of the microwave generation parts 10a, 10b can be substantially 100% consumed in the heating processing of the article to be heated 101. Therefore, with the microwave heating apparatus of the third embodiment according to the present invention, a heating apparatus having the excellent energy-saving performance can be provided.

It should be noted that in a case where the microwave absorber layer 104 reaches the thermal saturation and the absorption ability of the microwave is saturated, reflected power is generated from the second heating chamber 100b to the second feeding part 106 and the third feeding part 107. The reflected power is respectively reflected to the first microwave generation part 10a and the second microwave generation part 10b, and there is a risk that the semiconductor elements serving as the active elements of the first microwave generation part 10a and the second microwave generation part 10b are thermally destructed. In order to prevent such thermal destruction, in the microwave heating apparatus of the third embodiment according to the present invention, when the reflected power from each of the second feeding part 106 and the third feeding part 107 exceeds a predetermined level (such as values corresponding to 10% of the rated outputs of the microwave generation parts 10a, 10b), the drive voltage of corresponding one of the microwave amplification parts 312, 322, 314, 324 is controlled to be reduced. By controlling in such a way, the thermal loss amount due to the amplification actions is reduced and the reflected power is reduced, so that the thermal destruction of the semiconductor elements can be surely prevented.

In the microwave heating apparatus of the third embodiment according to the present invention, the control of the grilling heating may be performed only at the frequency at which the transmitted power to the second feeding part 106 is maximum, or the control may be performed to sweep the frequency within the specified band taking the frequency at which the transmitted power to the second feeding part 106 is maximum as the central frequency (such as 10 MHz). By controlling to sweep the frequency, the entire microwave absorber layer 104 is uniformly heated. Thus, the grilling heating of the article to be heated 101 having the large bottom area can be effectively executed.

In the grilling heating, the output of the first microwave generation part 10a may be the rated output serving as the second output power. Since the entire microwave absorber is uniformly heated with the rated output and the frequency sweeping, the grilling heating of the article to be heated having the large bottom area can be further effectively executed. The selection of the various control methods of the grilling heating described above may be preliminarily set in accordance with the shape, the type, the amount, and the like of the article to be heated 101.

(Fourth Embodiment)

Figure 16:
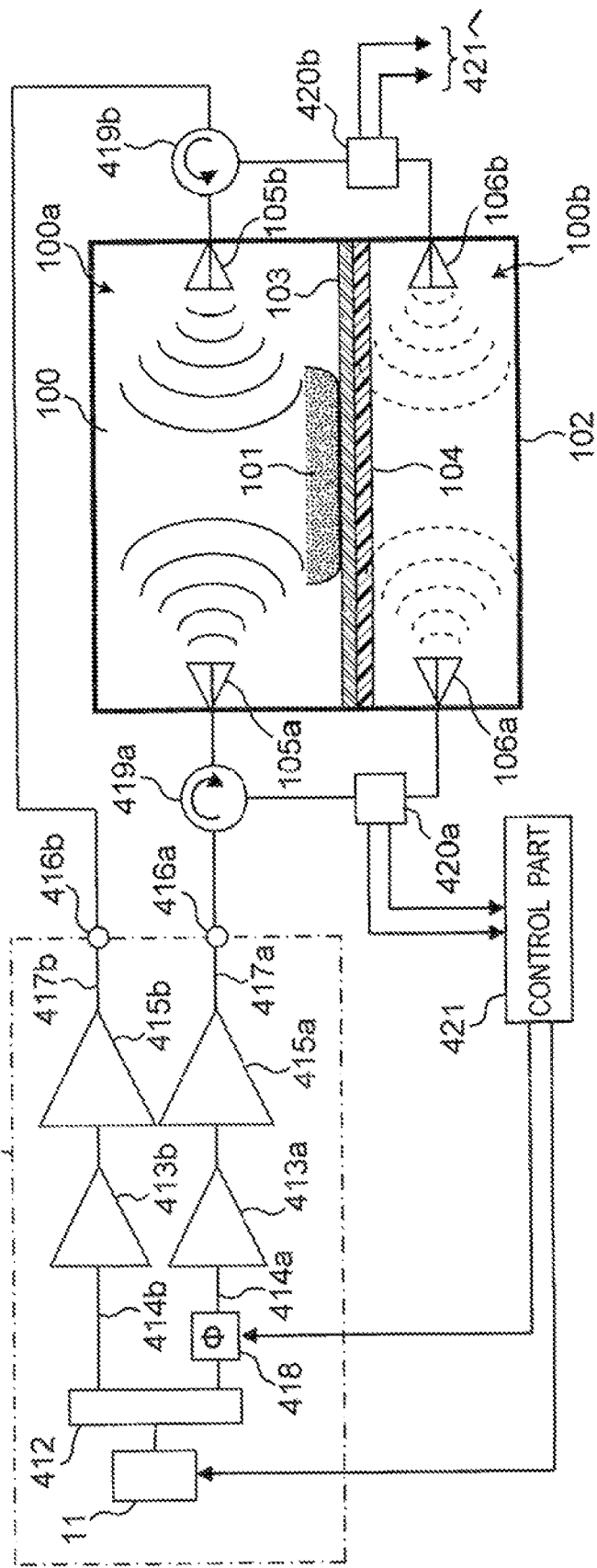
FIG. 16 is a diagram showing a configuration of a microwave heating apparatus of a fourth embodiment according to the present invention.
Figure 17:
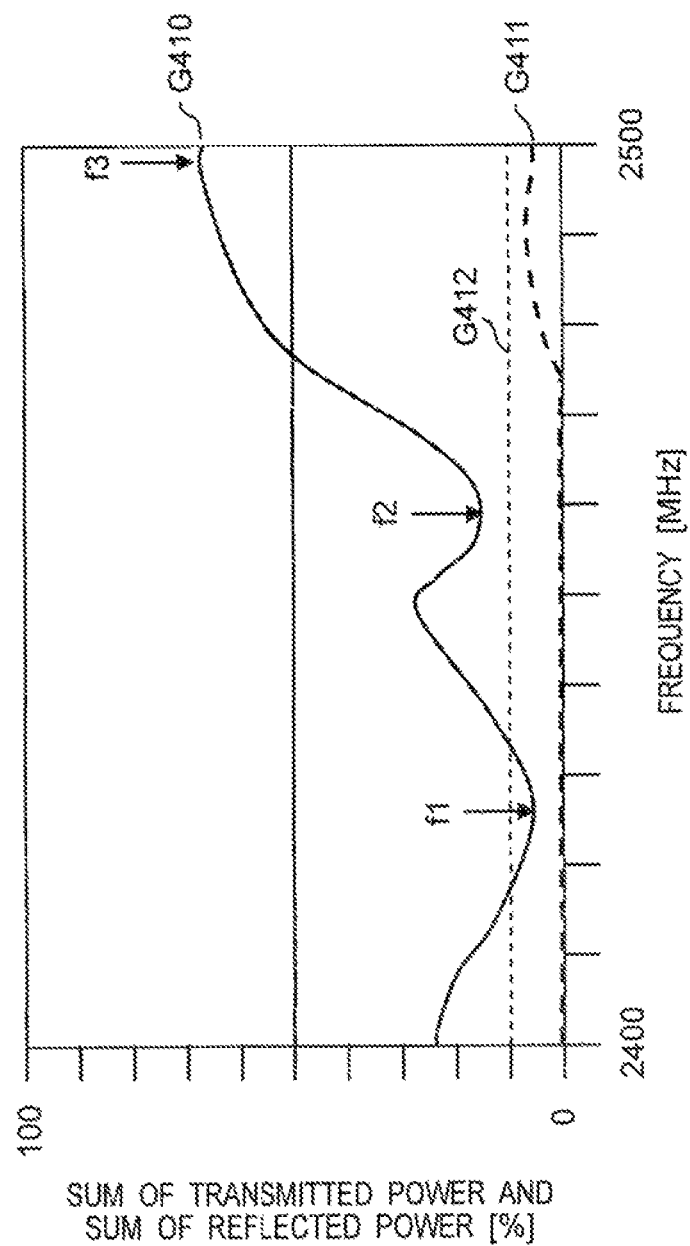
FIG. 17 is a characteristic diagram showing one example of detection signals of power detection parts in the microwave heating apparatus of the fourth embodiment.
Figure 18:
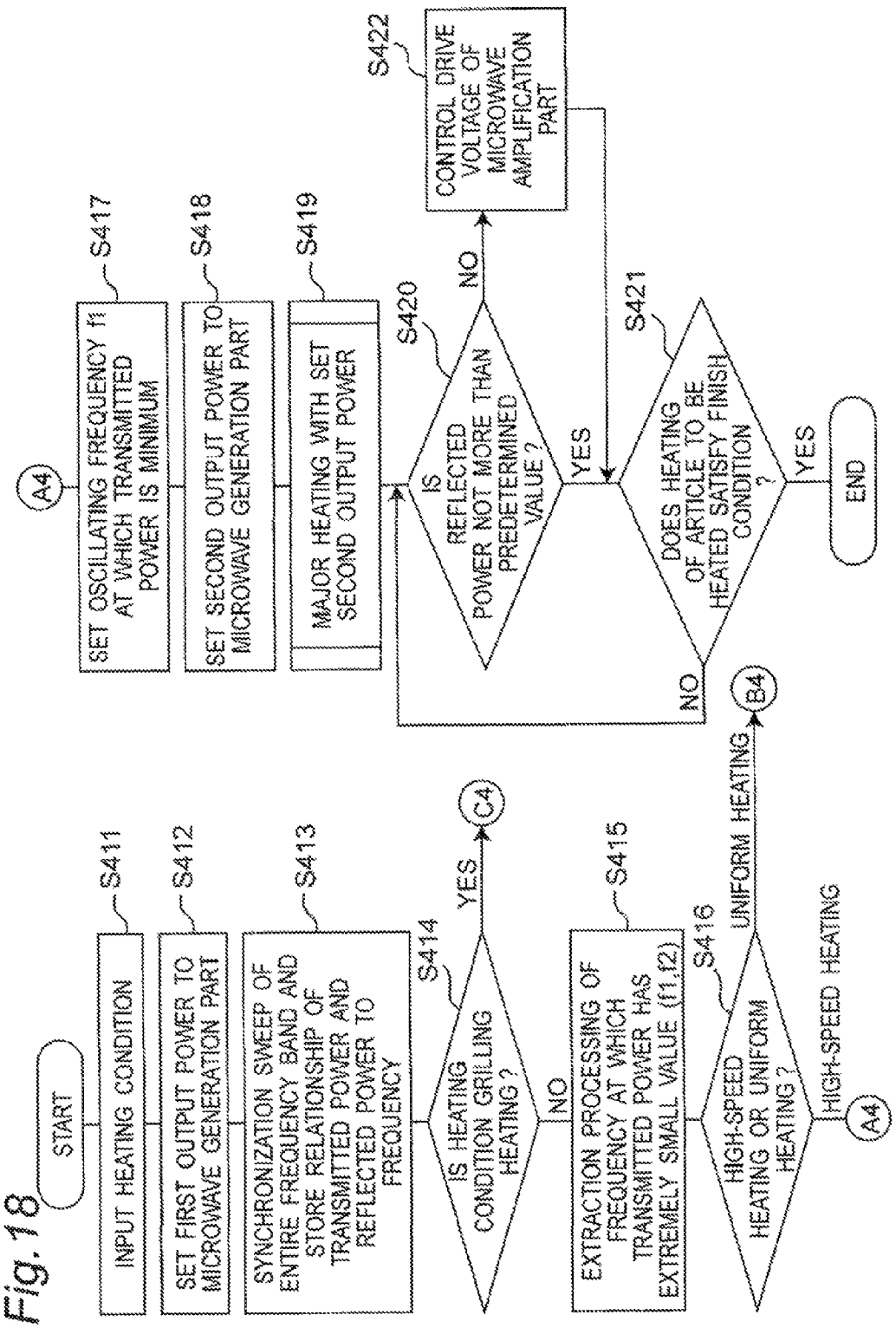
FIG. 18 is a flowchart showing control actions in the microwave heating apparatus of the fourth embodiment.
Figure 19:
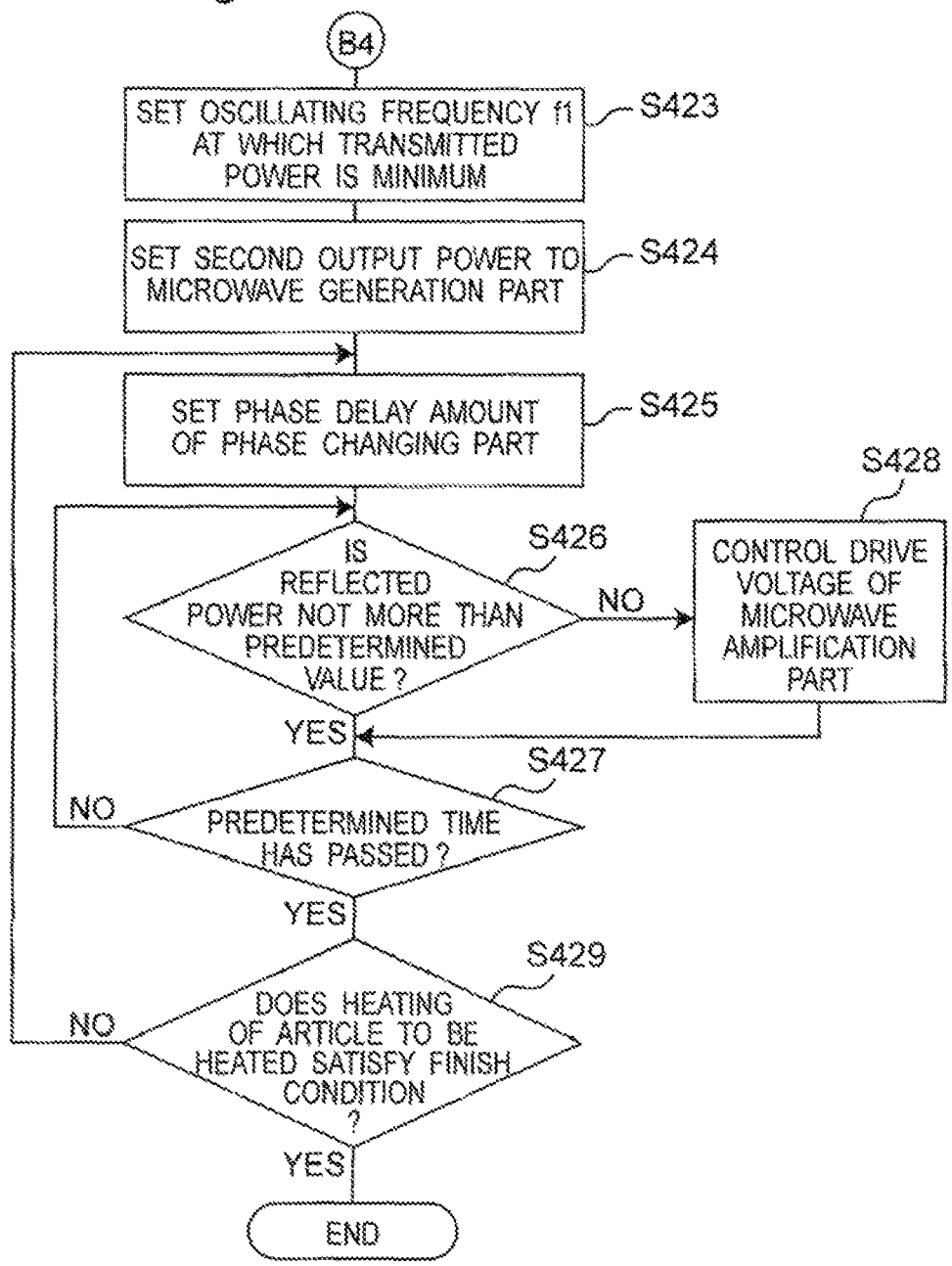
FIG. 19 is a flowchart showing control actions in the microwave heating apparatus of the fourth embodiment.
Figure 20:
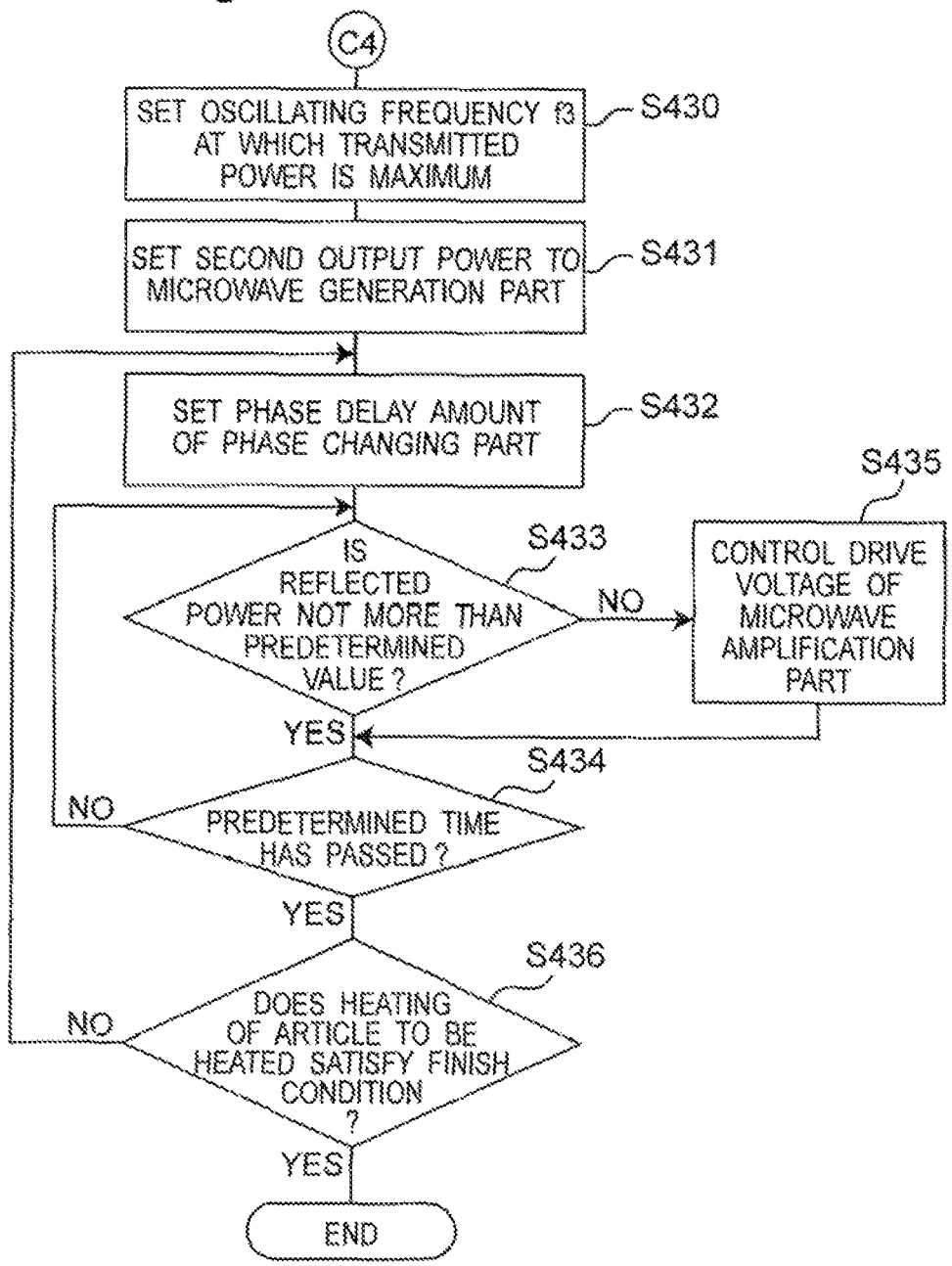
FIG. 20 is a flowchart showing control actions in the microwave heating apparatus of the fourth embodiment.

Hereinafter, a microwave heating apparatus of a fourth embodiment according to the present invention will be described with reference to attached FIGS. 16 to 20. FIG. 16 is a block diagram showing a configuration of the microwave heating apparatus of the fourth embodiment. FIG. 17 is a frequency characteristic diagram of the microwave heating apparatus of the fourth embodiment. FIGS. 18 to 20 are flowcharts showing actions in the microwave heating apparatus of the fourth embodiment. In the description of the fourth embodiment, the constituent elements having the same functions and configurations as those of the above first embodiment will be given the same symbols, and the description of the first embodiment will be applied to description thereof.

In FIG. 16, the microwave generation part 10 in the microwave heating apparatus of the fourth embodiment has the microwave oscillation part 11 formed with using the semiconductor element, a power divider 412 for dividing the output of the microwave oscillation part 11 into two and outputting the divided outputs, former microwave amplification parts 413a, 413b to which the outputs divided in the power divider 412 are inputted, and main microwave amplification parts 415a, 415b respectively for further amplifying outputs of the former microwave amplification parts 413a, 413b. In the microwave heating apparatus of the fourth embodiment, one of the outputs divided in the power divider 412 is inputted to a phase changing part 418 so that a phase is adjustable, and is inputted from the phase changing part 418 to the former microwave amplification part 413a via a microwave transmission passage 414a. The other one of the outputs divided in the power divider 412 is directly inputted to the former microwave amplification part 413b via a microwave transmission passage 414b. Outputs of the main microwave amplification parts 415a, 415b are respectively guided to output parts 416a, 416b via microwave transmission passages 417a, 417b. The former microwave amplification parts 413a, 413b and the main microwave amplification parts 415a, 415b are respectively formed with using semiconductor elements.

As described above, the microwave heating apparatus of the fourth embodiment is provided with the phase changing part 418 between the power divider 412 and the former microwave amplification part 413a out of the two former microwave amplification parts. The phase changing part 418 is formed with using a variable-capacitance diode in which a capacitance value is changed in accordance with applied voltage. By increasing the applied voltage, a phase delay amount is increased. A variable range of the phase delay amount by the phase changing part 418 is from zero to 180 degrees.

The microwave generation part 10 is formed on a dielectric substrate made of a low-dielectric loss material. The former microwave amplification parts 413a, 413b and the main microwave amplification parts 415a, 415b are formed by circuits having conductive patterns formed on one surface of the dielectric substrate. In order to preferably operate the semiconductor elements serving as amplifying elements of the microwave amplification parts 413a, 413b, 415a, 415b, matching circuits are respectively provided on the input sides and the output sides of the semiconductor elements.

In the microwave transmission passages 414a, 414b, 417a, 417b, transmission passages having characteristic impedance of 50Ω are formed by the conductive patterns provided on the one surface of the dielectric substrate.

The microwave oscillation part 11 of the microwave generation part 10 has the frequency variable function of generating the frequencies of 2,400 MHz to 2,500 MHz.

As shown in FIG. 16, the microwave heating apparatus of the fourth embodiment is provided with the heating chamber 100 accommodating the article to be heated 101, the heating chamber into which the microwave outputted from the microwave generation part 10 is supplied. In the heating chamber 100, the door for bringing the article to be heated 101 in and out (not shown) is provided in the one wall surface forming the heating chamber 100. In the heating chamber 100, the wall surfaces other than the wall surface in which the door is provided are formed by the closure plates made of the metal materials so that the microwave supplied into the heating chamber 100 is enclosed inside the heating chamber. The partition part 103 arranged and spaced apart from the heating chamber bottom wall surface 102 by the predetermined distance so as to partition the space in the heating chamber, the partition part on which the article to be heated 101 is mounted is provided inside the heating chamber 100. Therefore, the space in the heating chamber is divided by the partition part 103 into the first heating chamber 100a accommodating the article to be heated 101 in the upper space of the partition part 103, and the second heating chamber 100b serving as the lower space of the partition part 103. This partition part 103 is made of the metal material. On the surface (the back surface) of the partition part 103 on the opposite side of the mount surface for the article to be heated, that is, on the surface facing the second heating chamber 100b, the microwave absorber layer 104 serving as the microwave absorber which contains the microwave absorbent material is provided and closely attached.

In the heating chamber 100, the two first feeding parts 105a, 105b for supplying the microwave into the first heating chamber 100a accommodating the article to be heated 101, and the two second feeding parts 106a, 106b for supplying the microwave into the second heating chamber 100b with the one wall surface formed by the microwave absorber layer 104 are provided. The two first feeding parts 105a, 105b are respectively arranged on the left wall surface and the right wall surface of the first heating chamber 100a so as to face each other. The two second feeding parts 106a, 106b are respectively arranged on the left wall surface and the right wall surface of the second heating chamber 100b so as to face each other.

As well as the microwave absorber layer 104 in the above first embodiment, the base material of the microwave absorber layer 104 covering the back surface of the partition part 103 is the microwave absorbent material formed by mixing the ferrite and the resin material. The microwave absorber layer is attached to the joint surface of the back surface of the partition part 103 to which the heat resistant coating is provided.

It should be noted that the joint surface of the partition part 103 is formed into a convexo-concave shape, and the surface area of the microwave absorber layer 104 is increased, so that the absorbing performance of the microwave supplied to the second heating chamber 100b is improved.

As shown in FIG. 16, the outputs from the microwave generation part 10 are respectively transmitted to the first feeding parts 105a, 105b via circulators 419a, 419b forming circulation type non-reciprocal circuits, and supplied into the first heating chamber 100a. The reflected microwaves respectively returned from the first heating chamber 100a to the circulators 419a, 419b via the first feeding parts 105a, 105b are respectively transmitted to the second feeding parts 106a, 106b by the circulators 419a, 419b. In such a way, the circulators 419a, 419b are formed so as to transmit the reflected microwaves returned from the first feeding parts 105a, 105b to the circulators 419a, 419b to the second feeding parts 106a, 106b.

Power detection parts 420a, 420b are respectively arranged in transmission passages between the circulators 419a, 419b and the second feeding parts 106a, 106b. The power detection parts 420a, 420b respectively detect power amounts of the microwaves respectively transmitted from the circulators 419a, 419b to the second feeding parts 106a, 106b and power amounts of the reflected microwaves respectively returned from the second heating chamber 100b to the circulators 419a, 419b via the second feeding parts 106a, 106b.

In the microwave heating apparatus of the fourth embodiment, a control part 421 for controlling the actions of the microwave generation part 10 is provided. The control part 421 receives signals detected by the power detection parts 420a, 420b, performs the various processing, and then performs the variable control on the oscillating frequency of the microwave oscillation part 11.

The power detection parts 420a, 420b are formed by directional couplers having coupling degrees of about 40 dB, and detect the power amounts of about 1/10,000 of the transmitted and reflected microwave power. The power signals detected in the power detection parts 420a, 420b indicating the power amounts are respectively rectified by wave detection diodes (not shown), smoothed by capacitors (not shown), and outputted. The output signals thereof are inputted to the control part 421.

Next, actions of the microwave heating apparatus of the fourth embodiment according to the present invention formed as above will be described with reference to FIGS. 17 to 20.

FIG. 17 is the characteristic diagram showing one example of the detection signals of the power detection parts 420a, 420b in the microwave heating apparatus of the fourth embodiment. In FIG. 17, the horizontal axis of the graph indicates the frequencies (MHz), and the vertical axis indicates ratios (%) of the sum of the power (the transmitted power) detected by the power detection parts 420a, 420b to be transmitted to the second feeding parts, and the sum of the power (the reflected power) to be returned from the second feeding parts 106a, 106b to the circulators 419a, 419b relative to the sum of the outputs of the microwave generation part 10. A characteristic curve G410 is indicative of the ratio of the transmitted power, and a characteristic curve G411 is indicative of the ratio of the reflected power.

The characteristic curve G410 indicating the transmitted power has frequencies f1, f2 at which the transmission power values are extremely small, and a frequency f3 at which the transmission power has the maximum value. The characteristic curve G411 indicating the reflected power indicates a characteristic that although the frequencies are at a low level over the entire frequency bandwidth, the power reflected from the second heating chamber 100b to the second feeding parts is slightly increased in a high frequency region in this frequency bandwidth. The reflected power is generated by the absorption ability of the microwave absorber layer 104 and the characteristic change in accordance with the impedance change of the microwave absorber layer 104 due to the absorption of the microwave and the heat generation.

It should be noted that in the graph of FIG. 17, a straight line G412 shown by a broken line indicates that the ratio of the reflected power when the microwave generation part 10 is operated with the rated output is 10%. When this 10% level, that is, an absolute value of the reflected power corresponding to 10% of the rated output serving as a reference value is exceeded, the control part 421 controls to switch the oscillating frequency of the microwave oscillation part 11 to the different frequency, and/or controls to reduce the drive voltage of the former microwave amplification parts 413a, 413b, 415a, 415b so as to decrease the outputs of the microwave generation part 10.

Hereinafter, a detailed control example of the microwave heating apparatus of the fourth embodiment according to the present invention will be described with reference to the flowcharts of FIGS. 18 to 20.

The article to be heated 101 is accommodated in the heating chamber 100 and mounted on the partition part 103, the heating condition is set by the operation part (not shown), and the heating start key is pressed, so that a heating start signal is generated (Step S411 in FIG. 18). The control part 421 to which the heating start signal is inputted generates a control output signal so as to set the microwave generation part 10 to the first output power such as less than 100 W, and start the actions (Step S412). At this time, the control part 421 supplies the predetermined drive power voltage to the former microwave amplification parts 413a, 413b and the main microwave amplification parts 415a, 415b. The control part 421 also outputs the control signal of setting the initial oscillating frequency of the microwave oscillation part 11 to for example 2,400 MHz, and starts the oscillation action of the microwave oscillation part 11. In such a way, in the initial stage, the microwave generation part 10 outputs the microwave power of less than 100 W at for example 2,400 MHz as the first output power.

Next, in Step S413, the oscillating frequency of the microwave oscillation part 11 is changed to the higher frequency from 2,400 MHz in the initial stage at a 1 MHz pitch (for example 1 MHz per 10 milliseconds), and changed to be 2,500 MHz at the upper limit of the frequency variable range. In this frequency variable action, the transmitted power and the reflected power obtained from the power detection parts 420a, 420b are respectively stored, and the flow proceeds to Step S414.

In Step S414, the control content is selected in accordance with the heating condition of the article to be heated 101. In a case where the heating condition is the grilling heating of the article to be heated 101, the flow proceeds to Step S430 shown in FIG. 20. In a case where the heating condition is other than the grilling heating, the flow proceeds to Step S415. The case where the heating condition is other than the grilling heating indicates such a case where the article to be heated 101 is heated or defrosted with mainly utilizing the microwave.

In Step S415, the frequencies at which the sum of the transmitted power obtained from the power detection parts 420a, 420b has the extremely small value in the frequency characteristic curve (such as the frequencies f1, f2 in FIG. 17) are extracted, and the flow proceeds to Step S416. In Step S416, the following control routine is selected in accordance with the heating condition of any one of the high-speed heating and the uniform heating of the article to be heated 101. In a case where the heating condition is the high-speed heating, the flow proceeds to Step S417. In a case of the uniform heating, the flow proceeds to Step S423 shown in FIG. 19. The high-speed heating and the uniform heating are in the microwave heating mode.

Firstly, the case where the heating condition is the high-speed heating with using the microwave as one of the microwave heating mode will be described.

In a case where the high-speed heating is selected as the heating condition, the frequency at which the transmitted power has the minimum value (such as the frequency f1 in FIG. 17) is set as the oscillating frequency in Step S417, and the flow proceeds to Step S418.

In Step S418, the drive voltage of the former microwave amplification parts 413a, 413b and/or the main microwave amplification parts 415a, 415b is set so that the microwave generation part 10 generates the second output power serving as the rated output.

Next, the major heating action is started with the second output power set in Step S418 (Step S419). In the major heating action, the flow proceeds to Step S420, and it is determined whether or not the reflected power detected by each of the power detection parts 420a, 420b is not more than a predetermined value (a value corresponding to 10% of the rated output of the microwave generation part 10). In a case where the reflected power does not exceed the predetermined value, the flow proceeds to Step S421. In a case where the reflected power exceeds the predetermined value, the flow proceeds to Step S422. In Step S422, the drive voltage of the former microwave amplification parts 413a, 413b and/or the main microwave amplification parts 415a, 415b is controlled to be reduced so that the reflected power is adjusted to be not more than the predetermined value, and the flow proceeds to Step S421.

In Step S421, the heating progress of the article to be heated 101 is determined. With regard to this heating progress, when the heating processing time is set as the heating condition, it is determined whether or not the heating processing time has passed. In a case where the heating processing time has not yet passed, the flow is returned to Step S420. In a case where the heating processing time has passed, the heating action is finished.

It should be noted that in a case where the means for detecting the physical information of the article to be heated 101 such as the surface temperature, the size, the amount, and the like relating to the article to be heated 101 is provided in the microwave heating apparatus of the fourth embodiment, it may be determined whether or not the heating is completed in accordance with the detection signal of the detection means of the physical information. For example in a case where the temperature detection means is used as the detection means of the physical information, it is determined whether or not the temperature has reached the desired degree (such as 75° C.). In a case where the temperature has not yet reached the desired degree, the flow is returned to Step S420. In a case where the temperature has reached the desired degree, the heating action is finished. In a case where the means for detecting the size or the amount relating to the article to be heated 101 is provided, the heating action time preliminarily determined relative to the range of each of the size and the amount is extracted in accordance with the processing method such as the cooking method, and the finish of the heating action may be determined in accordance with whether or not the heating action time has passed.

As described above, by controlling the microwave oscillation part 11 to generate the frequency at which the transmitted power detected by each of the power detection parts 420a, 420b has the minimum value, a microwave energy amount supplied from the first feeding parts 105a, 105b into the first heating chamber 100a and consumed by the article to be heated 101 is maximized, so that the high-speed heating processing to the article to be heated 101 can be executed.

Next, the case where the heating condition is the uniform heating of the article to be heated 101 as another one of the microwave heating modes will be described.

The control of the uniform heating described below utilizes the plurality of resonance modes generated in the heating chamber 100 described in the above first embodiment.

In a case where it is determined that the heating condition is the uniform heating in Step S416 shown in FIG. 18, the flow proceeds to Step S423 of FIG. 19.

In Step S423, the frequency at which the transmitted power has the minimum value (such as the frequency f1 in FIG. 17) is set as the oscillating frequency, and the flow proceeds to Step S424.

In Step S424, the drive voltage of the former microwave amplification parts 413a, 413b and/or the main microwave amplification parts 415a, 415b is set so that the microwave generation part 10 generates the second output power serving as the rated output. Next, the flow proceeds to Step S425.

In Step S425, the voltage applied to the phase changing part 418 is controlled, so that the phase delay amount is changed. A change quantity of the phase delay amount is preliminarily set from values such as 45, 90 and 180 degrees, and the phase delay amount is increased as the flow comes to Step S425. In this control routine, the delay amount is controlled to be reduced when reaching a maximum delay amount, and increased again when reaching a minimum delay amount.

In the following Step S426, it is determined whether or not the reflected power detected by each of the power detection parts 420a, 420b is not more than the predetermined value such as the value corresponding to 10% of rated output of the microwave generation part 10. In a case where the reflected power does not exceed the predetermined value, the flow proceeds to Step S427. In a case where the reflected power exceeds the predetermined value, the flow proceeds to Step S428. In Step S428, the drive voltage of the former microwave amplification parts 413a, 413b and/or the main microwave amplification parts 415a, 415b is controlled to be reduced so that the reflected power is adjusted to be not more than the predetermined value, and the flow proceeds to Step S427.

In Step S427, it is determined whether or not the current action time has reached a predetermined length regulating time of operating by the same phase delay amount. In a case where the current action time has not yet reached the predetermined length, the flow is returned to Step S426. In a case where the current action time has reached the predetermined length, the flow proceeds to Step S429.

In Step S429, the same control as Step S422 described above is executed. In a case where the heating processing is not completed, the flow is returned to Step S425. In a case where it is determined that the heating processing is completed, the heating action is finished. In a case where the flow is returned to Step S425, the phase delay amount is increased or reduced, and the flow proceeds to Step S426.

As described above, by temporally changing a phase difference of the microwaves radiated from the plurality of feeding parts 105a, 105b, 106a, 106b into the heating chamber at the same frequency upon the heating action of the article to be heated 101, the microwave distribution in the space in the heating chamber is changed, so that the uniform heating or concentrated local heating of the article to be heated 101 and the microwave absorber layer 104 can be executed.

Next, the case where the heating condition is the grilling heating of the article to be heated 101 will be described. The grilling heating is in the radiation conduction heating mode.

In Step S414 shown in FIG. 18, the control content is selected in accordance with the heating condition of the article to be heated 101. In a case where the heating condition is the grilling heating of the article to be heated 101, the flow proceeds to Step S430 shown in FIG. 20.

In Step S430, the oscillating frequency of the microwave oscillation part 11 is set to the frequency at which the transmitted power has the maximum value (such as the frequency f3 in FIG. 17), and the flow proceeds to Step S431.

In Step S431, the drive voltage of the former microwave amplification parts 413a, 413b and/or the main microwave amplification parts 415a, 415b is set so that the microwave generation part 10 generates the second output power serving as the rated output. Next, the flow proceeds to Step S432, the same control as Step S425 described above is executed, and the flow proceeds to Step S433.

In Step S433, the same control as Step S426 described above is executed, so that it is determined whether or not the reflected power is not more than the predetermined value. In a case where the reflected power does not exceed the predetermined value, the flow proceeds to Step S434. In a case where the reflected power exceeds the predetermined value, the flow proceeds to Step S435. In Step S435, the drive voltage of the former microwave amplification parts 413a, 413b and/or the main microwave amplification parts 415a, 415b is controlled to be reduced so that the reflected power is adjusted to be not more than the predetermined value, and the flow proceeds to Step S434.

In Step S434, it is determined whether or not the current action time has reached the predetermined length regulating the time of operating by the same phase delay amount. In a case where the current action time has not yet reached the predetermined length, the flow is returned to Step S433. In a case where the current action time has reached the predetermined length, the flow proceeds to Step S436.

In Step S436, the heating progress of the article to be heated 101 is determined. With regard to this heating progress, it is determined whether or not the heating processing time inputted as the heating condition has passed. In a case where the heating processing time has not yet passed, the flow is returned to Step S432. In a case where the heating processing time has passed, the heating action is finished. In a case where the flow is returned to Step S432, the phase delay amount is increased or reduced by a predetermined value, and the flow proceeds to Step S433.

As described above, in the grilling heating in the microwave heating apparatus of the fourth embodiment, by controlling the microwave oscillation part 11 to generate the frequency at which the transmitted power detected by each of the power detection parts 420a, 420b has the maximum value, the microwave energy amount supplied from the first feeding parts 105a, 105b into the first heating chamber 100a and consumed by the article to be heated 101 is minimized, and the microwave energy amount supplied from the second feeding parts 106a, 106b into the second heating chamber 100b and consumed by the microwave absorber layer 104 is maximized. Thus, the grilling heating to the article to be heated 101 can be facilitated.

By controlling the phase changing part 418 in the control of the grilling heating, the uniform heating of the entire region of the microwave absorber layer 104 can be facilitated. Therefore, with regard to the grilling heating of a large number of the articles to be heated 101 separately arranged, or the article to be heated 101 having the large bottom area, the heating chamber in the microwave heating apparatus of the fourth embodiment has a wider heat transfer effect. Thus, the grilling heating can be effectively executed.

It should be noted that in the microwave heating apparatus of the fourth embodiment, the microwave heating mode and the radiation conduction heating mode can be not only respectively independently executed, but also combined with each other and executed as the composite heating mode.

The heating control actions in the microwave heating apparatus of the fourth embodiment is described above. Hereinafter, effects by the heating control actions will be described.

By changing the oscillating frequency of the microwave oscillation part 11 at the predetermined frequency interval over the entire bandwidth (variable range) thereof following the start of heating the article to be heated 101, the load impedance when the first heating chamber 100a is seen from the first feeding parts 105a, 105b can be changed. By changing the load impedance in such a way, the ratio between the microwave energy amount supplied from the first feeding parts 105a, 105b into the first heating chamber 100a and consumed by the article to be heated 101, and the reflected microwave energy amount returned from the first heating chamber 100a to the first feeding parts 105a, 105b, supplied from the second feeding parts 106a, 106b into the second heating chamber 100b via the circulators 419a, 419b, and absorbed by the microwave absorber layer 104 can be arbitrarily selected taking the oscillating frequency as the parameter. As a result, the article to be heated 101 can be effectively heated in accordance with the required heating condition.

The load impedance is changed even at the same frequency due to the shape, the type, and the amount of the article to be heated 101 accommodated in the first heating chamber 100a. However, by selecting the optimal oscillating frequency, the load impedance when the first heating chamber 100a is seen from the first feeding parts 105a, 105b is brought close to the output impedance of the microwave generation part 10, so that the reflected power to the first feeding parts 105a, 105b, or the transmitted power to the second feeding parts 106a, 106b can be reduced. In such a way, by utilizing the oscillating frequency at which the reflected power to the first feeding parts 105a, 105b, or the transmitted power to the second feeding parts 106a, 106b has the smallest value, the heat receiving amount of the microwave energy to the article to be heated 101 is maximized, so that the article to be heated 101 can be heated at a high speed.

With the frequency at which the sum of the reflected power to the first feeding parts 105a, 105b, or the sum of the transmitted power to the second feeding parts 106a, 106b has the minimum value in the frequency characteristic, by temporally changing the phase difference of the microwaves radiated from the first feeding parts 105a, 105b, the microwave distribution generated in not only the first heating chamber 100a but also the second heating chamber 100b can be changed. As a result, the uniform heating of the article to be heated 101 and the microwave absorber layer 104 can be facilitated.

As described above, with the microwave heating apparatus of the fourth embodiment, in the first heating chamber 100a accommodating the article to be heated 101, the high-speed heating or the uniform heating of the article to be heated 101 can be efficiently executed by the above frequency selection control and the phase variable control.

In the microwave heating apparatus of the fourth embodiment, there are a large number of frequencies at which the sum of the reflected power from the first heating chamber 100a to the first feeding parts 105a, 105b, or the sum of the transmitted power to the second feeding parts 106a, 106b is large. With the microwave heating apparatus of the fourth embodiment, by utilizing the frequencies at which the microwave power amounts supplied from the second feeding parts 106a, 106b into the second heating chamber 100b are large, the grilling heating of the article to be heated 101 is realized. That is, the frequency at which the sum of the reflected power to the first feeding parts 105a, 105b, or the sum of the transmitted power to the second feeding parts 106a, 106b is maximum is selected, and the microwave generation part 10 is operated at the selected frequency. By operating the microwave generation part 10 in such a way, the heat receiving amount of the microwave to the article to be heated 101 in the first heating chamber 100a accommodating the article to be heated 101 is minimum. The microwave unconsumed in the first heating chamber 100a and reflected to the first feeding parts 105a, 105b is transmitted to the second feeding parts 106a, 106b via the circulators 419a, 419b, respectively, and supplied into the second heating chamber 100b. The microwave supplied into the second heating chamber 100b is absorbed by the microwave absorber layer 104, so that the microwave absorber layer 104 generates the heat. The generated heat of the microwave absorber layer 104 is transferred to the joined partition part 103. The partition part 103 at the high temperature radiates the heat into the first heating chamber 100a accommodating the article to be heated 101. Since the article to be heated 101 receives the radiated heat, the microwave absorber layer 104 does not reach the thermal saturation, and the supplied microwave can be substantially 100% consumed. As a result, with the microwave heating apparatus of the fourth embodiment, the inside of the article to be heated 101 is heated by the microwave in the first heating chamber 100a and a surface of the article to be heated 101 is grilled or browned by heat from the partition part 103, so that the grilling heating of the article to be heated 101 can be executed at an extremely high speed.

As described above, in the microwave heating apparatus of the fourth embodiment, the output power of the microwave generation part 10 supplied into the heating chamber 100 can be substantially completely consumed by the article to be heated 101 and the microwave absorber layer 104. Thereby, the outputs of the microwave generation part 10 can be substantially 100% consumed in the heating processing of the article to be heated 101. Therefore, with the microwave heating apparatus of the fourth embodiment according to the present invention, a heating apparatus having the excellent energy-saving characteristic can be provided.

It should be noted that in a case where the microwave absorber layer 104 reaches the thermal saturation and the absorption ability of the microwave is saturated, reflected power is generated from the second heating chamber 100*b* to the second feeding parts 106*a*, 106*b*. The reflected power is reflected to the microwave generation part 10 via the circulators 419*a*, 419*b*, and there is a risk that the semiconductor elements serving as the active elements of the microwave generation part 10 are thermally destructed. In order to prevent such thermal destruction, in the microwave heating apparatus of the fourth embodiment according to the present invention, when the reflected power from each of the second feeding parts 106*a*, 106*b* exceeds a predetermined level (such as the value corresponding to 10% of the rated output of the microwave generation part 10), the drive voltage of corresponding one of the microwave amplification parts 413*a*, 413*b*, 415*a*, 415*b* is controlled to be reduced. By controlling in such a way, the thermal loss amount due to the amplification actions is reduced and the reflected power is reduced, so that the thermal destruction of the semiconductor elements is surely prevented.

In the microwave heating apparatus of the fourth embodiment according to the present invention, the control of the grilling heating may be performed only at the frequency at which the transmitted power to each of the second feeding parts 106*a*, 106*b* is maximum, or the control may be performed to sweep the frequency within the specified band taking the frequency at which the transmitted power to each of the second feeding parts 106*a*, 106*b* is maximum as the central frequency (such as 10 MHz). By controlling to sweep the frequency in such a way, the entire microwave absorber layer 104 is uniformly heated. Thus, the grilling heating of the article to be heated 101 having the large bottom area can be effectively executed.

The selection of the various control methods of the grilling heating described above may be preliminarily set in accordance with the shape, the type, the amount, and the like of the article to be heated 101.

(Fifth Embodiment)

Figure 21:
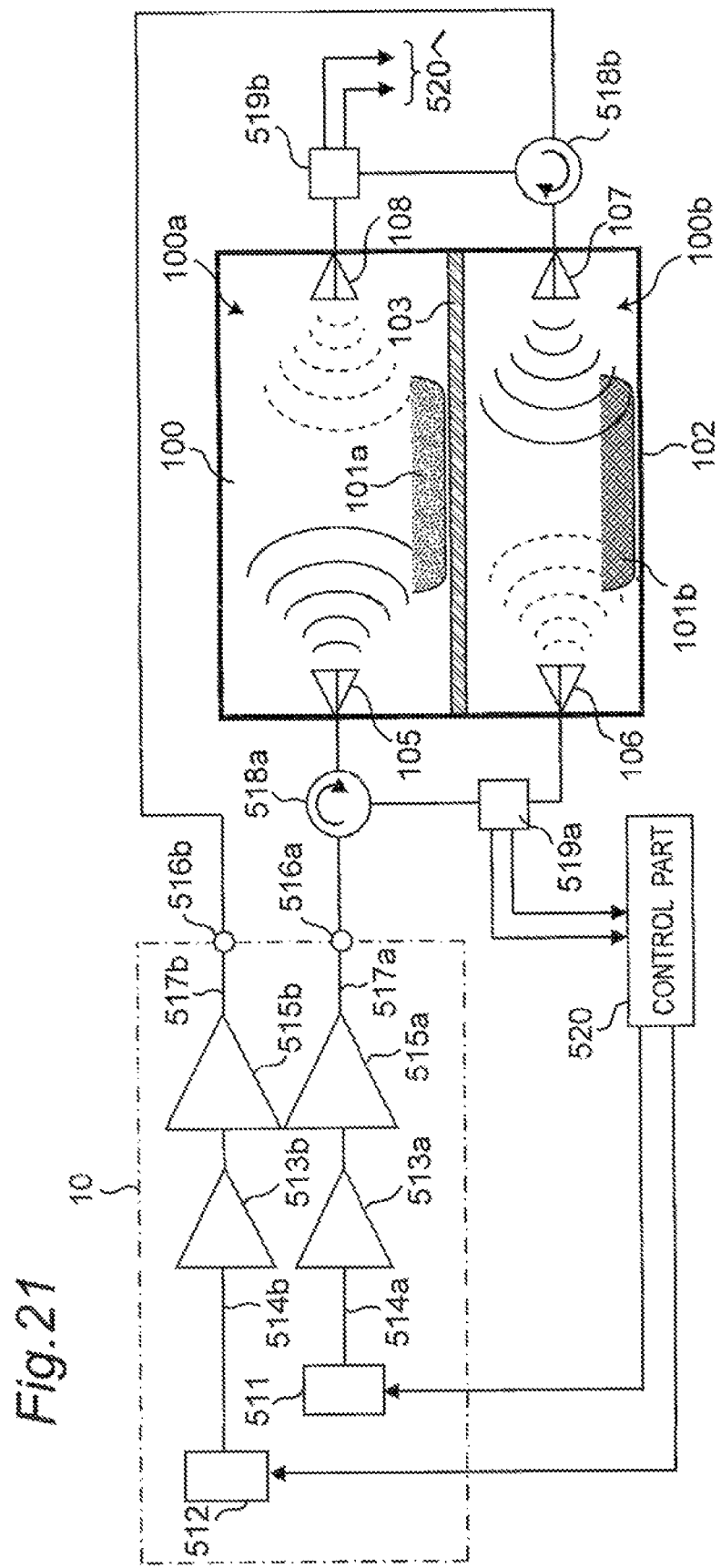
FIG. 21 is a diagram showing a configuration of a microwave heating apparatus of a fifth embodiment according to the present invention.
Figure 22:
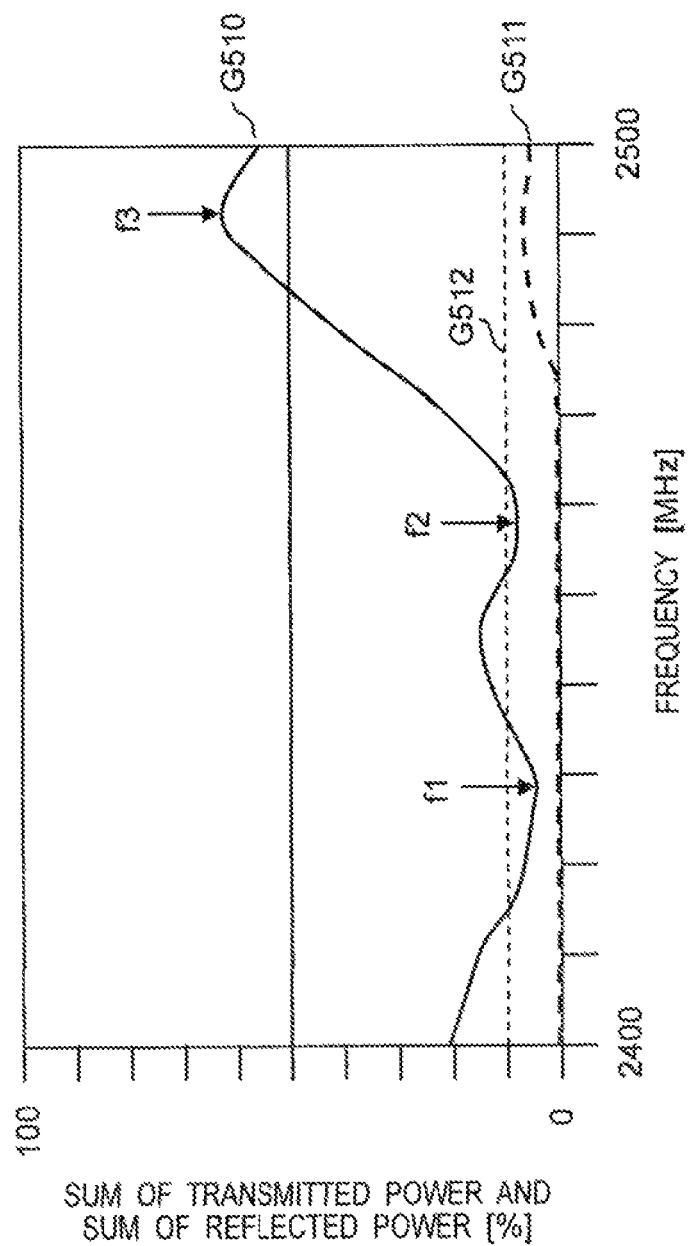
FIG. 22 is a characteristic diagram showing one example of detection signals of power detection parts in the microwave heating apparatus of the fifth embodiment.

Hereinafter, a microwave heating apparatus of a fifth embodiment according to the present invention will be described with reference to attached FIGS. 21 and 22. FIG. 21 is a block diagram showing a configuration of the microwave heating apparatus of the fifth embodiment. FIG. 22 is a frequency characteristic diagram of the microwave heating apparatus of the fifth embodiment. In the description of the fifth embodiment, the constituent elements having the same functions and configurations as those of the above first embodiment will be given the same symbols, and the description of the first embodiment will be applied to description thereof.

In FIG. 21, the microwave generation part 10 is provided with two microwave oscillation parts 511, 512 formed with using semiconductor elements. In the microwave generation part 10, an output of the first microwave oscillation part 511 out of the two microwave oscillation parts is inputted to a former microwave amplification part 513*a* via a microwave transmission passage 514*a*, and an output of the former microwave amplification part 513*a* is inputted to and further amplified in a main microwave amplification part 515*a*. An output of the main microwave amplification part 515*a* is guided to an output part 516*a* via a microwave transmission passage 517*a*.

Similarly, an output of the second microwave oscillation part 512 on the other side is inputted to a former microwave amplification part 513*b* via a microwave transmission passage 514*b*, and an output of the former microwave amplification part 513*b* is inputted to and further amplified in a main microwave amplification part 515*b*. An output of the main microwave amplification part 515*b* is guided to an output part 516*b* via a microwave transmission passage 517*b*.

The former microwave amplification parts 513*a*, 513*b* and the main microwave amplification parts 515*a*, 515*b* in the microwave generation part 10 are respectively formed with using semiconductor elements. The microwave generation part 10 is formed on a dielectric substrate made of a low-dielectric loss material.

The former microwave amplification parts 513*a*, 513*b* and the main microwave amplification parts 515*a*, 515*b* are formed by circuits having conductive patterns provided on one surface of the dielectric substrate. In order to preferably operate the semiconductor elements serving as amplifying elements of the microwave amplification parts 513*a*, 513*b*, 515*a*, 515*b*, matching circuits are respectively provided on the input sides and the output sides of the semiconductor elements.

In the microwave transmission passages 514*a*, 514*b*, 517*a*, 517*b*, transmission passages having characteristic impedance of 50Ω are formed by the conductive patterns provided on the one surface of the dielectric substrate.

The microwave oscillation parts 511, 512 of the microwave generation part 10 respectively have the frequency variable functions of generating the frequencies of 2,400 MHz to 2,500 MHz.

As shown in FIG. 21, the microwave heating apparatus of the fifth embodiment has the heating chamber 100 having the two heating chambers 100*a*, 100*b* separately accommodating two articles to be heated 101*a*, 101*b*. The outputs of the microwave generation part 10 are respectively supplied to the heating chambers 100*a*, 100*b*.

In the heating chamber 100, the door for bringing the articles to be heated 101*a*, 101*b* in and out (not shown) is provided in the one wall surface forming the heating chamber 100. In the heating chamber 100, the wall surfaces other than the wall surface in which the door is provided are formed by the closure plates made of the metal materials so that the microwave supplied into the heating chamber 100 is enclosed inside the heating chamber. The partition part 103 arranged and spaced apart from the heating chamber bottom wall surface 102 by the predetermined distance so as to partition the space in the heating chamber, the partition part on which the article to be heated 101*a* is mounted is provided inside the heating chamber 100. Therefore, the space in the heating chamber is divided by the partition part 103 into the first heating chamber 100*a* accommodating the article to be heated 101*a* in the upper space of the partition part 103, and the second heating chamber 100*b* accommodating the article to be heated 101*b* in the lower space of the partition part 103. The partition part 103 is made of the metal material.

In the heating chamber 100, two feeding parts 105, 108 for supplying the microwave into the first heating chamber 100*a* accommodating the article to be heated 101*a*, and two feeding parts 106, 107 for supplying the microwave into the second heating chamber 100*b* accommodating the article to be heated 101*b*. The two feeding parts 105, 108 in the first heating chamber 100*a* are respectively arranged on the left wall surface and the right wall surface of the first heating chamber 100a so as to face each other. The two feeding parts 106, 107 in the second heating chamber 100b are respectively arranged on the left wall surface and the right wall surface of the second heating chamber 100b so as to face each other.

The microwave from the first microwave oscillation part 511 in the microwave generation part 10 is amplified and supplied to the first feeding part 105 for supplying the microwave to the first heating chamber 100a. The microwave from the second microwave oscillation part 512 in the microwave generation part 10 is amplified and supplied to the third feeding part 107 for supplying the microwave to the second heating chamber 100b.

As shown in FIG. 21, the microwave from the first microwave oscillation part 511 in the microwave generation part 10 is amplified and transmitted to the first feeding part 105 via a circulator 518a serving as a circulation type non-reciprocal circuit, and then supplied into the first heating chamber 100a. The reflected microwave unconsumed in the first heating chamber 100a and returned to the circulator 518a via the first feeding part 105 is transmitted to the second feeding part 106 via the circulator 518a, and supplied to the second heating chamber 100b.

The microwave from the second microwave oscillation part 512 in the microwave generation part 10 is amplified and transmitted to the third feeding part 107 via a circulator 518b serving as a circulation type non-reciprocal circuit, and then supplied into the second heating chamber 100b. The reflected microwave unconsumed in the second heating chamber 100b and returned to the circulator 518b via the third feeding part 107 is transmitted to the fourth feeding part 108 via the circulator 518b, and supplied to the first heating chamber 100a.

The fourth feeding part 108 provided in the first heating chamber 100a is arranged at a wall surface position where coupling with the microwave radiated from the first feeding part 105 is weak. The second feeding part 106 provided in the second heating chamber 100b is provided at a wall surface position where coupling with the microwave radiated from the third feeding part 107 is weak, or has a feeding antenna shape.

A power detection part 519a is arranged in a transmission passage between the circulator 518a and the second feeding part 106. The power detection part 519a respectively detects a power amount of the microwave transmitted from the circulator 518a to the second feeding part 106 and a power amount of the reflected microwave returned from the second heating chamber 100b to the circulator 518a via the second feeding part 106. Detection signals thereof are transmitted to a control part 520.

A power detection part 519b is arranged in a transmission passage between the circulator 518b out of the two circulators and the fourth feeding part 108. The power detection part 519b respectively detects a power amount of the microwave transmitted from the circulator 518b to the fourth feeding part 108 and a power amount of the reflected microwave returned from the first heating chamber 100a to the circulator 518b via the fourth feeding part 108. Detection signals are transmitted to the control part 520.

In the microwave heating apparatus of the fifth embodiment, the control part 520 controls the actions of the microwave generation part 10, and respectively controls actions of the first microwave oscillation part 511 and the second microwave oscillation part 512. The control part 520 receives the signals detected by the power detection parts 519a, 519b, performs the various processing, and then respectively performs the variable control on the oscillating frequencies of the first microwave oscillation part 511 and the second microwave oscillation part 512.

The power detection parts 519a, 519b are formed by directional couplers having coupling degrees of about 40 dB, and detect the power amounts of about 1/10,000 of the transmitted and reflected microwave power. The power signals detected in the power detection parts 519a, 519b indicating the power amounts are respectively rectified by wave detection diodes (not shown), smoothed by capacitors (not shown), and outputted. The output signals thereof are inputted to the control part 520.

FIG. 22 is the characteristic diagram showing one example of the detection signals of the power detection parts 519a, 519b in the microwave heating apparatus of the fifth embodiment. In FIG. 22, the horizontal axis of the graph indicates the frequencies (MHz), and the vertical axis indicates ratios (%) of the sum of the power (the transmitted power) detected by the power detection part 519a to be transmitted to the second feeding part and the power (the transmitted power) detected by the power detection part 519b to be transmitted to the fourth feeding part, and the sum of the power (the reflected power) to be returned from the second feeding part 106 to the circulator and the power (the reflected power) to be returned from the fourth feeding part 108 to the circulator relative to the sum of the outputs of the microwave generation part 10. A characteristic curve G510 is indicative of the ratio of the transmitted power, and a characteristic curve G511 is indicative of the ratio of the reflected power.

The characteristic curve G510 indicating the transmitted power has frequencies f1, f2 at which the transmission power values are extremely small, and a frequency f3 at which the transmission power has the maximum value. The characteristic curve G511 indicating the reflected power indicates that there is a frequency band where the reflected power returned from the second feeding part 106 and the fourth feeding part 108 to the circulators is generated in a high frequency region although the frequencies are at a low level over the entire frequency bandwidth. However, in the characteristic curve G511 indicating the reflected power, the ratio of the reflected power is not more than 10%, and the ratio is suppressed so that no problems are generated in the microwave generation part 10.

It should be noted that in the graph of FIG. 22, a straight line G512 shown by a broken line indicates that the ratio of the reflected power when the microwave generation part 10 is operated with the rated output is 10%. When this 10% level, that is, an absolute value of the reflected power corresponding to 10% of the rated output serving as a reference value is exceeded, the control part 520 controls to switch the oscillating frequencies of the microwave oscillation parts 511, 512 to the different frequencies, and/or controls to reduce the drive voltage of the former microwave amplification parts 513a, 513b, 515a, 515b so as to decrease the outputs of the microwave generation part 10.

With the microwave heating apparatus of the fifth embodiment according to the present invention formed as above, by performing the frequency selection control in the first heating chamber 100a accommodating the article to be heated 101a and the second heating chamber 100b accommodating the article to be heated 101b as described in the above first to fourth embodiments, the high-speed heating or the uniform heating of the articles to be heated 101a, 101b can be efficiently executed.

Further, in the microwave heating apparatus of the fifth embodiment, the articles to be heated 101a, 101b can be heated with the microwaves at the same time in both the first heating chamber 100a and the second heating chamber 100b. In this case, the control part 520 controls the first microwave oscillation part 511 to generate the frequency at which reflection to the article to be heated 101a accommodated in the first heating chamber 100a is minimum. Meanwhile, the control part 520 similarly controls the second microwave oscillation part 512 to generate the frequency at which reflection to the article to be heated 101b accommodated in the second heating chamber 100b is minimum.

As described above, in the microwave heating apparatus of the fifth embodiment, in an oscillation state that the oscillating frequency of the first microwave oscillation part 511 and the oscillating frequency of the second microwave oscillation part 512 are different from each other, the two articles to be heated 101a, 101b can be heated at the same time. Therefore, with the microwave heating apparatus of the fifth embodiment, the microwave energy generated by the microwave generation part 10 can be efficiently absorbed by the articles to be heated 101a, 101b.

(Sixth Embodiment)

Figure 23:
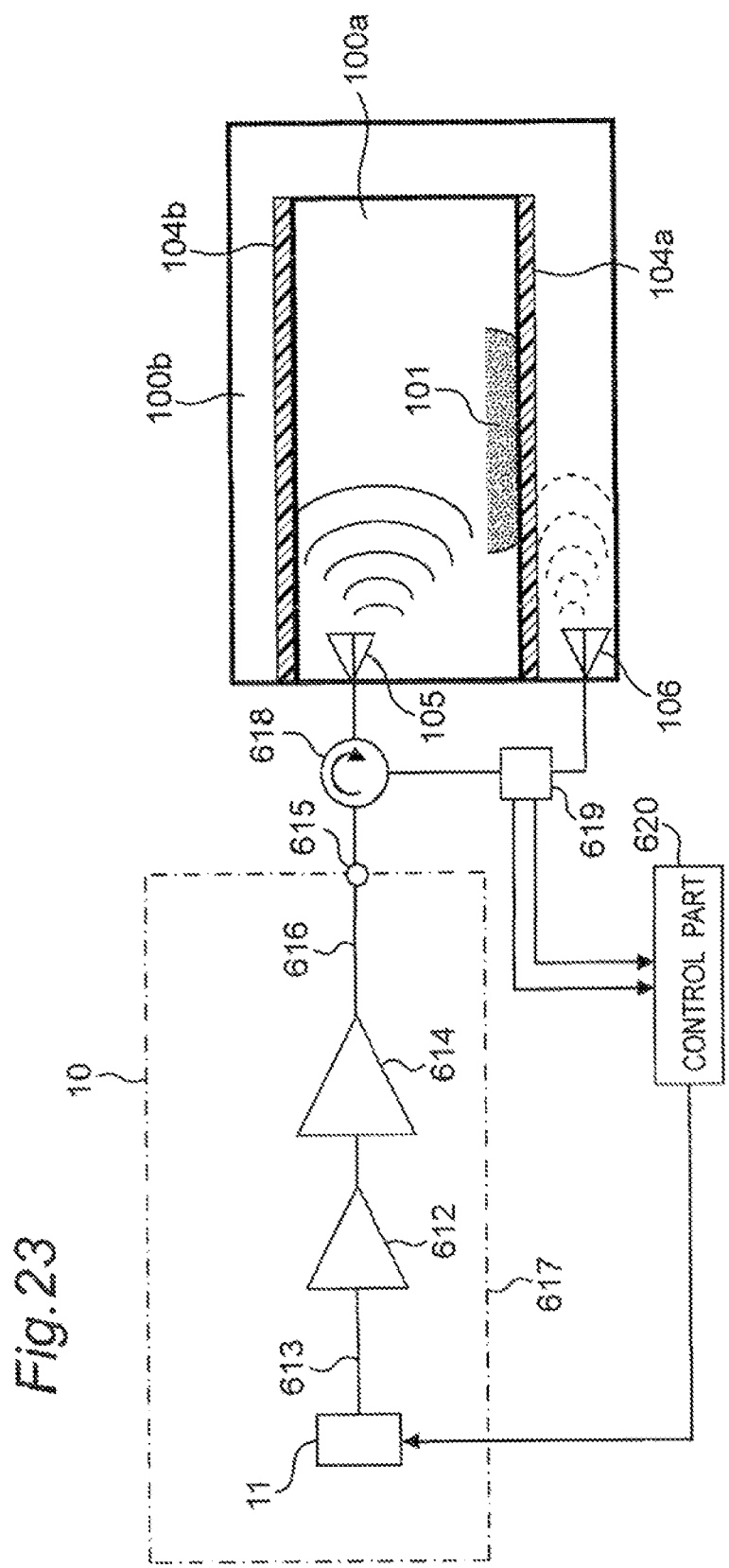
FIG. 23 is a diagram showing a configuration of a microwave heating apparatus of a sixth embodiment according to the present invention.

Hereinafter, a microwave heating apparatus of a sixth embodiment according to the present invention will be described with reference to attached FIG. 23. FIG. 23 is a block diagram showing a configuration of the microwave heating apparatus of the sixth embodiment.

In FIG. 23, in the microwave heating apparatus of the sixth embodiment, the microwave generation part 10 is provided with the microwave oscillation part 11 for generating the microwave, a former microwave amplification part 612 to which the output of the microwave oscillation part 11 is inputted via a microwave transmission passage 613 for amplifying the output, and a main microwave amplification part 614 for further amplifying an output of the former microwave amplification part 612. The microwave generation part 10 is also provided with a microwave transmission passage 616 for guiding an output of the main microwave amplification part 614 to an output part 615. The microwave oscillation part 11, the former microwave amplification part 612, and the main microwave amplification part 614 are formed with using semiconductor elements. As described above, in the microwave generation part 10, the microwave from the microwave oscillation part 11 is amplified in the former microwave amplification part 612, and further, the output of the former microwave amplification part 612 is further amplified in the main microwave amplification part 614 and outputted from the output part 615.

The microwave generation part 10 is formed on a dielectric substrate 617 made of a low-dielectric loss material. The former microwave amplification part 612 and the main microwave amplification part 614 are formed by circuits having conductive patterns formed on one surface of the dielectric substrate 617. In order to preferably operate the semiconductor elements serving as amplifying elements of the microwave amplification parts 612, 614, matching circuits are respectively provided on the input sides and the output sides of the semiconductor elements.

In the microwave transmission passages 613, 616, transmission passages having characteristic impedance of 50Ω are formed by the conductive patterns provided on the one surface of the dielectric substrate 617.

The microwave oscillation part 11 of the microwave generation part 10 has the frequency variable function of generating the frequencies of 2,400 MHz to 2,500 MHz.

As shown in FIG. 23, the microwave heating apparatus of the sixth embodiment is provided with the first heating chamber 100a accommodating the article to be heated 101, the first heating chamber to which the microwave outputted from the microwave generation part 10 is supplied, and the second heating chamber 100b.

In the first heating chamber 100a, the door for bringing the article to be heated 101 in and out (not shown) is provided in the one wall surface forming the first heating chamber 100a. In the first heating chamber 100a, the wall surfaces other than the wall surface in which the door is provided are formed by the closure plates made of the metal materials so that the microwave supplied into the first heating chamber 100a is enclosed inside the heating chamber.

As shown in FIG. 23, a microwave absorber layer 104a serving as the microwave absorber which contains the microwave absorbent material is arranged on a wall surface on the outer side of a lower wall of the first heating chamber 100a. A microwave absorber layer 104b which contains the microwave absorbent material is arranged on a wall surface on the outer side of an upper wall of the first heating chamber 100a. The second feeding part 106 is arranged in the second heating chamber 100b in which part of wall surfaces is formed by the microwave absorber layers 104a, 104b. The second feeding part 106 supplies the microwave to the second heating chamber 100b. As well as the microwave absorber layer 104 in the above first embodiment, base materials of the microwave absorber layers 104a, 104b are the microwave absorbent materials formed by mixing the ferrite and the resin material. The microwave absorber layers are attached to the surfaces of the second heating chamber 100b to which the heat resistant coating is provided.

It should be noted that the joint surfaces of the wall surfaces of the second heating chamber 100b to which the microwave absorber layers 104a, 104b are attached are formed into a convexo-concave shape, and surface areas of the microwave absorber layers 104a, 104b are increased, so that the absorbing performance of the microwave supplied to the second heating chamber 100b may be improved. Further, microwave absorber layers are arranged on all the other wall surfaces excluding the one wall surface in which the door for bringing the article to be heated 101 of the first heating chamber 100a in and out is provided, so that the absorbing performance of the microwave may be further improved.

As shown in FIG. 23, the output from the microwave generation part 10 is transmitted to the first feeding part 105 via a circulator 618 forming a circulation type non-reciprocal circuit, and supplied into the first heating chamber 100a. The reflected microwave returned from the first heating chamber 100a to the circulator 618 via the first feeding part 105 is transmitted to the second feeding part 106 by the circulator 618. In such a way, the circulator 618 is formed so as to transmit the reflected microwave returned from the first feeding part 105 to the circulator 618 to the second feeding part 106.

A power detection part 619 is arranged in a transmission passage between the circulator 618 and the second feeding part 106. The power detection part 619 respectively detects a power amount of the microwave transmitted from the circulator 618 to the second feeding part 106 and a power amount of the reflected microwave returned from the second heating chamber 100b to the circulator 618 via the second feeding part 106.

In the microwave heating apparatus of the sixth embodiment, a control part 620 for controlling the actions of the microwave generation part 10 is provided. The control part 620 receives signals detected by the power detection part 619, performs the various processing, and then performs the variable control on the oscillating frequency of the microwave oscillation part 11.

The power detection part 619 is formed by a directional coupler having a coupling degree of about 40 dB, and detects the power amounts of about 1/10,000 of the transmitted and reflected microwave power. The power signals detected in the power detection part 619 indicating the power amounts is rectified by a wave detection diode (not shown), smoothed by a capacitor (not shown), and outputted. The output signals thereof are inputted to the control part 620.

With the microwave heating apparatus of the sixth embodiment according to the present invention formed as above, by performing the frequency selection control in the first heating chamber 100*a* accommodating the article to be heated 101 as described in the above first embodiment, the high-speed heating, the uniform heating, or the grilling heating of the article to be heated 101 can be efficiently executed.

In the microwave heating apparatus of the sixth embodiment, the microwave oscillation part 11 performs oscillation at the selected frequency, and the microwave is efficiently absorbed by the article to be heated 101 in the first heating chamber 100*a*, so that the high-speed heating or the uniform heating can be executed.

With the microwave heating apparatus of the sixth embodiment, by selecting the frequency at which absorption of the microwave in the first heating chamber 100*a* is minimum and making the microwave oscillation part 11 perform the oscillation at the selected frequency, almost all the energy of the microwave outputted by the microwave generation part 10 can be supplied to the second heating chamber 100*b*. In the second heating chamber 100*b*, the microwave absorber layers 104*a*, 104*b* arranged and closely attached to the upper and lower wall surfaces of the first heating chamber 100*a* absorb the microwave supplied to the second heating chamber 100*b*, generate the heat, radiate the heat into the first heating chamber 100*a*, and quickly increase a temperature of the first heating chamber 100*a*, so that the article to be heated 101 can be radiated and heated.

It should be noted that in the microwave heating apparatus of the sixth embodiment, with a transmission structure that the microwave supplied from the second feeding part 106 is efficiently transmitted in the second heating chamber 100*b* and surely absorbed by the separately arranged microwave absorber layers 104*a*, 104*b*, all the energy of the microwave supplied to the second heating chamber 100*b* can be efficiently consumed by the microwave absorber layers 104*a*, 104*b*.

INDUSTRIAL APPLICABILITY

With the microwave heating apparatus of the present invention, the microwave supplied to the heating chamber can be substantially 100% consumed in the heating chamber, so that the microwave heating apparatus has the excellent energy-saving performance. Thus, the microwave heating apparatus can be applied to various devices such as a food heating apparatus utilizing dielectric heating, a material heating apparatus, or a semiconductor manufacturing apparatus.

The invention claimed is:

1. A microwave heating apparatus, comprising:
   a microwave generation part for generating a microwave;
   a heating chamber to which the microwave output from the microwave generation part is fed;
   a partition part which is provided inside the heating chamber to mount an article to be heated, and which is spaced from a heating chamber bottom wall surface by a predetermined distance to divide an inner space of the heating chamber into a first heating chamber serving as an upper space of the partition part and a second heating chamber serving as a lower space of the partition part;
   a first feeding part for supplying the microwave output from the microwave generation part to the first heating chamber;
   a circulation type non-reciprocal circuit for transmitting, to the second heating chamber, microwave returned from the inner space of the first heating chamber;
   a second feeding part for supplying the microwave output from the circulation type non-reciprocal circuit to the second heating chamber; and
   a microwave absorber which is (i) provided on a back surface of the partition part on the opposite side of a mount surface for the article to be heated, the back surface being a surface facing the second heating chamber, and (ii) configured to be heated with the microwave supplied to the second heating chamber.

2. The microwave heating apparatus according to claim 1, further comprising:
   a power detection part for detecting microwave power to be transmitted to the second heating chamber; and
   a control part for controlling the microwave generation part, wherein
   the control part controls an oscillating frequency of the microwave generation part in accordance with signals of the power detection part, and executes a microwave heating mode of heating the article to be heated with mainly using the microwave, a radiation conduction heating mode of heating the article to be heated with mainly using generated heat of the microwave absorber, and a composite heating mode of heating the article to be heated by combining the microwave heating mode and the radiation conduction heating mode.

3. The microwave heating apparatus according to claim 2, wherein
   the control part changes the frequency of the microwave generation part at a predetermined frequency interval over an entire bandwidth of the frequency following start of heating the article to be heated, and stores the detection signals of the power detection part with respect to the frequencies.

4. The microwave heating apparatus according to claim 2, wherein
   when executing the microwave heating mode, the control part selects a frequency at which a sum of the detection signals of the power detection part is a minimum value, and operates the microwave generation part at the selected frequency.

5. The microwave heating apparatus according to claim 2, wherein
   when executing the microwave heating mode, the control part selects a plurality of frequencies at which a sum of the detection signals of the power detection part is an extremely small value, and controls the microwave generation part to successively generate the plurality of selected frequencies.

6. The microwave heating apparatus according to claim 2, wherein
   when executing the radiation conduction heating mode, the control part selects a frequency at which a sum of the detection signals of the power detection part is a maximum value, and operates the microwave generation part at the selected frequency.

7. The microwave heating apparatus according to claim 2, wherein
   when executing the radiation conduction heating mode, the control part selects a frequency at which a sum of the detection signals of the power detection part is a maximum value, and controls the microwave generation part to sweep a frequency in a predetermined band centering on the selected frequency.

8. The microwave heating apparatus according to claim 1, wherein
the microwave generation part has a microwave oscillation part formed with using a semiconductor element, and a microwave amplification part for amplifying a microwave generated by the microwave oscillation part.

9. The microwave heating apparatus according to claim 1, wherein
the microwave generation part has a microwave oscillation part formed with using a semiconductor element, a division part for dividing an output of the microwave oscillation part into a plurality of outputs, and microwave amplification parts for respectively amplifying the outputs of the division part, and
microwave outputs of the microwave amplification parts are supplied from a plurality of points to at least the first heating chamber.

10. The microwave heating apparatus according to claim 1, wherein
the microwave generation part has a microwave oscillation part formed with using a semiconductor element, a division part for dividing an output of the microwave oscillation part into a plurality of outputs, microwave amplification parts for respectively amplifying the outputs of the division part, and a phase changing part for delaying a phase of at least one of the outputs of the division part, and
wherein microwave outputs of the microwave amplification parts are supplied from a plurality of points to at least the first heating chamber.

11. The microwave heating apparatus according to claim 10, wherein
the control part controls the oscillating frequency of the microwave oscillation part in accordance with the detection signals of the power detection part obtained under a condition that phases of the microwaves supplied to the first heating chamber are substantially identical.

12. The microwave heating apparatus according to claim 10, wherein
the control part selects a frequency at which a sum of the detection signals of the power detection part is a minimum value or a maximum value, and controls the phase changing part when the microwave generation part is operated at the selected frequency, so as to change phases of microwaves supplied from a plurality of points to the first heating chamber.

13. The microwave heating apparatus according to claim 1, wherein
the microwave generation part has a plurality of microwave oscillation parts formed with using semiconductor elements, and microwave amplification parts for respectively amplifying outputs of the microwave oscillation parts, and
microwave outputs of the microwave amplification parts are respectively supplied from different positions in the first heating chamber.

14. The microwave heating apparatus according to claim 1, wherein
the microwave generation part has a plurality of microwave oscillation parts formed with using semiconductor elements, and microwave amplification parts for respectively amplifying outputs of the microwave oscillation parts, and
an output of at least one of the microwave amplification parts is supplied to the second heating chamber.

15. The microwave heating apparatus according to claim 1, wherein
the microwave generation part has a plurality of microwave oscillation parts formed with using semiconductor elements, and microwave amplification parts for respectively amplifying outputs of the microwave oscillation parts,
an output of at least one of the microwave amplification parts is supplied to the second heating chamber, and
the second heating chamber is supplied with the microwave having predetermined frequency.

* * * * *